(12) United States Patent
White et al.

(10) Patent No.: US 8,555,238 B2
(45) Date of Patent: Oct. 8, 2013

(54) PROGRAMMING AND DEVELOPMENT INFRASTRUCTURE FOR AN AUTONOMIC ELEMENT

(75) Inventors: Anthony Richard Phillip White, Ottawa (CA); Daniel G. Calvert, Ottawa (CA); Fabio Katz, Kanata (CA); Mark David Rollins, Ottawa (CA); Jesse Stockall, Ottawa (CA); David Sugden, Gatineau (CA); Kenneth Stephen Webb, Ottawa (CA); Jean-Marc L. Sequin, Stittsville (CA); David Alan Watson, Dunrobin (CA)

(73) Assignee: Embotics Corporation, Ottawa (CA)

( * ) Notice: Subject to any disclaimer, the term of this patent is extended or adjusted under 35 U.S.C. 154(b) by 1319 days.

(21) Appl. No.: 11/405,260

(22) Filed: Apr. 17, 2006

(65) Prior Publication Data

US 2007/0033273 A1 Feb. 8, 2007

(30) Foreign Application Priority Data

Apr. 15, 2005 (CA) .................................... 2504333

(51) Int. Cl.
*G06F 9/44* (2006.01)

(52) U.S. Cl.
USPC ........................... 717/100; 717/124; 709/223

(58) Field of Classification Search
None
See application file for complete search history.

(56) References Cited

U.S. PATENT DOCUMENTS

| | | | |
|---|---|---|---|
| 4,819,234 A | 4/1989 | Huber | |
| 5,513,062 A | 4/1996 | Paul et al. | |
| 5,559,958 A | 9/1996 | Farrand | |
| 5,655,081 A | 8/1997 | Bonnell | |
| 5,696,895 A | 12/1997 | Hemphill et al. | |
| 5,781,716 A | 7/1998 | Hemphill et al. | |
| 5,822,512 A | 10/1998 | Goodrum et al. | |
| 5,864,659 A | 1/1999 | Kini et al. | |
| 5,951,686 A | 9/1999 | McLaughlin et al. | |
| 5,987,621 A | 11/1999 | Duso et al. | |
| 6,058,434 A | 5/2000 | Wilt et al. | |
| 6,065,123 A | 5/2000 | Chou et al. | |
| 6,070,253 A | 5/2000 | Tavallaei et al. | |
| 6,122,664 A | 9/2000 | Boukobza | |

(Continued)

FOREIGN PATENT DOCUMENTS

| | | |
|---|---|---|
| CA | 2475387 | 1/2005 |
| JP | 2000 245076 | 9/2000 |

(Continued)

OTHER PUBLICATIONS

Walsh et al. Utility functions in autonomic systems, International Conference on Autonomic Computing, May 2004, pp. 70-77, Retrieved on [May 30, 2013], Retrieved fron the Internet: URL<http://ieeexplore.ieee.org/xpls/abs_all.jsp?arnumber=1301349&tag=1>.*

(Continued)

*Primary Examiner* — Thuy Dao
*Assistant Examiner* — Cheneca Smith
(74) *Attorney, Agent, or Firm* — IP-MEX Inc.; Victoria Donnelly

(57) ABSTRACT

Programming and development infrastructure for an autonomic element is provided. The system includes a control plane (ISAC), a host server, a management console, and a module development environment. The ISAC contains an Autonomic Controller Engine (ACE) and management module(s). The management module is comprised of a set of scenarios. The ISAC is embedded in a control plane.

23 Claims, 68 Drawing Sheets

High CPU Monitoring

(56) References Cited

U.S. PATENT DOCUMENTS

| | | | |
|---|---|---|---|
| 6,131,131 A | 10/2000 | Bassman et al. | |
| 6,138,239 A | 10/2000 | Veil | |
| 6,161,196 A | 12/2000 | Tsai | |
| 6,564,326 B2 | 5/2003 | Helbig, Sr. | |
| 6,591,376 B1 | 7/2003 | VanRooven | |
| 6,697,962 B1 | 2/2004 | McCrory et al. | |
| 6,732,067 B1 | 5/2004 | Powderly | |
| 6,856,942 B2* | 2/2005 | Garnett et al. | 702/183 |
| 6,889,285 B2 | 5/2005 | Dawson et al. | |
| 6,895,285 B2 | 5/2005 | Maity | |
| 6,957,288 B2 | 10/2005 | Metevier et al. | |
| 6,986,057 B1 | 1/2006 | Cusey et al. | |
| 7,058,860 B2 | 6/2006 | Miller et al. | |
| 7,085,921 B2 | 8/2006 | Frye | |
| 7,096,459 B2* | 8/2006 | Keller et al. | 717/124 |
| 7,182,250 B2 | 2/2007 | Kelly et al. | |
| 7,194,445 B2 | 3/2007 | Chan et al. | |
| 7,234,099 B2 | 6/2007 | Gower et al. | |
| 7,269,762 B2 | 9/2007 | Heckmann et al. | |
| 7,275,235 B2* | 9/2007 | Molinari et al. | 717/100 |
| 7,287,177 B2 | 10/2007 | Bonaccio et al. | |
| 7,287,179 B2 | 10/2007 | Doyle et al. | |
| 7,302,698 B1 | 11/2007 | Proudler et al. | |
| 7,409,577 B2 | 8/2008 | Wing et al. | |
| 7,420,952 B2 | 9/2008 | da Costa et al. | |
| 7,467,180 B2 | 12/2008 | Kaufman et al. | |
| 7,487,494 B2 | 2/2009 | Chan et al. | |
| 7,512,679 B2 | 3/2009 | Boyd et al. | |
| 7,512,981 B2 | 3/2009 | Pearson | |
| 7,533,173 B2 | 5/2009 | Badovinatz et al. | |
| 7,590,984 B2 | 9/2009 | Kaufman et al. | |
| 7,617,304 B2* | 11/2009 | Devarakonda et al. | 709/223 |
| 7,653,727 B2 | 1/2010 | Durham et al. | |
| 7,685,348 B2 | 3/2010 | Larson et al. | |
| 7,689,872 B2 | 3/2010 | Doyle et al. | |
| 7,886,273 B2* | 2/2011 | Hinchey et al. | 717/124 |
| 2001/0052108 A1* | 12/2001 | Bowman-Amuah | 717/1 |
| 2001/0056539 A1 | 12/2001 | Pavlin et al. | |
| 2002/0002583 A1 | 1/2002 | Fabri et al. | |
| 2002/0155892 A1 | 10/2002 | Mishina et al. | |
| 2002/0166062 A1 | 11/2002 | Helbig, Sr. | |
| 2002/0169738 A1 | 11/2002 | Giel et al. | |
| 2003/0061094 A1 | 3/2003 | Banerjee et al. | |
| 2003/0110388 A1 | 6/2003 | Pavlin et al. | |
| 2003/0177224 A1 | 9/2003 | Nguyen | |
| 2003/0200322 A1 | 10/2003 | Childs et al. | |
| 2003/0229406 A1 | 12/2003 | Maity | |
| 2003/0237022 A1 | 12/2003 | Thayer | |
| 2004/0049573 A1 | 3/2004 | Olmstead et al. | |
| 2004/0059704 A1 | 3/2004 | Hellerstein et al. | |
| 2004/0059966 A1 | 3/2004 | Chan et al. | |
| 2004/0088510 A1 | 5/2004 | Hori | |
| 2004/0105298 A1 | 6/2004 | Symes | |
| 2004/0122950 A1 | 6/2004 | Morgan et al. | |
| 2004/0153749 A1 | 8/2004 | Schwarm et al. | |
| 2004/0172574 A1 | 9/2004 | Wing et al. | |
| 2004/0177182 A1 | 9/2004 | Metevier et al. | |
| 2004/0181682 A1 | 9/2004 | Orino et al. | |
| 2004/0225854 A1 | 11/2004 | Friauf et al. | |
| 2004/0243915 A1 | 12/2004 | Doyle et al. | |
| 2004/0244006 A1 | 12/2004 | Kaufman et al. | |
| 2004/0255167 A1 | 12/2004 | Knight | |
| 2004/0261070 A1 | 12/2004 | Miller et al. | |
| 2005/0015571 A1 | 1/2005 | Kaufman et al. | |
| 2005/0015668 A1 | 1/2005 | Doyle et al. | |
| 2005/0060567 A1* | 3/2005 | Shannon et al. | 713/200 |
| 2005/0071449 A1* | 3/2005 | Alex et al. | 709/223 |
| 2005/0091351 A1 | 4/2005 | Badovinatz | |
| 2005/0131993 A1* | 6/2005 | Fatula, Jr. | 709/202 |
| 2005/0132052 A1* | 6/2005 | Uttamchandani et al. | 709/226 |
| 2005/0154576 A1* | 7/2005 | Tarui et al. | 703/22 |
| 2005/0235360 A1 | 10/2005 | Pearson | |
| 2005/0256947 A1* | 11/2005 | Devarakonda et al. | 709/223 |
| 2005/0268099 A1 | 12/2005 | Cusey et al. | |
| 2006/0026570 A1* | 2/2006 | Chan et al. | 717/127 |
| 2006/0156274 A1* | 7/2006 | Andreev et al. | 717/100 |
| 2006/0242395 A1 | 10/2006 | Fausak | |
| 2007/0168967 A1* | 7/2007 | Chopra et al. | 717/124 |

FOREIGN PATENT DOCUMENTS

| | | |
|---|---|---|
| WO | WO01/16744 | 3/2001 |
| WO | WO 01/16744 | 3/2001 |
| WO | WO02/01347 | 1/2002 |

OTHER PUBLICATIONS

Tesauro et al. A multi-agent systems approach to autonomic computing, AAMAS '04 Proceedings of the Third International Joint Conference on Autonomous Agents and Multiagent Systems, 2004 Retrieved on [May 30, 2013] Retrieved from the Internet: URL<http://dl.acm.org/citation.cfm?id=1018780>.*

R. Sterritt et al., Autonomic computing—a Means of Achieving Dependability? Proceedings of IEEE International Conference on the Engineering of Computer Based Systems (ECBS'-3), Apr. 7, 2003, pp. 247-251, Huntsville, Ala., USA.

J. McGary et al., Exploring the Next-Generation DRAC 4 Dell Remote Access Controller, Special section: New-generation server technology, Dell Power Solutions Magazine, Oct. 2004, pp. 18-21.

W. Pan et al., Remote Management with Virtual Media in the DRAC 4, Special section: New-generation server technology, Dell Power Solutions Magazine, Oct. 2004, pp. 30-35.

G. Ao et al., Software Hot-swapping Techniques for Upgrading Mission Critical Applications on the Fly, M. Eng., Carleton University, May 2000, p. 135.

N. Feng, S-Module Design for Sofh.are Hot-Swapping, M. Eng., Carleton University, May 1999, p. 106.

G. Reynaga, Hot Swapping using State Persistence, A Framework for State Transfer, M.C.S., Carleton University, Aug. 2004, p. 143.

J. Appavoo et al., Enabling autonomic behavior in systems software with hot swapping, IBM Systems Journal, 42, No. 1, 2003, pp. 60-76.

G. Candea et al., Designing for High Availability and Measurability, Proceedings of the 1st Workshop on Evaluating and Architecting System Dependability (EASY), Jul. 2001, p. 6, Stanford University, Goeteborg, Sweden.

G. Candea et al., Reducing Recovery Time in a Small Recursively Restartable System, Proceedings of the International Conference on Dependable Systems and Networks (DSN-2002), Jun. 2002, p. 10, Washington, D.C., USA.

G. Candea et al., Improving Availability with Recursive Micro-Reboots: A Soft-State System Case Study, Performance Evaluation Journal, vol. 56, Nos. 1-3, Mar. 2004, p. 26, Stanford University.

S. Hariri et al., An Autonomic Application Development & Management Environment, IEEE Communication; XML-based Management of Network and Services, 2003, p. 15, University of Arizona Tucson, AZ 85721, USA, http://www.ece.arizona.edu/~zhang/xml.pdf, accessed Jan. 24, 2005.

T. Lau et al., Learning Procedures for Autonomic Computing, Workshop on Autonomic Computing, Aug. 2003, p. 4, Acapulco, Mexico.

I. Katzela et al., Schemes for Fault Identification in Communication Networks, IEEE Transactions on Networking, Center for Telecommunications Research Electrical Engineering, 1995, p. 32, Columbia University, New York, N.Y.

B. Gruschke, Intetraged Event Management: Event Correlation Using Dependency Graphs, Proceedings of the 9th IFIP/IEEE International Workshop on Distributed Systems Operation and Management (DSOM'98), Oct. 1998, p. 12, Department of Computer Science, University of Munich, Munich, Germany.

K. Appleby et al., Yemanja—A Layered Event Correlation Engine for Multi-domain Server Farms, IFIP/IEEE International Symposium on Integrated Network Management VII, Seattle, Wash., May 2001 p. 17, IEEE Publishing.

CERT Coordination Center at Carnegie Mellon University, Vulnerability Remediation, published at www.cert.org, Jun. 2003.

Berggren C: "The BiProcessor: A Merger of Two Architectures". IBM Systems Journal, IBM Corp., Armonk, New York, US, vol. 31, No. 3, pp. 535-549, Jan. 1992.

(56) References Cited

OTHER PUBLICATIONS

American Megatrends, "MegaRAC (TM) G3", MegaRAC G3 User's Guide, Jun. 7, 2004.
American Megatrends, "MegaRACRG3", www.ami.com. printed Oct. 19, 2004.
R. Sterritt, Towards Autonomic Computing: Effective Event Management, Proceedings of 27th Annual IEEE/NASA Sortware Engineering Workshop (SEW), Dec. 3-5, 2002, p. 8, Maryland, USA.
R. Sterritt et al., Autonomic Computing Correlation for Fault Management System Evolution, Proceedings of IEEE Conference on Industrial Informatics, Aug. 21-24, 2003, p. 8, Banff, Canada.
R. Murch, Autonomic Computing, Prentice Hall, 2004, p. 2., IBM.
Berkeley Recovery Oriented Computing Group, http://roc.cs.berkeley.edu/accessed Jan. 24, 2005.
Agent Building and Learning Environment (ABLE), http://www.research.ibm.com/able/, accessed Jan. 24, 2005.
Open Services Gateway Initiative (OSGi), http:www.osgi.org, accessed Jan. 24, 2005.
Eclipse, http:www.eclipse.org/, accessed Jan. 24, 2005.
Jeops, http:www.jeops.org/, accessed Jan. 24, 2005.
Knopflersish, http:www.knopflerfish.org/, accessed Apr. 2, 2006.
Open Services Gateway Initiative (OSGi), About the OSGi Service Platform, Technical Whitepaper, p. 17, http:www.osgi.org/documents/osgi_technology/osgi-sp-overview.pdf/, accessed Jul. 12, 2004, OSGi Alliance.
USPTO, IEEE Xplore, Results of the search by the examiner, Apr. 28, 2008, including references dated 2005-2006-2008, p. 2, http://ieeexplore.ieee.org/search/searchresult.
P. Brittenham, Autonomic Computing: An Insider's Perspective, IBM, Jun. 28, 2005, p. 6, http://www.ibm.com/developer works/library/ac-inside/index.html.
Lightstone et al., Toward Automic Computing with DB2 Universal Database, Sep. 2002, IEEE.
Dong et al., AUTONOMIA: An Autonomic Computing Environment, 2003, IEEE.
Lewandowski et al., SARA: Survivable Autonomic Response Architecture, 2001, IEEE.
David Pescovitz, Helping Computers Help Themselves, Sep. 2002, IEEE.
De Wolf et al., Towards Autonomic Computing: Agent-Based Modelling, Dynamical Systems Analysis, and Decentralised Control, 2003, IEEE.
Roy Sterritt, Towards Autonomic Computing: Effective Event Management, 2003, IEEE.
Yoshihiro Tohma, Fault Tolerance in Autonomic Computing Environment, 2002, IEEE.
Evaristus Mainsah, Autonomic computing: the next era of computing, Feb. 2002, Electronics & Communication Engineering Journal.
Lanfranchi et al., Toward a new landscape of systems management in an autonomic computing environment, 2003, IBM Systems Journal.
Bantz et al., Autonomic personal computing, 2003, IBM Systems Journal.

* cited by examiner

Autonomic Computing Architecture: Element interactions

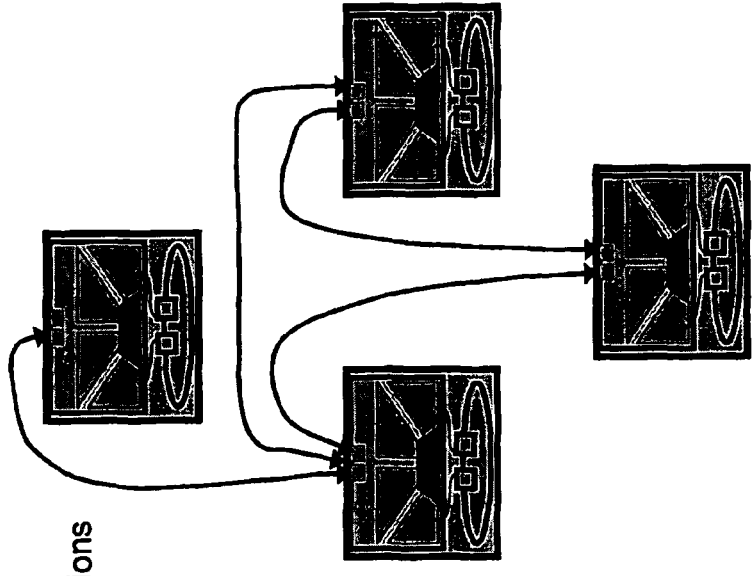

- System self-* properties, behavior arise from interactions among autonomic managers
- Interactions are
  - Dynamic, ephemeral
  - Formed by (negotiated) agreement
  - Flexible in pattern; determined by policies
  - Based on OGSA and specific AC extensions
    - Required messages
    - Optional but standard
    - Application-specific
- For advanced interactions: conversation support
  - "Choreography" defines structure of multi-step interactions A multi-agent system!

Fig. 11

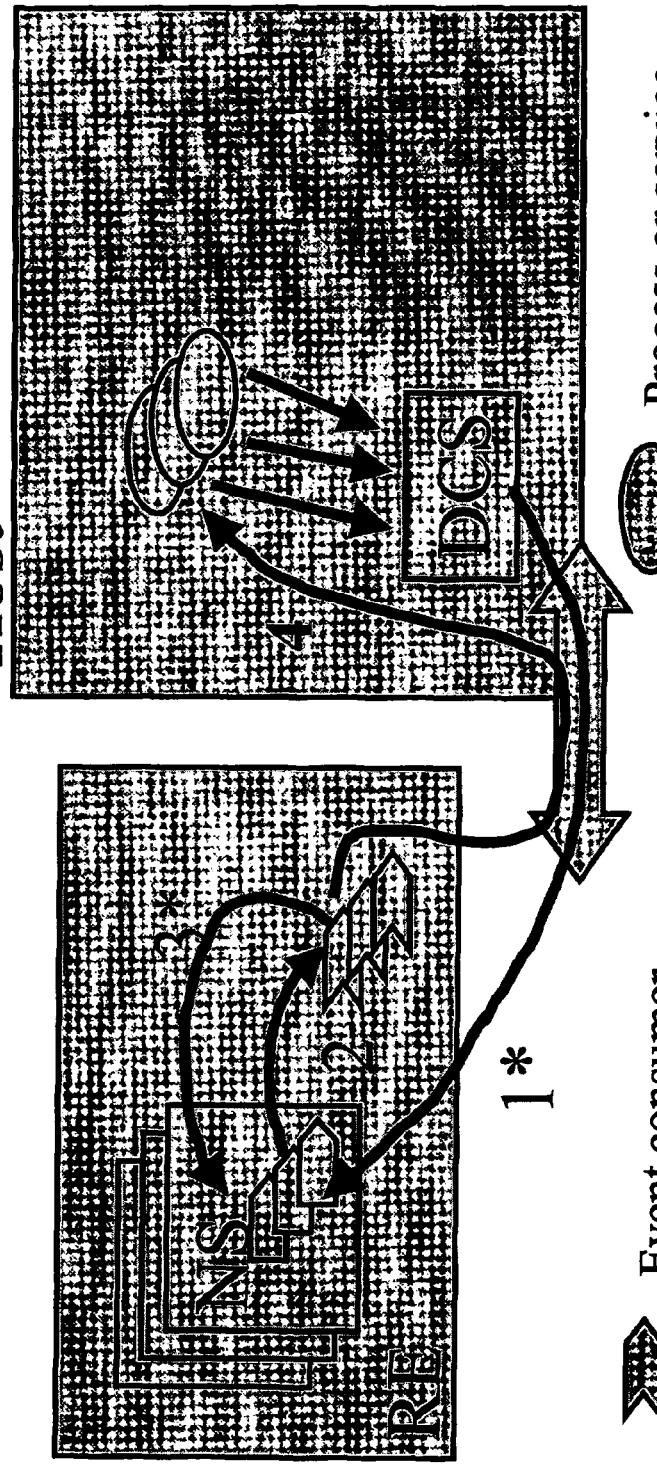

Interactions between Policy and MSE instances

Instance Interactions Between Homes

- When a policy home is configured it enumerates the instances of the managed system element it is interested in.
- If there in an instance that meets the specified configuration a new policy instance is created and configured.
- The policy home also registers for instance change events from the managed system element home.
- When instances are added or removed that match the policy homes configuration the policy home will create or destroy a policy instance as required

Fig. 19

Interactions between Policy and MSE instances

- A policy instance is created and configured with a reference to the managed system element it is managing.
- The policy registers property change listeners for any properties of the managed system element that it is interested in.
- The managed system element signals a property change to the policy.
- The policy reasons with the new information and is able to execute a method on the managed system element to carry out it's programmed actions.
- The policy will be notified if the results of it's method invocation

Fig. 20

Programming with ManagedSystemElements: Deployment

Requirements for the deployment of the ManagedSystemElement model

- Modules must contain a jar that contains the ManagedSystemElement model classes.
- If the model classes have dependencies on other model classes that do not exist in this module, this fact has to be accessible to the Managed Object service
- There must exist a mechanism to prompt the Managed Object Service to load the classes required for the building of the ManagedSystemElement model: these classes are the ManagedSystemElementHome instances. These classes must be loaded upon deployment of the module in order to support the configuration of module policies.
- There must exist a mechanism allow the Managed Object Service to load the ManagedSystemElementHome classes in a specific order. This order is primarily dictated by the fact that some ManagedSystemElements cannot be created before others : eg. Process requires OperatingSystem.
- There must exist a mechanism that enables a ManagedSystemElementHome class to execute some initializing code upon instantiation.
- The deployment and instantiated of the ManagedSystemElement model must support both lazy instantiation and other.
- Subclassing of ManagedSystemElementHome is supported, but not required.
  - Implications: ManagedSystemElementHome must support "configuration".
- There must exist a ManagedSystemElementHome instance hierachy that reflects the ManagedSystemElement class hierachy.
  - Eg. PolicyHome contains references to ProcessPolicyHome, StoragePolicyHome
  - Eg. EnabledLogicalElementHome contains references to ProcessHome, OSHome, ServiceHome

Fig. 21

Programming with ManagedSystemElements: Deployment

Design Item 1: ManagedSystemElementHome Deployment Descriptors

- Each ManagedSystemElementHome descriptor file will be named uniquely with a name that is meant to be symbolic.

- Eg. If a file "ProcessHome.xml" exists, it is understood that runtime components that required a reference to the ProcessHome object can use the String "ProcessHome" in order to request the instance from the ManagedObject Service.
  - Also if "ProcessHome.xml" has a dependency on "OSHome.xml", it can refer to it as "OSHome".

- The descriptor file is an xml representation of the following class:

ManagedElementHomeDescriptor
  -homeClass : string
  -managedElementClass : string
  -managedElementContainerClass
  -sensorMapClass
  -depends : string

- Example for "ProcessHome":

```
<HomeDescriptor name="ProcessHome">
    <attribute name="homeClass">ManagedSystemElementHome</attribute>
    <attribute name="ManagedElementClass">Process</attribute>
    <attribute name="ManagedSystemElementContainerClass">OS</attribute>
    <attribute name="sensorMapClass">ProcessSensorMap</attribute>
    <attribute name="homeSuperClass">EnabledLogicalElementHome</attribute>
    <depends>OSHome</depends>
</HomeDescriptor>
```

Fig. 22

Programming with ManagedSystemElements: Deployment

Design Item 1: ManagedSystemElementHome Deployment Descriptors

- This xml is sufficient information to enable the Managed Object Service to:
  - Create an instance of ManagedSystemElementHome
  - That uses the ProcessSensorMap to listen for creation/destruction of processes
  - Creates/destroys new instances of class Process
  - Adds to/ removes from the Model via the OS ManagedSystemElement
  - Map that instance to the string "ProcessHome"
  - Ensure that it does not create this instance until an instance of ManagedSystemElementHome mapped to the String "OSHome" has been created.
  - Ensure that any containment between ManagedSystemElementHome objects is understood.

Design Item 2: ManagedSystemElementHome initialization

- The abstract ManagedSystemElementHome class will declare an abstract init().
- This ensures that subclasses that wish to perform custom initialization may do so.
- This supports the requirement that instance creation can occur immediately if desired, and not in a lazy fashion. Eg. HostHome may wish to create Host and Platform ManagedSystemElements before anyone has expressed interest in them.

Fig. 23

Programming with ManagedSystemElements: Sensor Interaction

Requirements:

- The Model Update Service must provide an interface to allow ManagedSystemElements to communicate with the Sensor Layer in the following ways:
  - query for existing instances
  - query for the value of some specified feature(s)
  - subscribe to an event notifying of the creation/destruction of some "object"
  - subscribe to an event notifying of a change in some specified feature
  - call some method

- The Model Update Service must have access to context information specific for each sensor that is supports the needs of that ManagedSystemElement.
  - eg. Process ManagedSystemElement is known as "Win32_Process" in WMI, this information must be captured.
  - eg. All the features of a ManagedSystemElement must be mapped to corresponding features in a particular Sensor Implementation

- ManagedSystemElements must implement an interface to receive "ModelUpdateEvents" from the Model Update Service.

Fig. 24

Programming with ManagedSystemElements: Sensor Interaction

Design Item 1: The Sensor Map
- Included in the module archive, for each ManagedSystemElement Class that interacts with the Model UpdateService, a document must be produced that provides all the necessary information required by the Service to successfully perform queries, event subscriptions and actions.
- The document will be of the following xml form:

```
<SensorMap class="Process">
    <Instance>
        <sensor name="wmi">
            <className>Win32_Process</className>
        </sensor>
        <sensor name="BClowSensor">
            <className>Process</className>
        </sensor>
    </Instance>
    <Feature name="ExecutionState">
        <sensor name="wmi">
            <className>Win32_Process</className>
            <propertyName>ExecutionState</propertyName>
        </sensor>
        <sensor name="BClowSensor">
            <className>Process</className>
            <propertyName>ProcessExecutionState</propertyName>
        </sensor>
    </Feature>
</SensorMap>
```

Fig. 25

Programming with ManagedSystemElements: Sensor Interaction

Design Item 2: The UpdateHandler Interface

- ManagedSystemElements implement the UpdateHandler interface:
  - void handleUpdate(Event)

Fig. 26

☐ Events

Select an Event and Configure the Subscription
Browse for an event you may wish to subscribe to, enter values as subscription parameters Event: [d.Disk.ThresholdCrossed] [Browse] [Create] [Refresh]

Configure Subscription
Select Subscription:
(Disk, Threshold)
(disk, threshold)

Enter Parameter Values:

| Name | Type | Value | Description |
|---|---|---|---|
| disk | Text | $Parameter.Disk | |
| threshold | Number | $Parameter.Threshold | |

[OK] [Cancel]

FIG. 36

Configure Action
Select or Create an Action, then configure parameters if applicable

Select/Create Action Invocations
Action: [ ] [Browse] [Create] [Clear]

Configure Action Invocation
Select Action Invocation:

Enter Parameter Values:

| Name | Type | Value | Description |
|------|------|-------|-------------|
|      |      |       |             |

[OK] [Cancel]

---

Create a new action

Define a new Action
Click Next to define the data present in the Event, or Finish to use the defaults.

Action Name: d.DISK
Type: DISK
Creators: dsugden

Description: This Action cleans the disk.

[<Back] [Next>] [Finish] [Cancel]

FIG. 38

Create new action

Add Invocations
Add and define invocations for this action.

Manage Action Invocations

Innovations:

| (disk) | Name | Type |
|---|---|---|
|  | disk | Text |

[Add] [Remove]    [Add] [Remove]

[◀Back] [Next▶] [Finish] [Cancel]

---

Transition

Edit Transition Elements
Transition message

| TransitionName | threshold crossed | |
|---|---|---|
| Trigger Event | d.Disk.ThresholdCrossed(Disk,Threshold) | [Configure] |
| GuardExpression | $Event.threshold>90 | [Configure] |
| Action | d.Disk(Disk) | [Configure] |
| Raise Event |  | [Configure] |
| Raise Alarm | d.Disk.DiskFull->Minor | [Configure] |
| Cleared Alarms: | Name: | |
| Variables | Name / Type / Value | [Configure] |

[OK] [Cancel]

So we now have a basic policy that triggers on one event and performs one action....now we need to define the elements that will CREATE this event and OFFER the action

Define an alarm for the policy--

Raise Alarm

Describe the alarm you wish to raise.....

| Alarm Name | d.Disk.DiskFull | Clear |

Category: Disk
Type: DiskFull
Severity: Minor

Alarm Data Fields

| Name | Type | Value | Description |
|------|------|-------|-------------|
| instance | Text | Disk | The particular instance of th..... |
| context | Text | | Context in which this alarm i.... |
| threshold | Num... | Threshold | |

Add  Remove

OK  Cancel

FIG. 46

PROGRAMMING AND DEVELOPMENT INFRASTRUCTURE FOR AN AUTONOMIC ELEMENT

FIELD OF INVENTION

The present invention relates to programming and development infrastructure, and more particularly to programming and development infrastructure for an autonomic element.

BACKGROUND OF THE INVENTION

The total cost of ownership of servers continues to rise despite improvements in hardware and software. Effective manageability remains a problem for a number of reasons. First, the management infrastructure deployed in the enterprise relies on traditional client-server architectures. Second, the high levels of human interaction result in reduced availability while servers wait for operators to diagnose and fix problems. Finally, the deployed management solutions are in-band, with software agents operating on servers communicating with centralized management platforms. This implies that server management is only possible when the operating system is functioning, which is often not the case when management is required. Clearly, change is necessary.

Delegation of responsibility is widely acknowledged as a way of getting things done in an industrial setting. Providing workers with the authority to make decisions speeds things up, making an enterprise more efficient. Translating this observation to the server management problem, the solution is clear; empower management software to make decisions regarding change or reconfiguration. Empowering software to make decisions leads to a number of desirable software characteristics.

First, the software must be capable of autonomous decision making. In other words, the software should be an intelligent agent. This implies that the software should separate its understanding (or knowledge) of what is to be managed from the ways in which problems are diagnosed. Second, the intelligent agent cannot be part of the managed system in terms of the resources that it consumes; e.g. CPU and disk. This requires some explanation. Imagine a scenario where a runaway process is consuming almost all of the CPU. It is difficult to see how an agent would be able to control a server in these circumstances. Consider another scenario in which critically-low levels of disk space are detected. An agent sharing resources on the host would be unable to save information potentially critically important to the resolution of the problem. Finally, consider the scenario in which the operating system is hung; the agent can no longer communicate with external parties.

The scenarios described above lead to the inevitable conclusion that the agents tasked with delegated system management should reside on a separate control plane; that is a platform with separate computing and disk resources. Furthermore, the design of the computing platform should support the principles of Autonomic Computing, an area of computing recently proposed by IBM.

Autonomic Computing is a relatively recent field of study that focuses on the ability of computers to self-manage [Ref.1]. Autonomic Computing is promoted as the means by which greater dependency [Ref.2] will be achieved in systems. This incorporates self-diagnosis, self-healing, self-configuration and other independent behaviors, both reactive and proactive. Ideally, a system will adapt and learn normal levels of resource usage and predict likely points of failure in the system. Certain benefits of computers that are capable of adapting to their usage environments and recovering from failures without human interaction are relatively obvious; specifically the total cost of ownership of a device is reduced and levels of system availability are increased. Repetitive work performed by human administrators is reduced, knowledge of the system's performance over time is retained (assuming that the machine records or publishes information about the problems it detects and the solutions it applies), and events of significance are detected and handled with more consistency and speed than a human could likely provide.

Agent Building and Learning Environment (ABLE) can be used to create autonomic managers in Autonomic Computing. However, a methodology and process for the creation has not been established. Further, no programming environment has been built to embody the full software lifecycle.

Environments for the general development and distribution of software have been built to dynamically upgrade software. However, there have been no programming and development infrastructure for an autonomic element, which applies specifically to the system management domain.

SUMMARY OF THE INVENTION

It is an object of the invention to provide a method and system that obviates or mitigates at least one of the disadvantages of existing systems.

It is an object of the invention to provide an improved Programming And Development Infrastructure For An Autonomic Element.

According to an aspect of the present invention there is provided a system and method for programming an autonomic element, which includes a module development environment (MDE) module for creating and editing a management module, the autonomic element including an intelligent secure autonomic controller (ISAC) learning a behavior through the management module; and a management distribution environment (MDE) module for distributing the management module to the ISAC.

According to a further aspect of the present invention there is provided a single board computer for programming an autonomic element.

According to a further aspect of the present invention there is provided a system and method for distribution of software updates for an autonomic manager.

According to a further aspect of the present invention there is provided a system and method for configuration of an autonomic manager based upon managed element configuration.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 11 is a diagram showing networks of autonomic elements; and

FIG. 12 is a diagram showing the ISAC having event consumer and event generator and a host.

FIG. 19 illustrates interactions between policy homes;

FIG. 20 illustrates interactions between policy and managed system elements (MSE) instances;

FIG. 21 illustrates general requirements for programming with managed system elements;

FIG. 22 illustrates deployment descriptors for programming with the managed system elements of FIG. 21;

FIG. 23 illustrates further deployment descriptors and initialization for the managed system elements of FIG. 21;

FIG. 24 illustrates requirement for sensor interaction for programming with the managed system elements of FIG. 21;

FIG. 25 illustrates a sensor map for the sensor interaction of FIG. 24;

FIG. 26 illustrates an update handler interface for the sensor interaction of FIG. 24;

FIG. 36 illustrates selecting an event and configuring the subscription for the event;

FIG. 38 illustrates configuring an action;

FIG. 39 illustrates creation of a new action and adding and defining invocations for the action;

Figure 44:
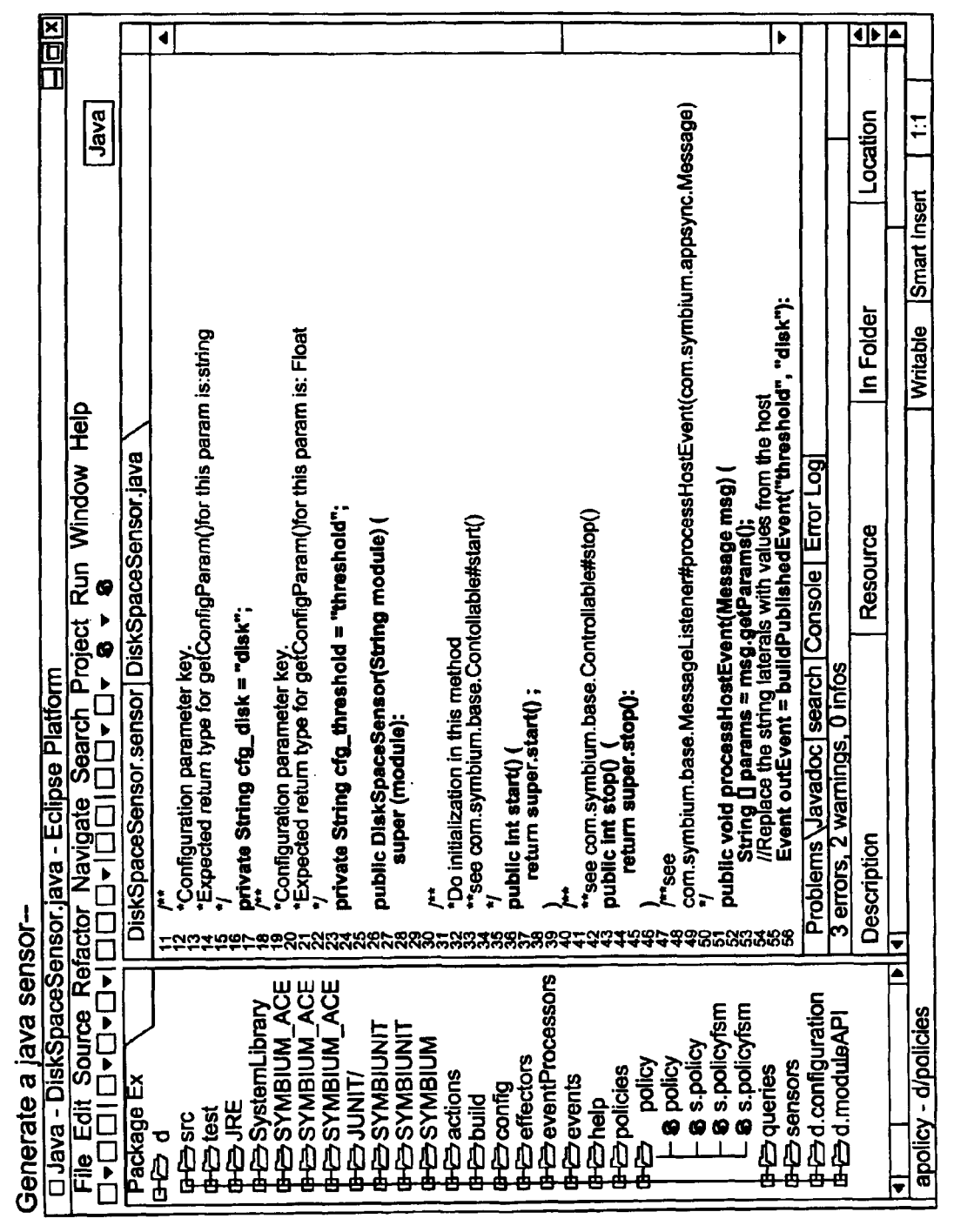

FIG. 44 illustrates a screen capture for generating a Java sensor;

FIG. 46 illustrates a screen capture for defining an alarm and policy;

DETAILED DESCRIPTION OF THE PREFERRED EMBODIMENTS

1. A Control Plane for Servers

The present invention provides a system and method for embedded system administration that uses autonomic computing principles. Namely, it provides a programming and development system that enables the capture of operational administration knowledge for use in the embedded autonomic manager. The embedded autonomic manager interprets the information provided in order assume control of the host of a server in response to the occurrence of one or more events. Upon assuming control the system assumes host management functions.

Figure 15:
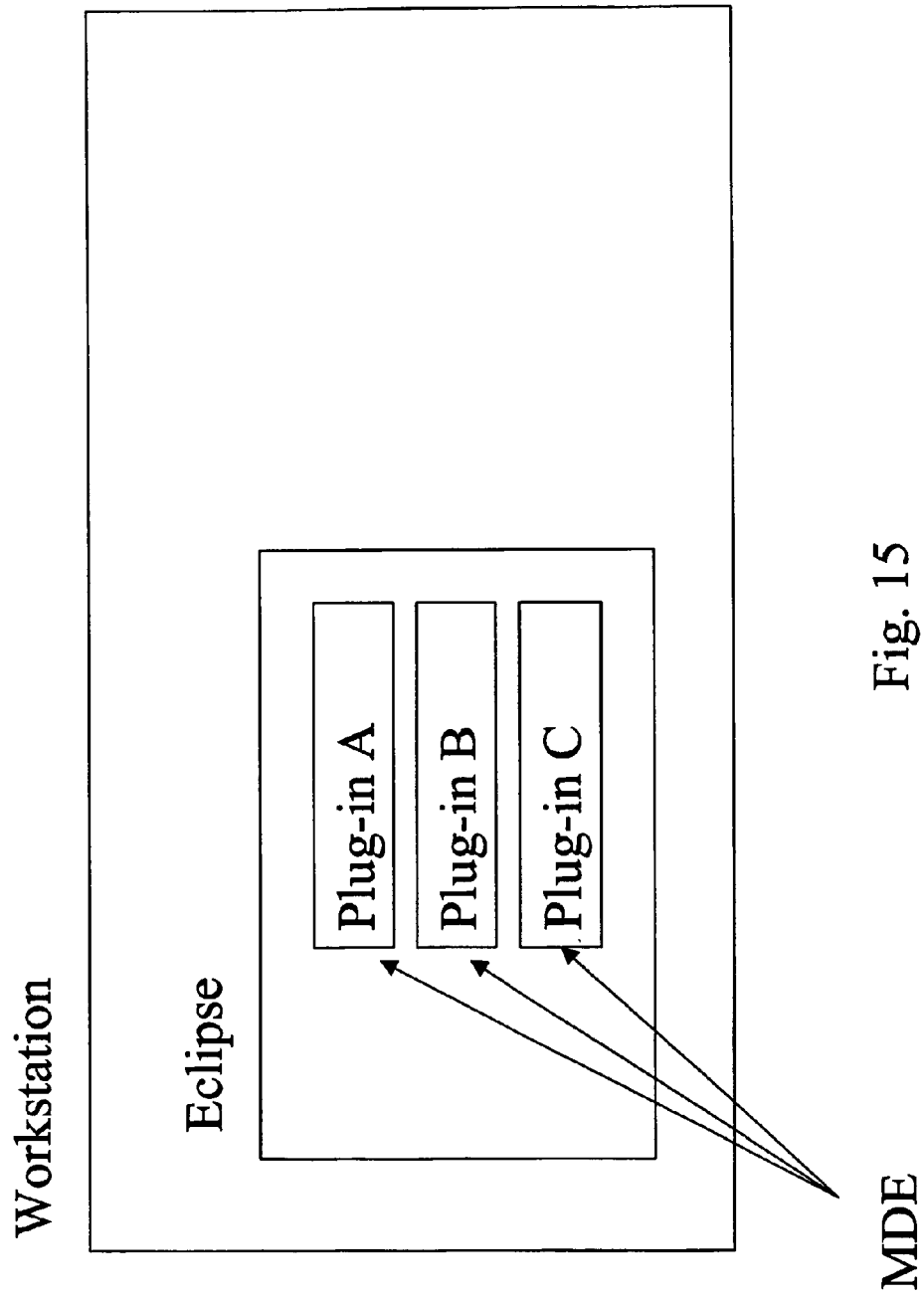
FIG. 15 is a diagram that shows the high level architecture of an embodiment of the Module Development Environment (MDE). The diagram shows the use of Eclipse plugins as providing functionality and an extensible environment.

FIG. 15 is a block diagram of a programming and development system according to an embodiment of the invention. The programming and development system runs on a workstation that has the characteristics of a typical desktop computer. The programming and development environment consists of a series of plugins that provide the ability to capture various facets of operational and diagnostic knowledge relevant to system administration. The Eclipse development environment is used in an embodiment of the invention. Together these plugins generate machine-readable representations of the knowledge that can be stored persistently on disk or in a database. In the current embodiment of the invention knowledge is stored in a series of directories and files on disk using extensible markup language, or XML. In this embodiment of the invention all files and subdirectories below a specified point in the directory tree are said to constitute a management module. A management module is the unit of deployable system administration. It is represented by the directory structure shown in FIG. 6. As an analogy, a management module can be thought of as being a web archive (WAR) or enterprise java bean archive (EAR). As with persistent storage services provided by the Common Object Request Broker Architecture (CORBA) or Enterprise Java Beans (EJB), it will be apparent to one skilled in the art that the mechanism and format of the knowledge stored may be any storage format appropriate for maintaining information persistently including files, SQL or object databases, tree data structures and any other means of persistence as would be apparent to one skilled in the art.

Figure 18:
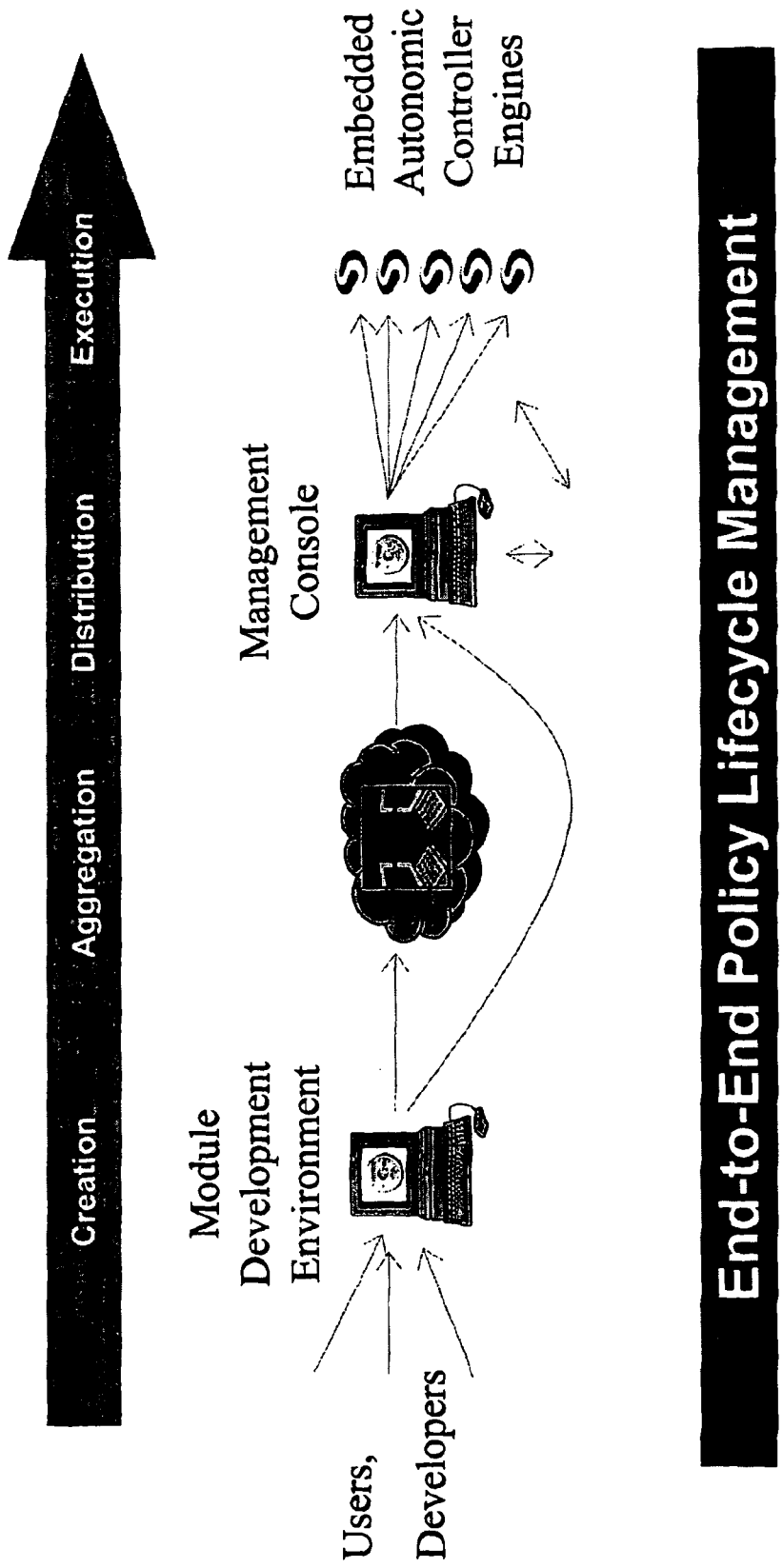
FIG. 18 is a diagram that shows the information flow regarding management modules. Management modules are created using the module development environment and stored persistently. Deployment information is added by administrators using the management console and these modified management modules are stored persistently. The deployable management modules are distributed to groups of autonomic control engines via a data communications network.
Figure 27:
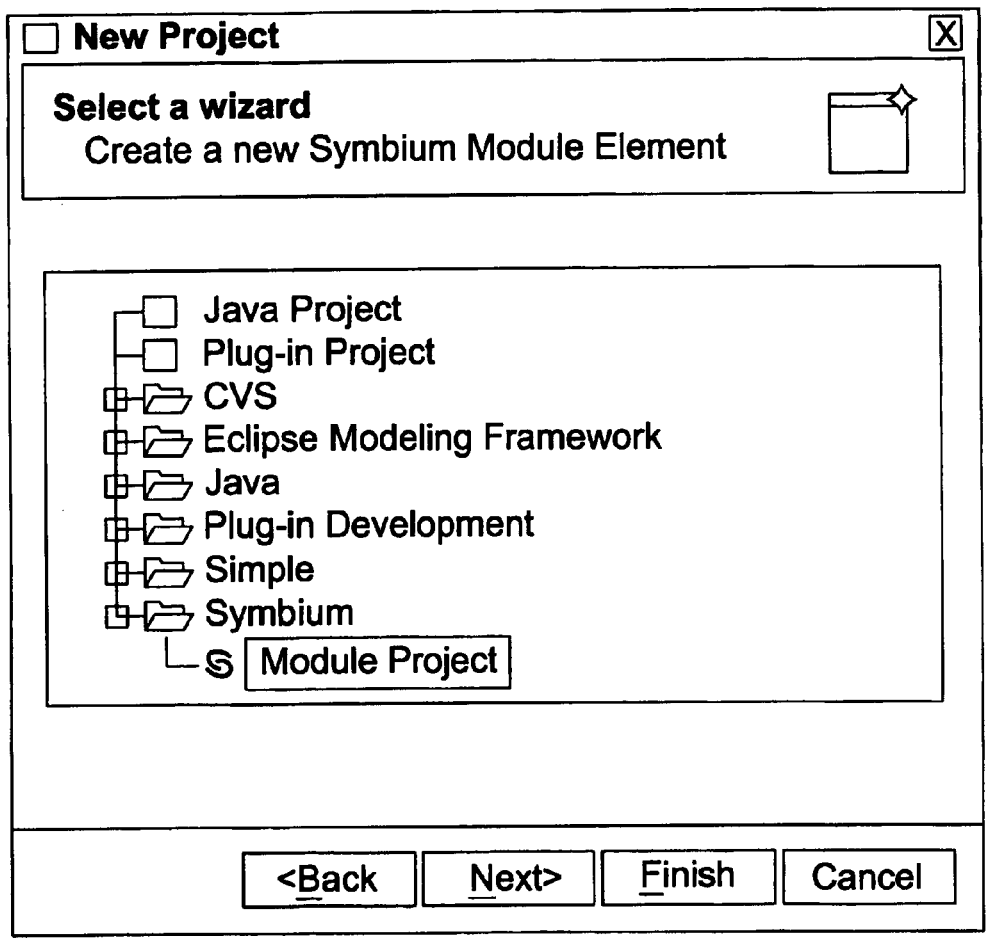
FIG. 27 illustrates a screen capture for creating a module project.
Figure 28:
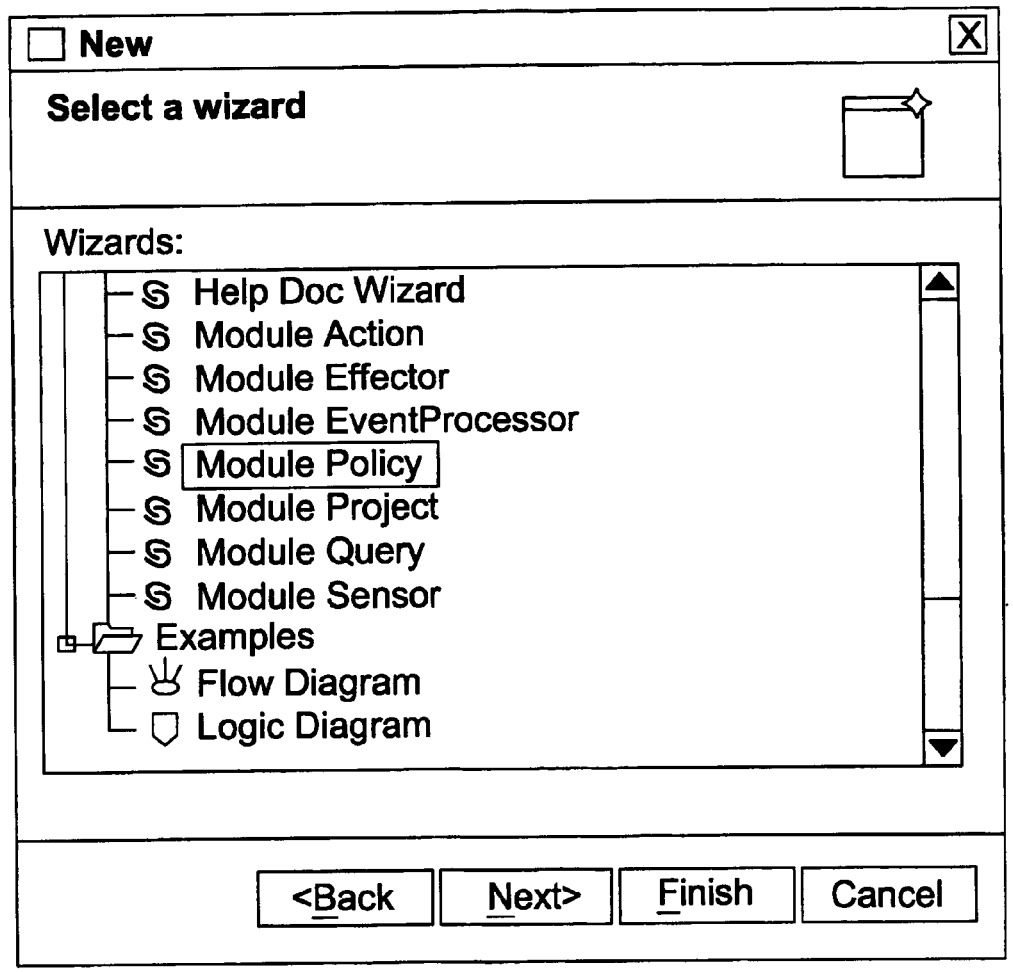
FIG. 28 illustrates a screen capture for creating a policy.
Figure 29:
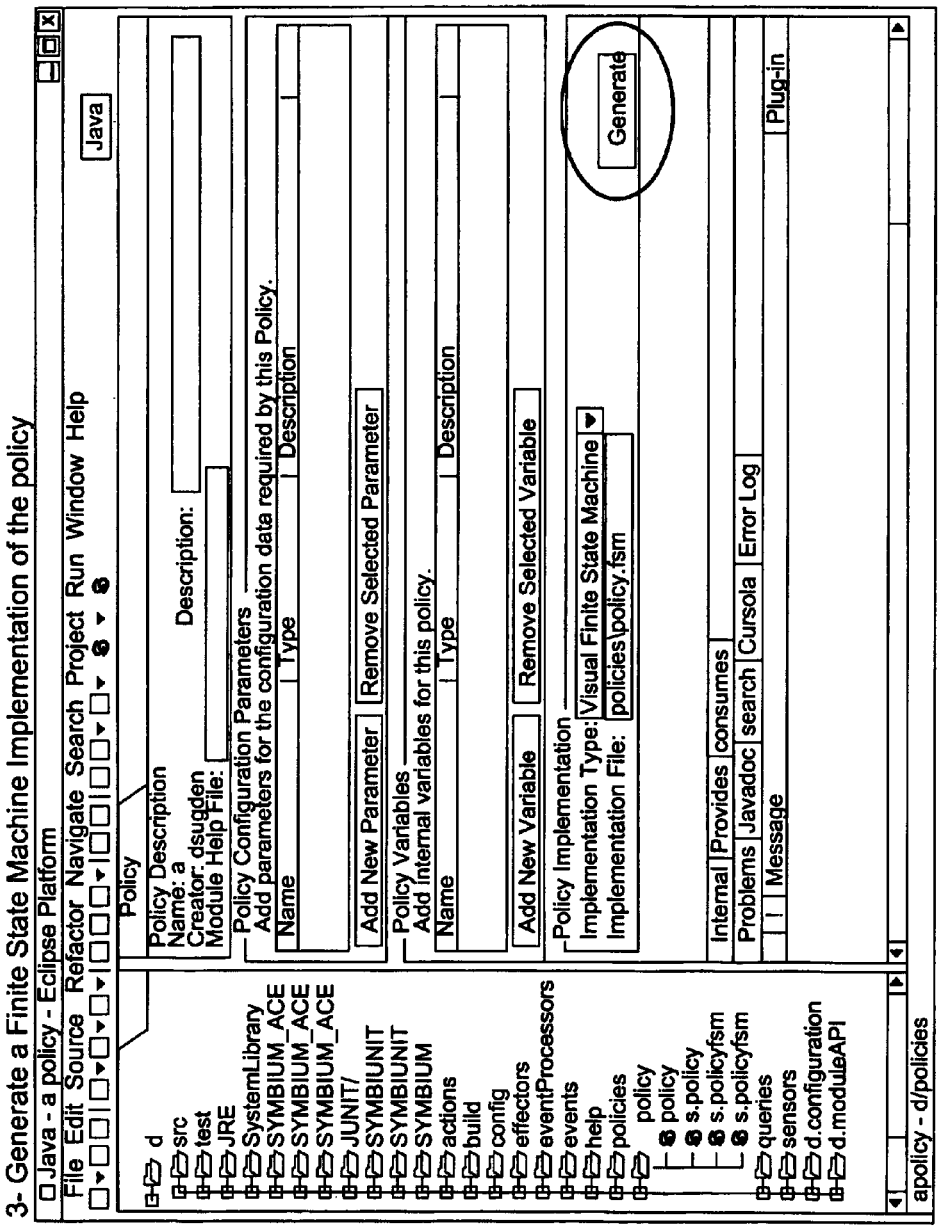
FIG. 29 illustrates a generation of a finite state machine implementing the policy of FIG. 28.
Figure 30:
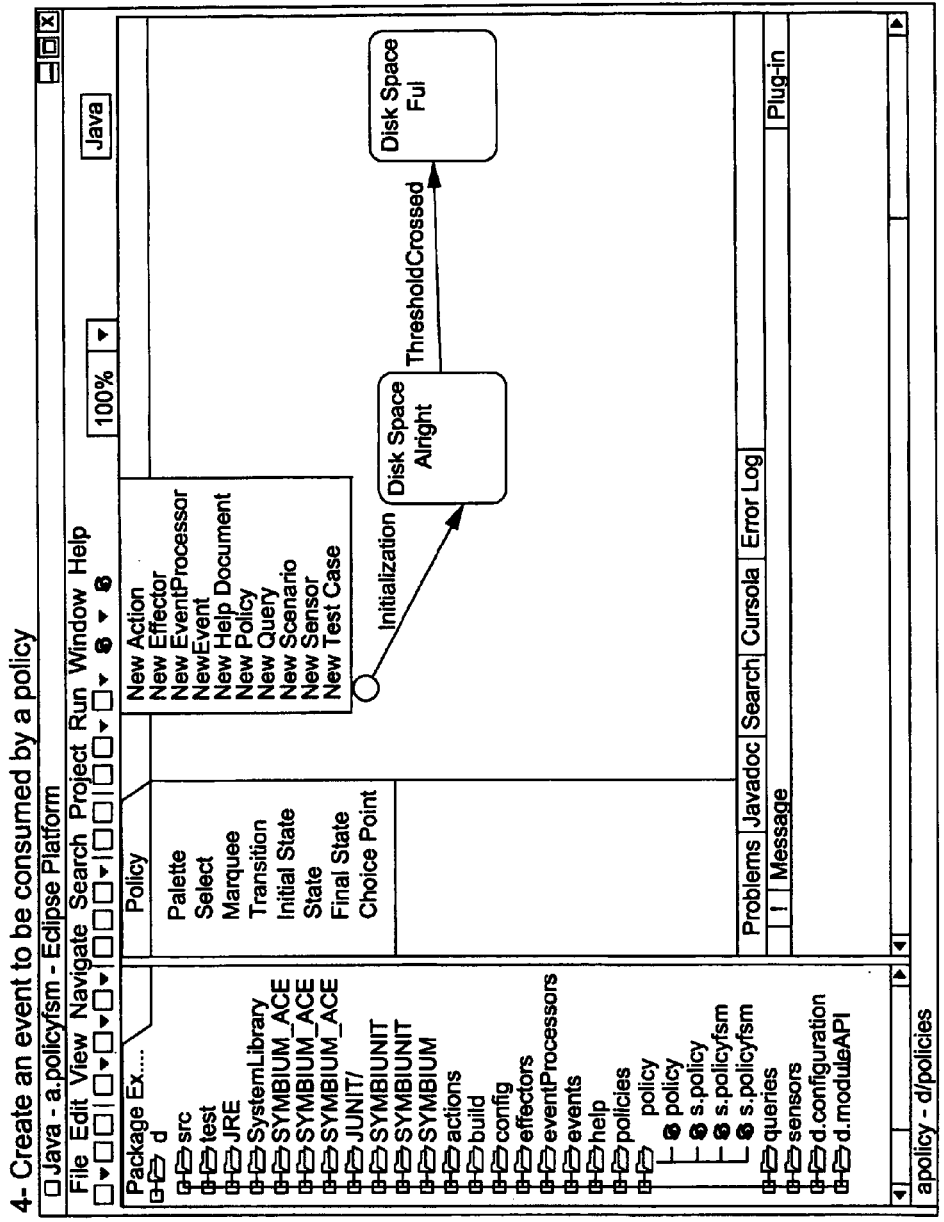
FIG. 30 illustrates a creation of an event to be consumed by the policy of FIG. 28.
Figure 31:
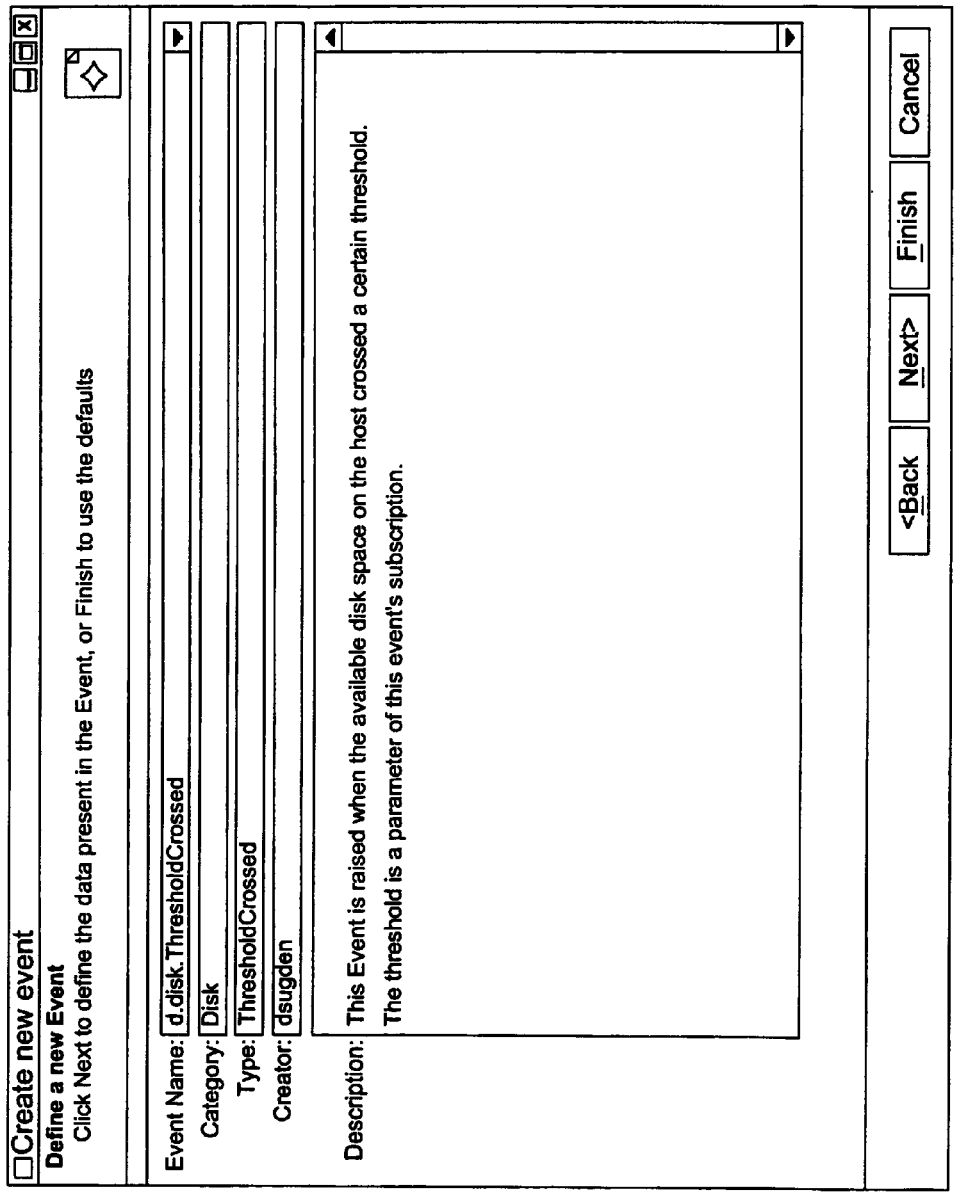
FIG. 31 illustrates a creation of a new event.
Figure 32:
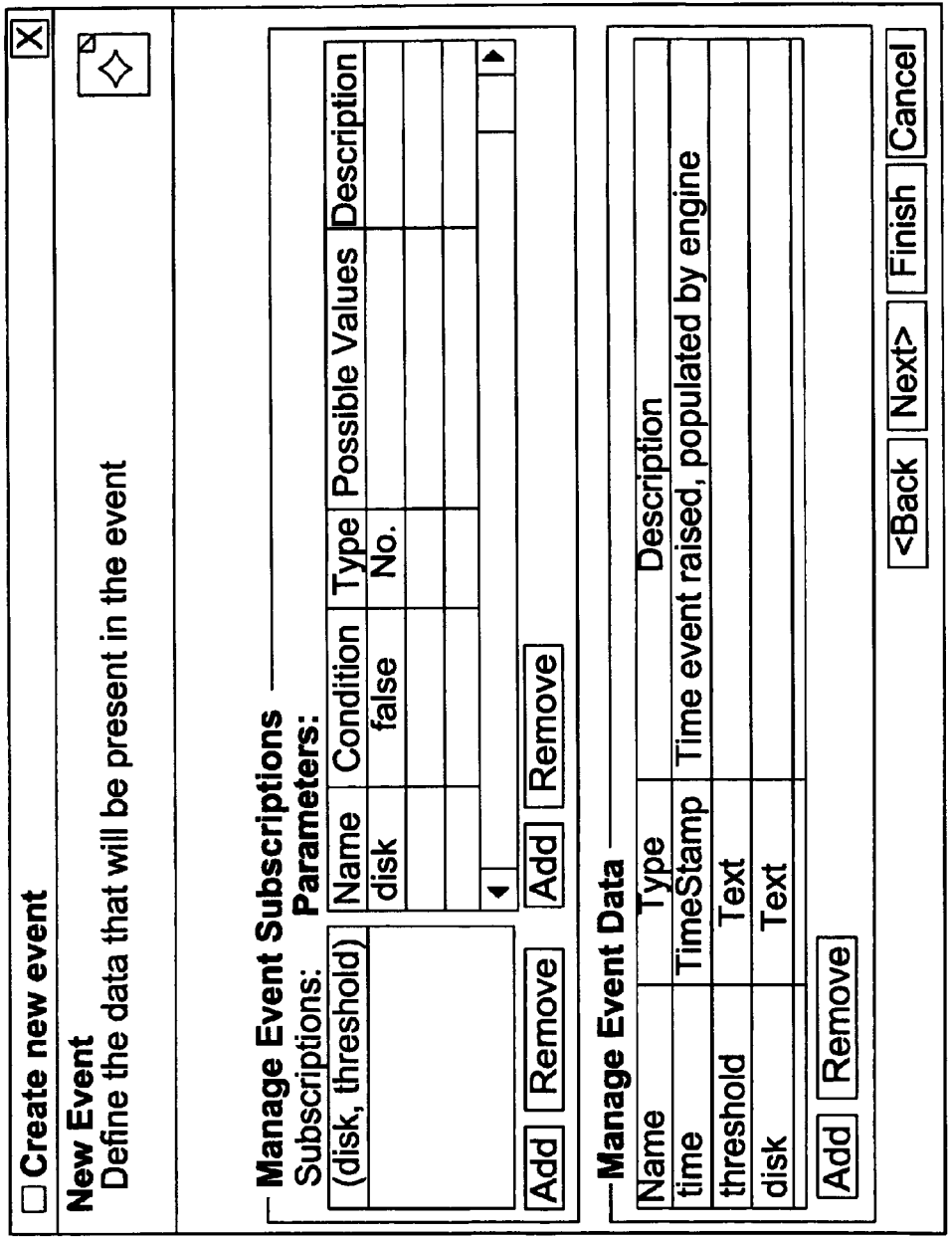
FIG. 32 illustrates how date is defined for the new event of FIG. 31.
Figure 33:
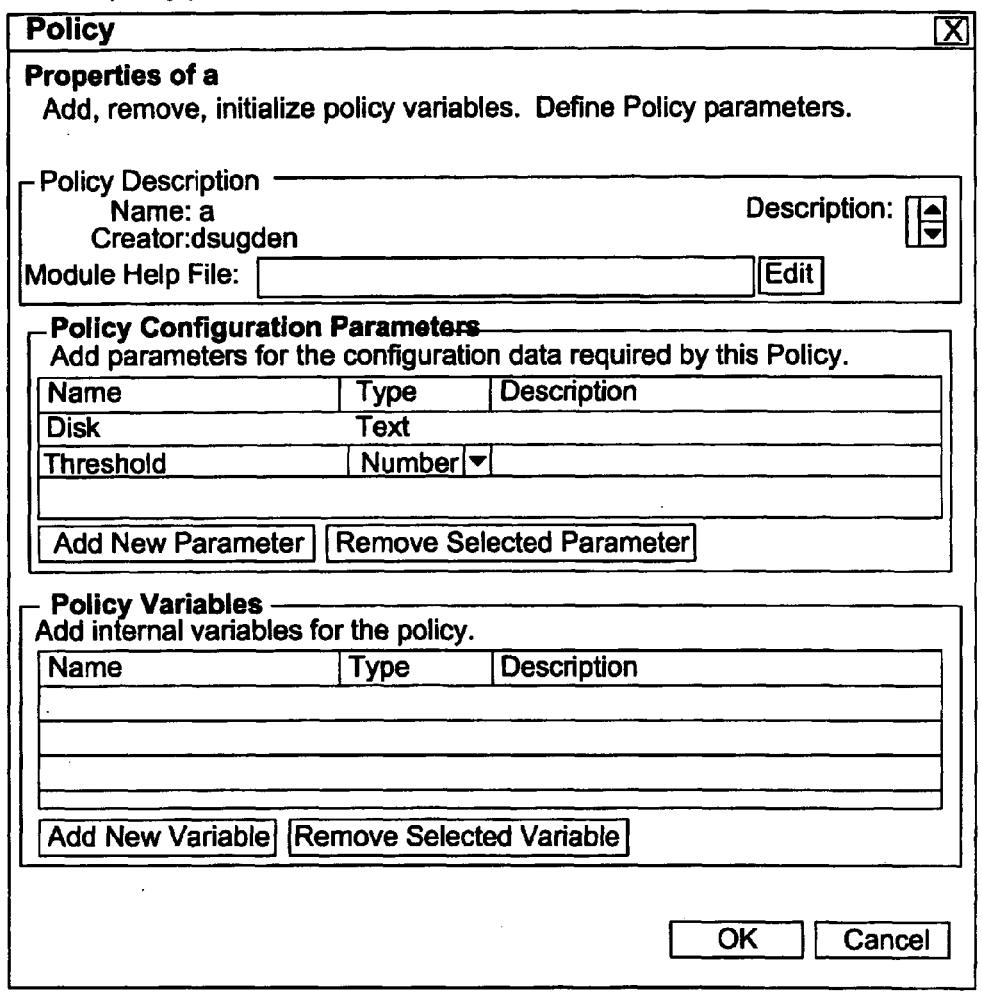
FIG. 33 illustrates editing the policy and defining policy parameters.
Figure 34:
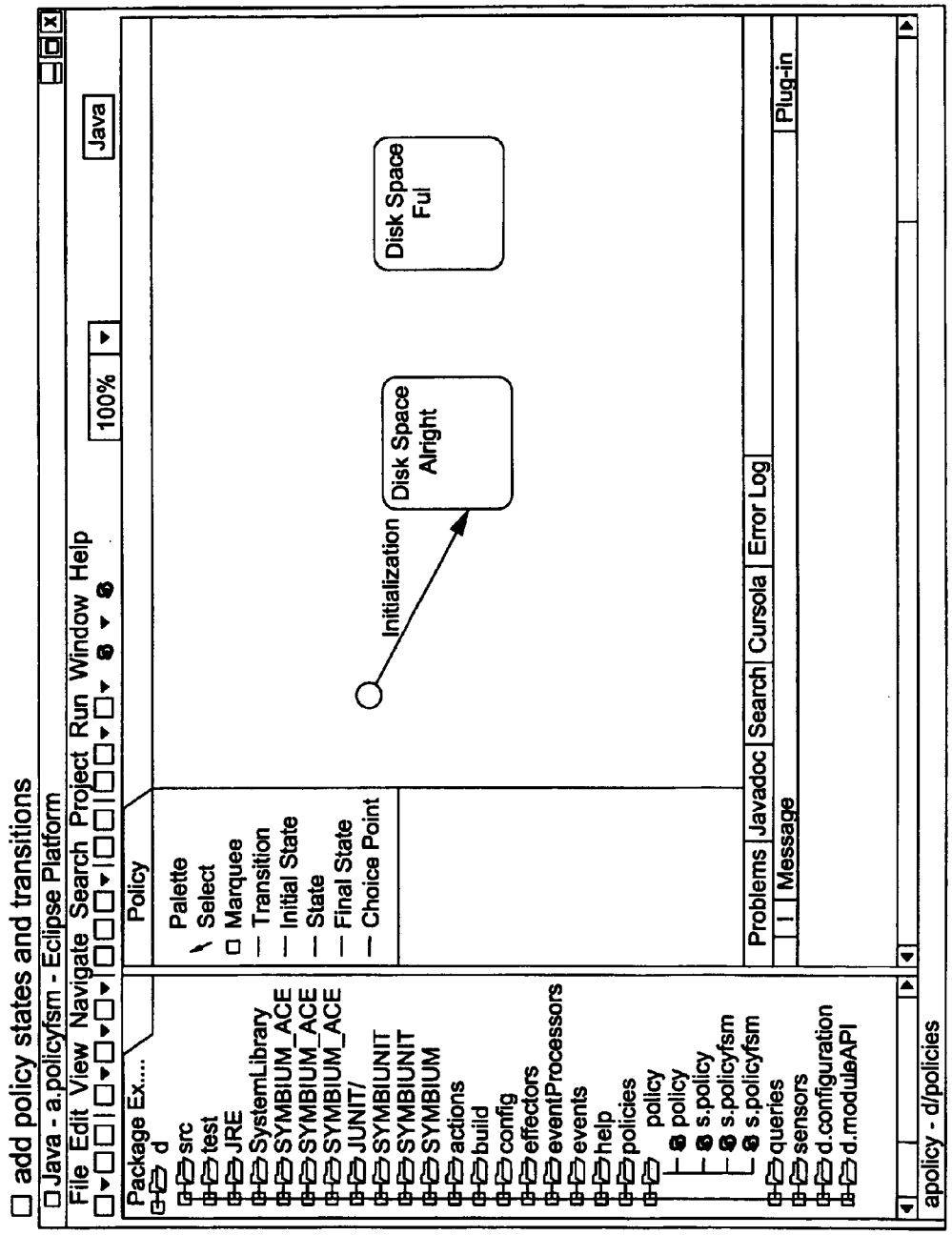
FIG. 34 illustrates addition of policy states and transitions.
Figure 35:
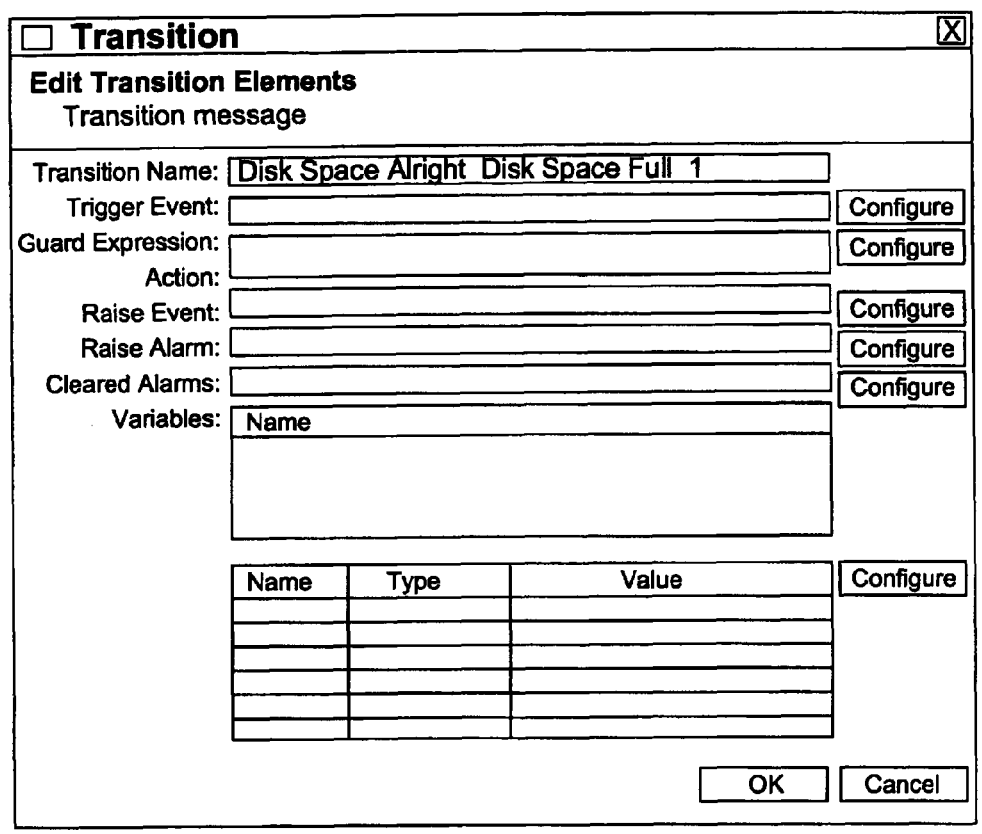
FIG. 35 illustrates editing of the transition.
Figure 37:
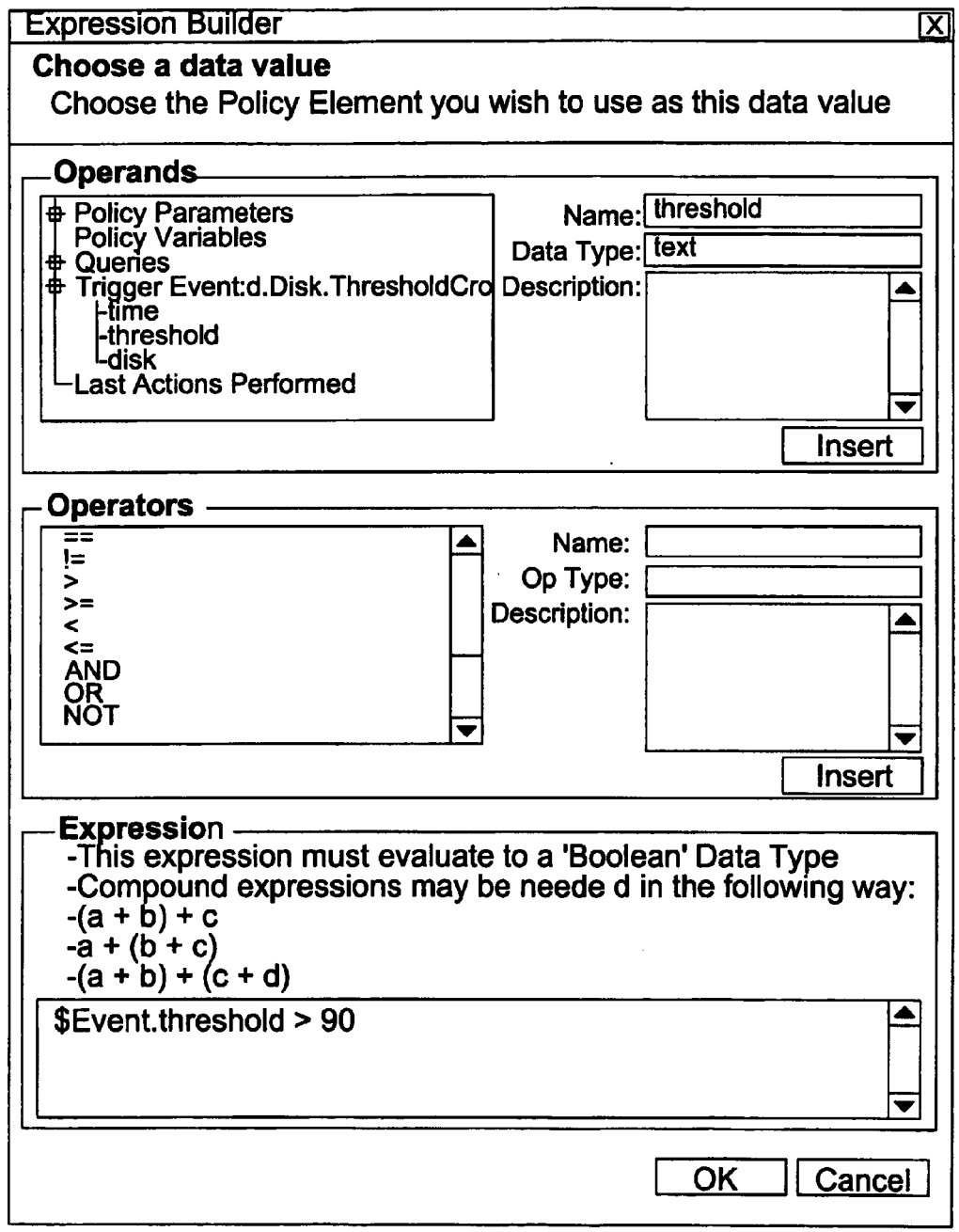
FIG. 37 illustrates an expression builder.
Figure 40:
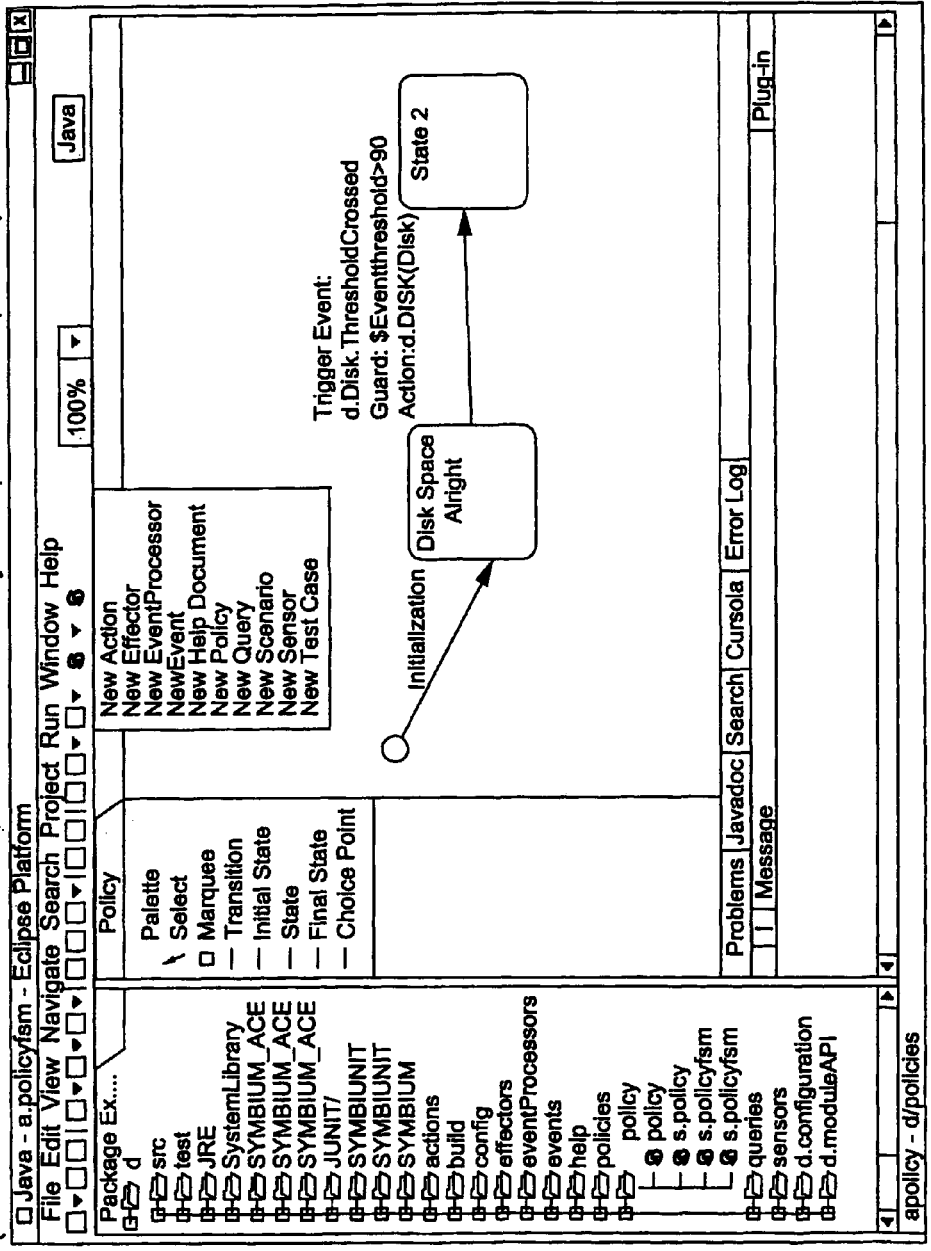
FIG. 40 illustrates a screen capture for a sensor.
Figure 41:
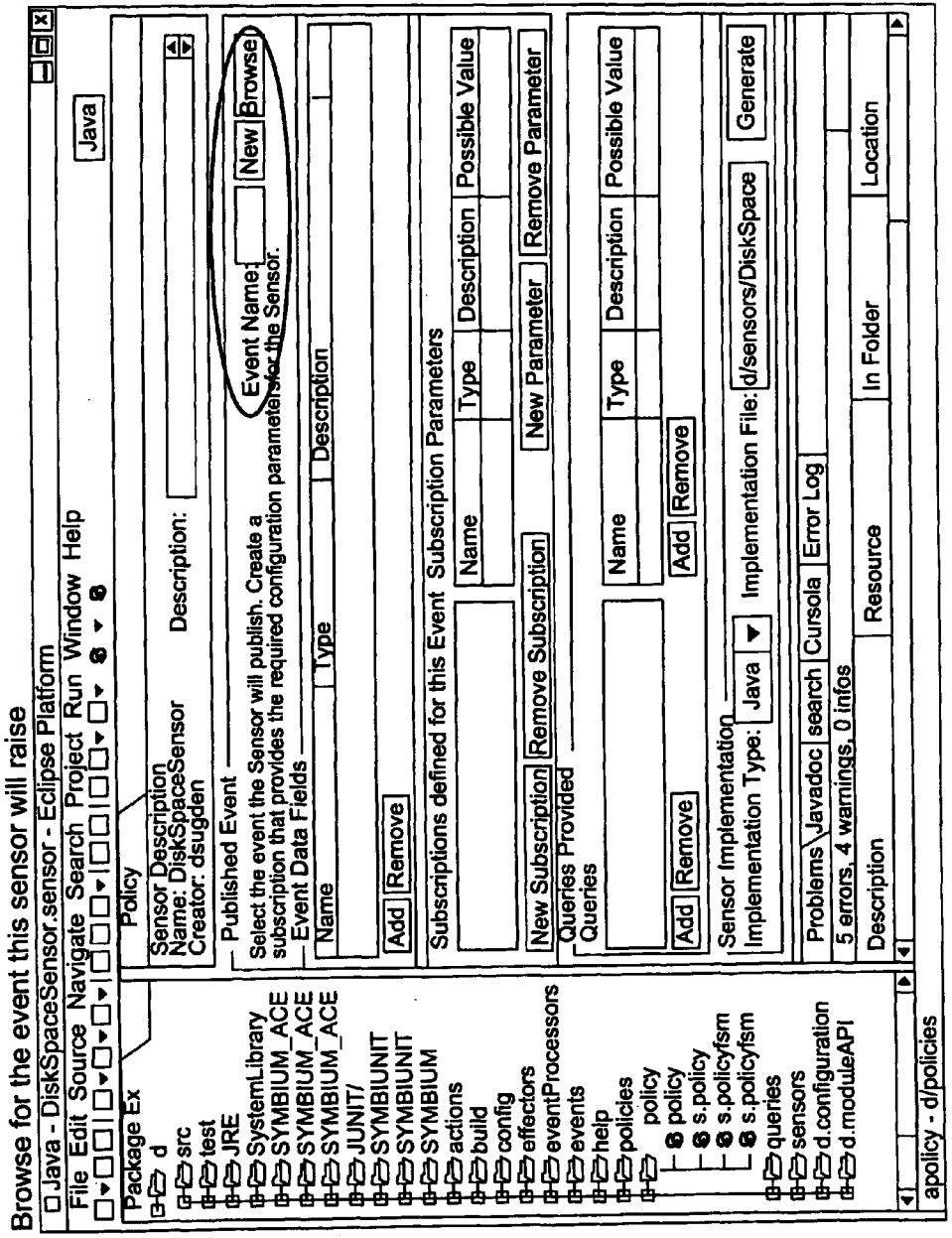
FIG. 41 illustrates a screen capture for a scenario of browsing for the event raised by the sensor.
Figure 42:
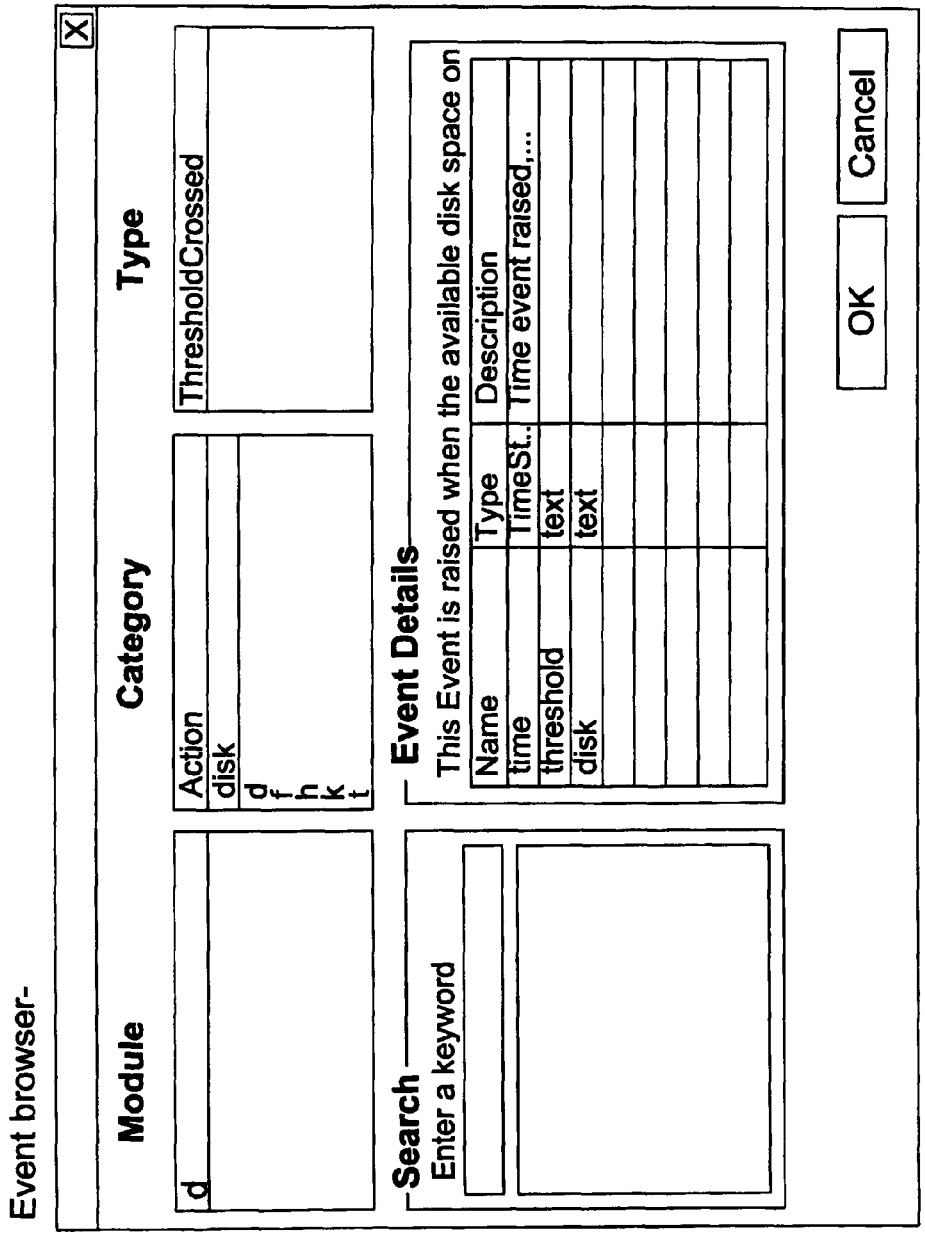
FIG. 42 illustrates an event browser.
Figure 43:
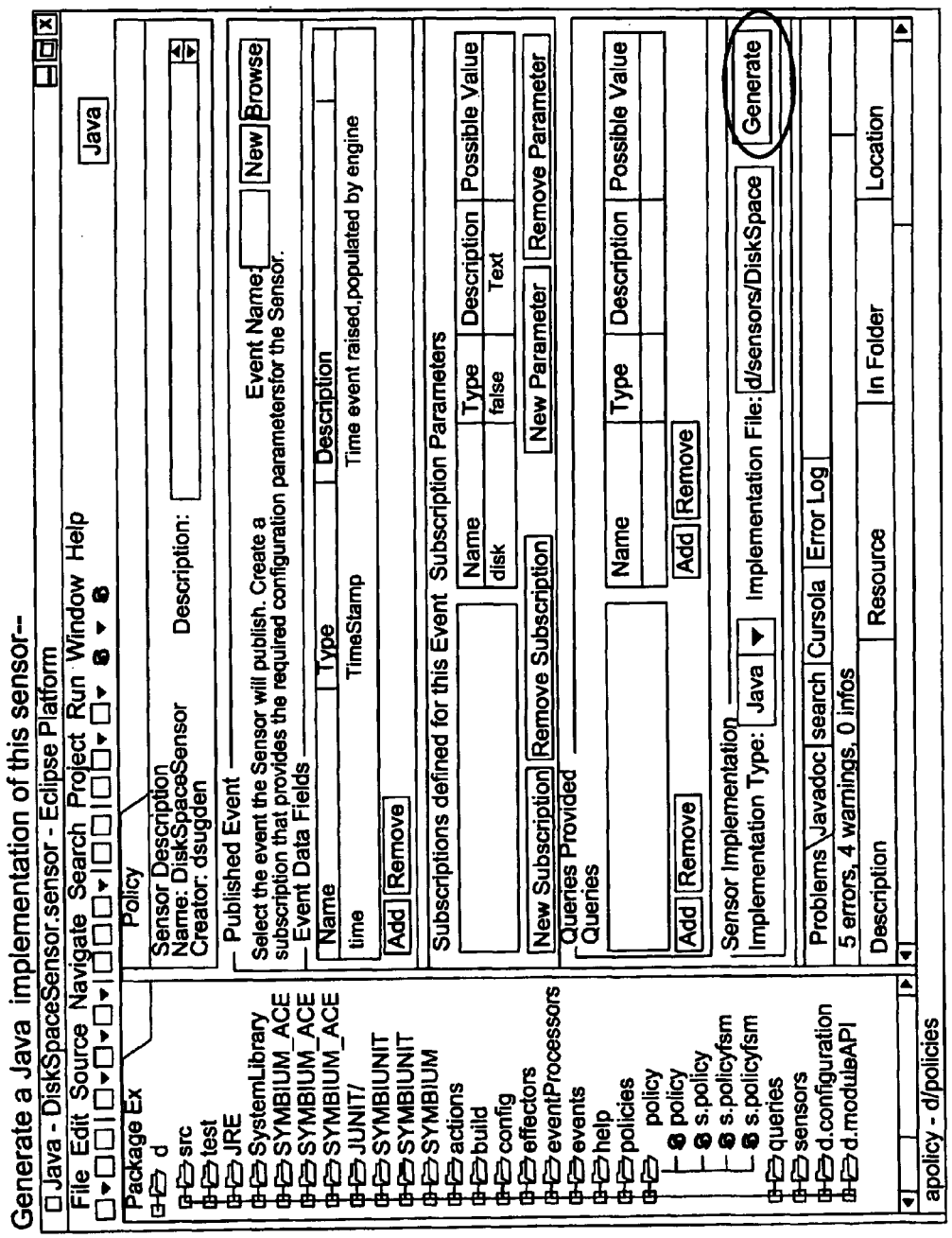
FIG. 43 illustrates a screen capture for generating a Java implementation for the sensor.
Figure 45:
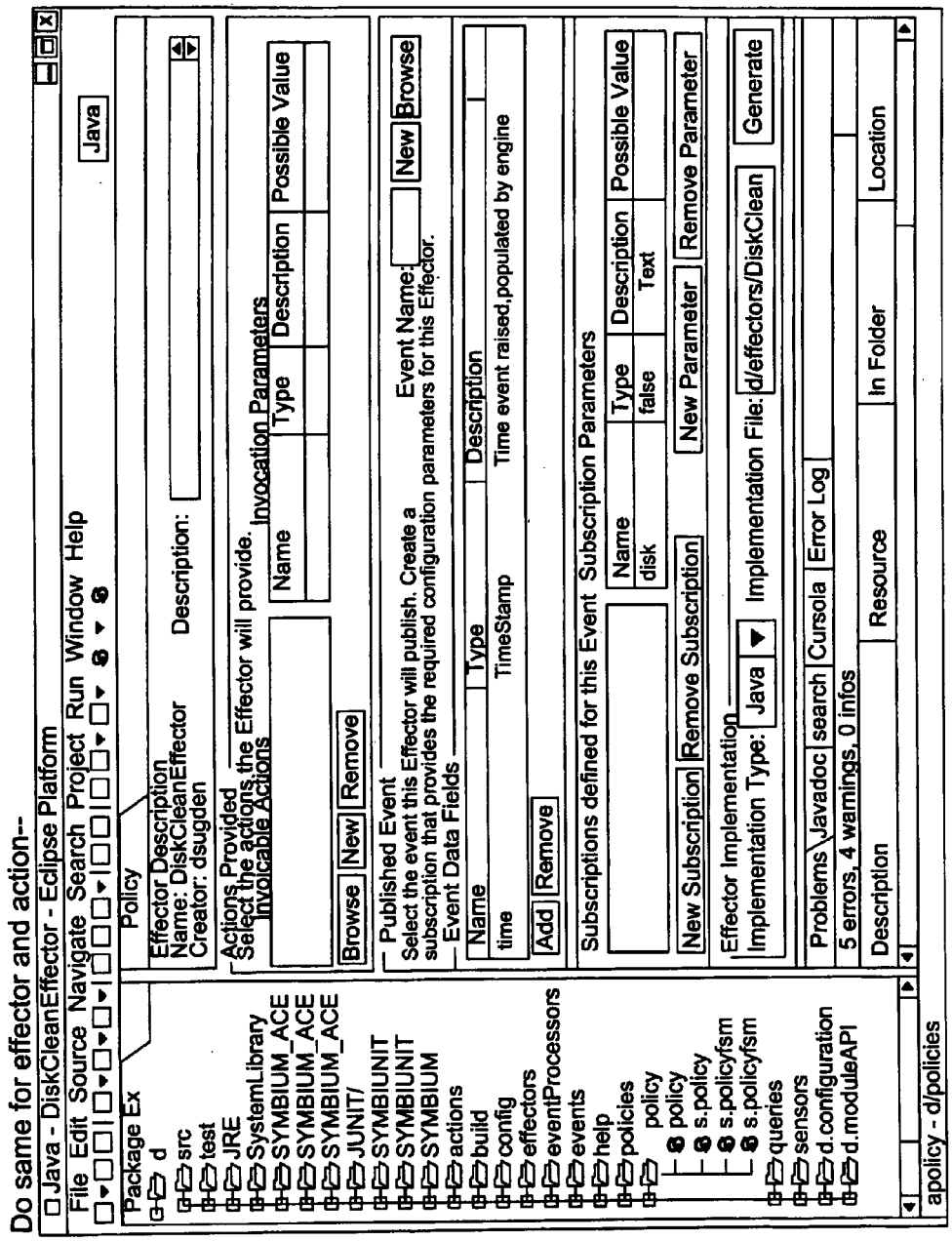
FIG. 45 illustrates a screen capture for generating a Java implementation for an effector and action.
Figure 47:
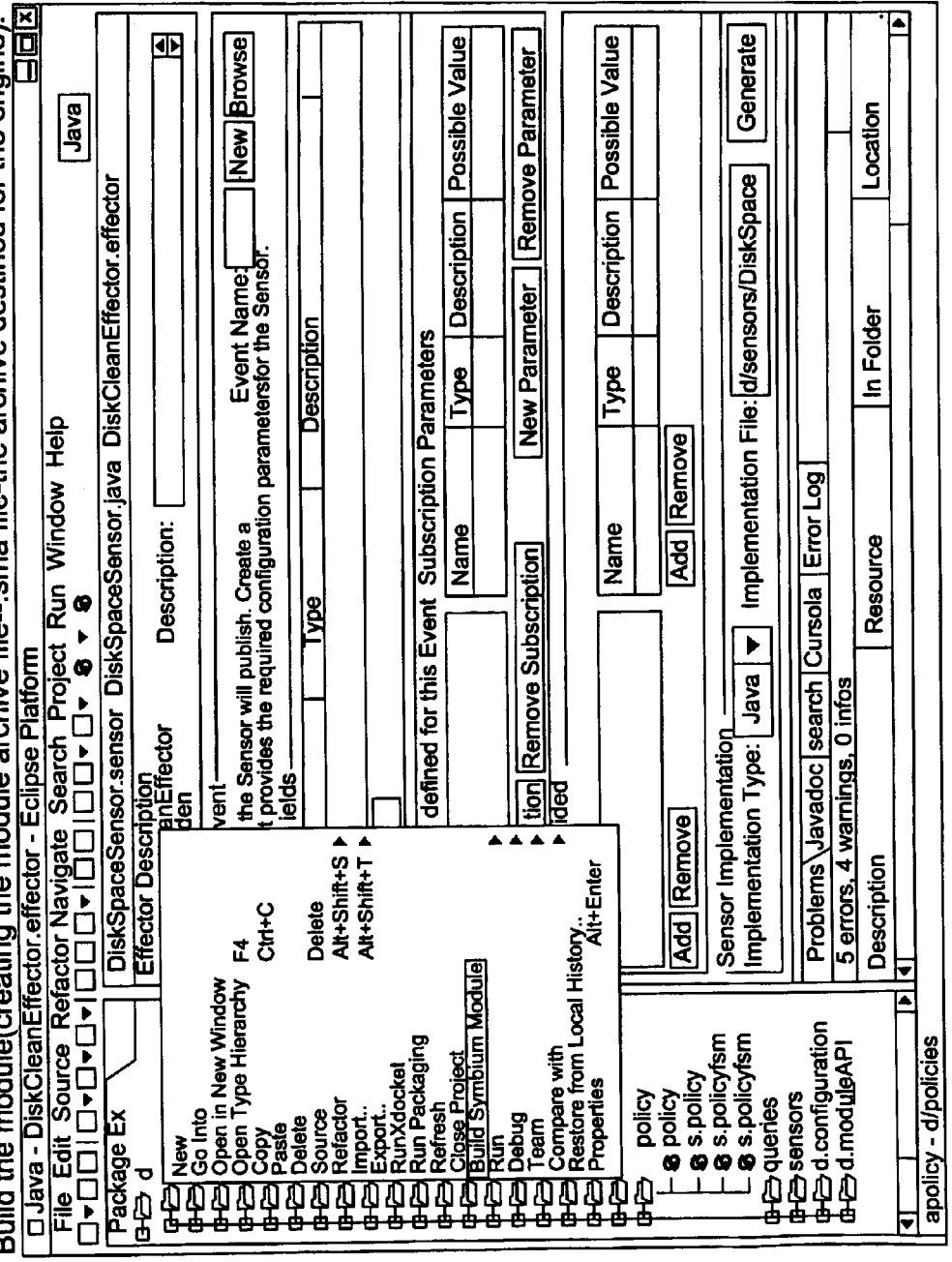
FIG. 47 illustrates a screen capture for building the module, including creating module archive file.

FIG. 18 provides a diagram of overall information flow for management modules created and manipulated within the system. A management module is created within the Module Development Environment. The management module is accessed by the management console. The management console uses meta information stored in the management module in order to render forms and dialogs that allow the management module to be configured for operational use. Once operational knowledge has been added to a management module it is stored persistently; in the current embodiment a digital signature is applied to the module to prevent tampering. Operational use information includes, for example, system administrator contact information such as e-mail address and cell phone. Other information includes the type of a particular field (e.g. string) and enumerations. It will be apparent to those skilled in the art of form construction or reporting systems that a wide range of alternative embodiments are possible.

Figure 3:
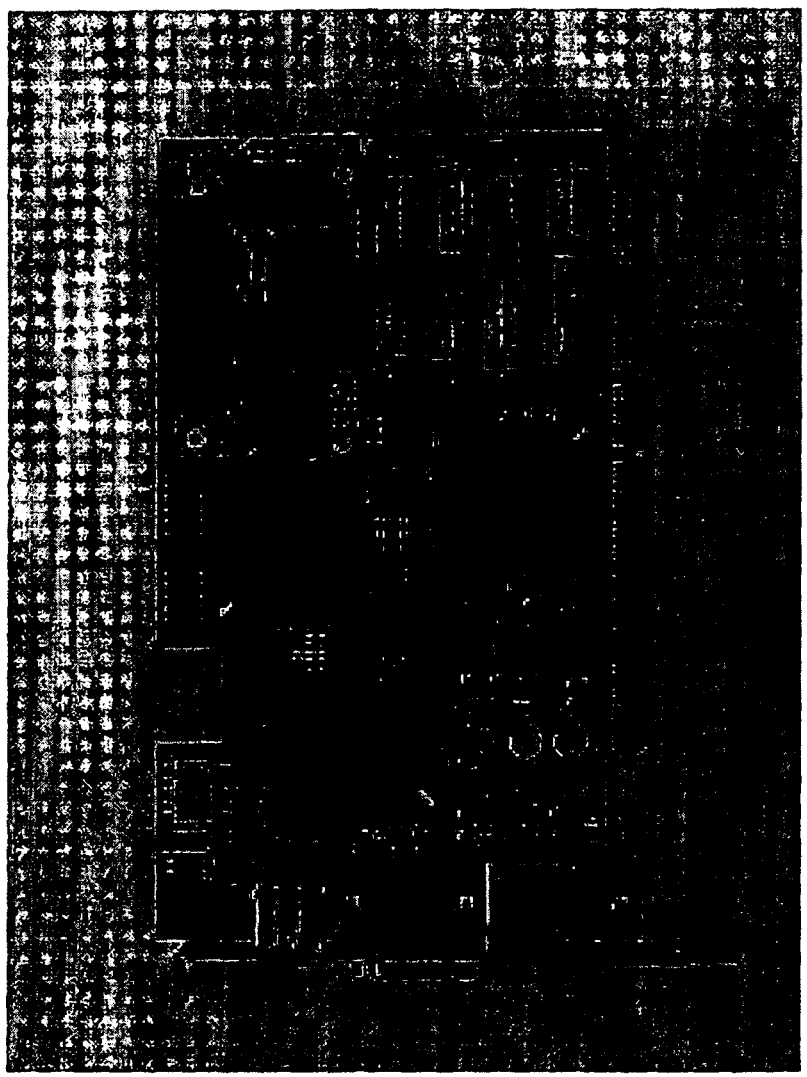
FIG. 3 is a view of the ISAC of FIG. 2.

The Autonomic Compute Engine (ACE) ACE is a central element of the system of the present invention. The ACE includes components appropriate for it to act as an autonomic manager. An important characteristic of ACE deployment is that it should run on a management plane; i.e. an execution environment that shares minimal resources with that of the service plane where the managed applications run. For the most business-critical functions, ACE shares no resources with the service plane and operates in situations when hardware failure has occurred. The ACE is a software program capable of running in diverse environments that include: a virtual machine running on a server, an embedded single board computer that communicates with the host via PCI, USB or non-traditional data communications bus. An OPMA card is another example of a hardware control plane. The ACE is capable of assuming the role of a control plane while subsuming the functions of the network administration system. It may support lights out card functionality, as shown in FIG. 3, if the hardware provides it. Several embodiments of the invention have been instantiated where ACE runs on an OPMA card, a PCI card, a virtual machine running in domain 0 of the Xen virtualization environment and on an embedded single board computer communicating with the service plane over USB. The ACE communicates with the server using either in-band or out of band communications depending upon the embodiment of the invention. For example, if ACE runs on an OPMA card, out of band communication over USB is provided. If running in a virtualized environment, ACE will typically use in-band communications such as would be supported with standard TCP/IP communications. Individuals skilled in the art of data communications will understand that named pipes, shared memory and other forms of data exchange are also possible.

The management console pushes management modules to one or more ACE components. Management modules may be pushed as a result of administrative action or on a scheduled basis. When sent, the management module is retrieved from persistent storage and transferred via an encrypted communications channel such as provided by the HTTPS protocol. Individuals skilled in the art of data communications and data communications security will realize that there are many embodiments that would achieve reliable, secure transfer of the aforementioned management module; HTTPS being the first instantiation used. ACE confirms the receipt of the management module by verifying the digital signature, unpacks the archive, and loads the module. Once loaded, ACE is capable of assuming control of aspects of the host, the operating system or hosted applications for which the management module was designed.

Figure 1:
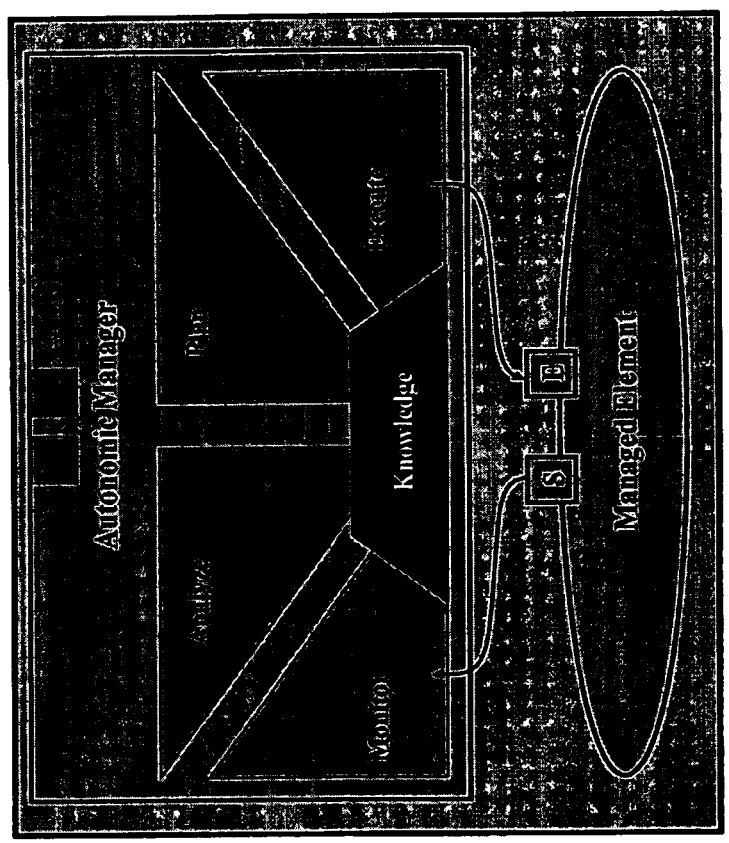
FIG. 1 is a diagram showing an example of an autonomic element to which programming and development infrastructure in accordance with the present invention is suitably applied.

FIG. 1 illustrates an example of an autonomic element to which programming and development infrastructure in accordance with the present invention is suitably applied. ACE is the software component running in the management plane that forms the autonomic element.

An autonomic element 1 of FIG. 1 clearly separates management from managed element 2 function, providing sensor (S) and effector (E) interfaces for management. It should minimally impact the functions of the managed element. While not explicitly shown in FIG. 1, there is an implicit requirement that the managed element should not be able to dominate, override or impede management activity. For example, if the managed element 4 and autonomic manager 2 share the same processor or memory address space this cannot be guaranteed owing to the management of these shared resources by a shared operating system. True autonomy requires a control plane, which has long been the view in the telecommunications domain.

Figure 2:
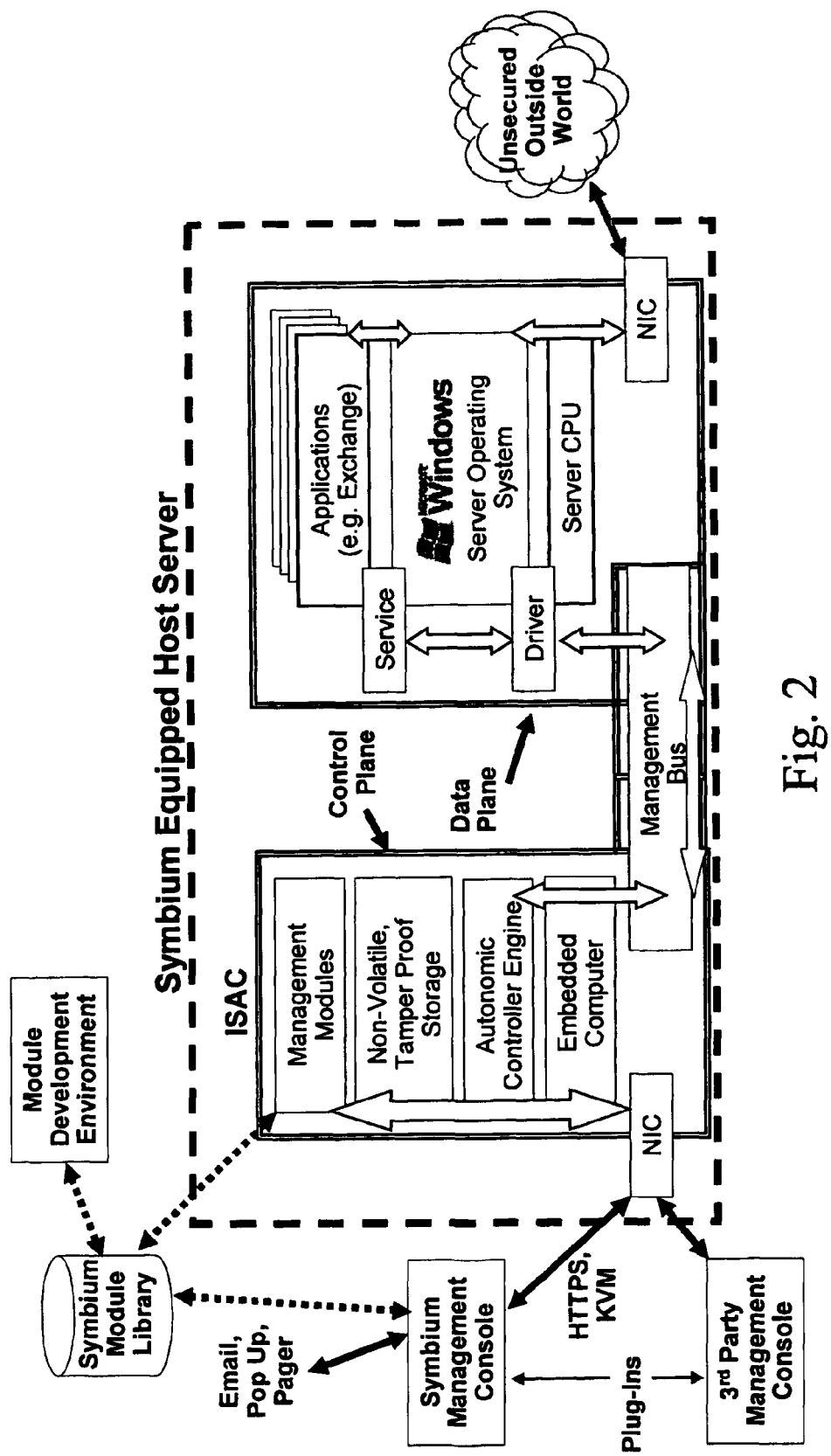
FIG. 2 is diagram showing an alternative architecture of FIG. 1 for the server environment.

FIG. 2 illustrates an alternative architecture specifically for the server environment. While it applies to servers, the architecture generalizes to other devices with a bus architecture. FIG. 2 shows that an autonomic manager (2 of FIG. 1) is instantiated using a hardware and software platform that communicates with the managed element (the server; 4 of FIG. 1)

using an independent management bus 44. A PCI bus is used. However, IPMB may be added.

The responsibilities of the autonomic manager (2) are real-time management of the host hardware, operating system and hosted applications. The autonomic manager (2) runs customizable, policy-based, server/OS/application management software thereby automating IT service management. It performs preventative maintenance tasks, detection, isolation, notification and recovery of host events/faults and records root cause forensics and other operating data of user interest.

In FIG. 2, "ISAC" represents "Intelligent Secure Autonomic Controller". The ISAC 20 is embedded in a control plane 21. The ISAC 20 includes an Autonomic Controller Engine (ACE) 22. Other embodiments of the ISAC concept are ACE running on an OPMA card, on an embedded single board computer connected to a host via USB or running in domain 0 of the Xen virtualization environment.

The system of FIG. 2 is applicable to the server system disclosed in Canadian Patent Application No. 02475387, which is incorporated herein by reference.

FIG. 3 illustrates a view of the ISAC 20 of FIG. 2. The ISAC 20 of FIG. 3 is a PCI-X card-based system that plugs into an available slot on the server.

The ISAC 20 provides for separation of concerns such as:
Fail-safe isolation and recovery of faults
Minimize host resource impacts
Containment of change management risks
Reduced reliance on the network
It also provides host-independent security such as:
Independent policy enforcement
Delineation of administration roles
Tamper-proof "black box" and audit trail
Data persistence The ISAC 20 provides traditional "lights out" card functionality that allows for remote management, such as remote display of host video, keyboard and mouse redirection over the card's network interface card and virtual devices for remote booting; e.g. virtual floppy and CD. These functions relate primarily to management involving human intervention. For details on remote management card design and function, the reader should consult [Ref. 3], [Ref. 4] or [Ref. 5]. The ISAC card 20 has full control of power management functionality and can, through software, cause full power down, power recycling and reset of the server.

Referring to FIG. 2, there are several architectural components in the design. On the host server 30, two software components reside: the PCI driver 32 and the host service 34. On the ISAC card 20, there are several components: operating system, PCI driver, ACE 22 and management modules 24.

Referring to FIGS. 1-2, the host service 34 provides sensor (S) and effector (E) implementations. The lines between the sensor (S) and effector (E) and the autonomic manager 2 are provided by the PCI drivers on the host 30 and ISAC card 20. The knowledge 14 of FIG. 1 is provided by the Management Modules 24 of FIG. 2. The Monitor 6, Analyze 8, Plan 10 and Execute 12 functionality is provided by the ACE 22. It is reasonable to describe the design of the ISAC card 20 embedded in the host server 30 as an autonomic element.

Other software components of FIG. 2 include the Management Console 40 and Module Development Environment (MDE) 42. The responsibilities of these two components are ISAC group management and module creation/editing respectively.

The MDE 42 is used to create and edit management modules. A management module is the unit of deployment of management expertise in the invention. As such, it consists of policies that assist in managing the server and its applications along with utilities to support those policies. Management modules are deployed to one or more ISACs via the SMC. One or more management modules can be deployed to an ISAC. The Module Development Environment and a module distribution environment are used to download the management modules to the ISAC. The module distribution environment is contained within a Management Console. The Module Development Environment creates the modules—called module archives—for distribution. The module archives are customized by the Management Console and send to groups of ISACs. The ACE receives and unbundles the archives. An autonomic manager (as instantiated using the ISAC and ACE) can be configured using the Management Console. Self-configuring elements are included as part of each module archive. These software elements run automatically when the module archive is unbundled and loaded into a running ACE.

1.1 Principles of Design

The design principles for the hardware and software in the ISAC system are described.

Referring to FIG. 2, the ISAC card 20 has full control over the server and can operate with complete autonomy, if required. The card 20, through software, is capable of recycling the server power if necessary and can dynamically change the order of boot devices if necessary in order to boot from a known image.

The ISAC card 20 does not depend upon the host for power but can use power from the PCI bus if present. As can be seen from FIG. 2, batteries are provided. However, the card 20 can also be driven from a wall outlet.

The ISAC card 20 can recycle itself without affecting the host, this being required when certain upgrades occur. Related to this, important state information can be stored on the ISAC card 20; non-volatile memory 26 is provided for this purpose.

Concerning software design, the system is designed to be hot-swappable [Ref.7], [Ref. 8], [Ref. 9]; that is, software elements can be upgraded as new functionality becomes available or bugs are fixed. Software hot swapping may be an important characteristic for autonomic systems [Ref. 10]. The main control principle in our design is derived from Recovery Oriented Computing (ROC) [Ref. 6]; that is, the minimal part of the system will be reset (also referred to as microrebooting) when a hung or fault state is detected [Ref.11], [Ref.12]. ROC has been shown to improve availability [Ref. 13] by focusing on mean time to recovery or repair (MTTR) while allowing for faulty software at all levels of the software stack.

The design of the various autonomic element software components is described.

1.2 The Host PCI Driver (32 of FIG. 2)

Referring to FIG. 2, the Host PCI Driver 32 is the communications conduit through which all data is passed. The conduit supports multiple channels in order to allow for prioritization of data traffic. The lower the channel number, the higher the priority of the traffic. Channel zero is a reserved channel meant for management traffic. This channel is used to synchronize the protocol version running between the two ends of the conduit and to restart communications when either end of the conduit has been rebooted. Either end of the conduit can ask to have the conduit restarted. It is also possible to have a new version of the driver for the host passed from the card to the host in the case of driver upgrade. A restart of the conduit automatically occurs when an upgrade has been performed.

Communications synchronization is transparent to the ACE 22, although it is possible for the ACE 22 to request resynchronization. Resynchronization can occur when the heartbeat expected from the driver is not received within a reasonable amount of time. In this case the driver is restarted on the host; i.e. a microreboot [Ref. 13] is requested. In certain circumstances, the OS needs to be recycled.

1.3 The Host Service (34 of FIG. 2)

Referring to FIG. 2, the Host Service 34 acts as a proxy for the ACE 22. The ACE 22 communicates with the Host Service 34 in order to poll for operational measurements, subscribe for events of interest and manage the service.

Three protocols are supported for operational measurements and event subscription: Windows Management Instrumentation (WMI), WS-Management and a proprietary protocol. WMI is Microsoft's interpretation of the Common Information Model (CIM) and is mature. A proprietary protocol is provided for situations in which a CIM measurement provider is not available or when legacy measurement providers already exist; e.g. printer management for certain vendors using SNMP. Individuals skilled in the art of systems management will be aware that other embodiments for host interaction—such as IPMI—are also possible.

Protocol support within the Host Service 34 is provided through plugins. The architecture is extensible; new protocols can be added dynamically to the service. Delivery of software that implements a new (or updated) protocol is through the control channel associated with the service.

The Host Service 34 also provides mechanisms for acting on behalf of the ACE 22; i.e. it provides the instantiation of effectors for the action requests made by the ACE 22. Effectors include stopping or starting a service or process and rebooting the operating system, for example.

Recovery oriented control is also provided for the Host Service 34. A heartbeat is expected from the Host Service 34. If one is not received within a user-definable period of time, the service is automatically restarted. Should the service not restart, a decision is made by the ACE 22 whether to restart the operating system. While watchdog timer cards can provide some of the functionality provided above, they suffer from a lack of end user programmability.

The Host Service 34 is designed to be extensible and upgradeable. New host service components—dynamic link libraries (DLLs), for example—can be transferred across the management bus and register with the service. These libraries are installed in a well-known location which is accessed when the service starts. When new or upgraded functionality is installed, the Host Service 34 is automatically recycled, which is an event that is detected by the ACE 22. This microreboot request [Ref. 13] ensures that we can upgrade monitoring functionality without interrupting services offered by the host. Upon detection, the ACE 22 automatically ensures that events of interest are subscribed to.

The Host Service 26 occupies a small footprint on the host, typically requiring less than 2% of the processor for measurement operations.

1.4 ISAC Card (20 of FIG. 2)

The design of the ACE software, and the customizability of its behavior via the development of scenarios and policies, is described. It is noted that other components of the architecture play a significant role as well. For example, in the embodiment of the present invention the software resides on a proprietary piece of hardware, a PCI-X card that is installed inside the server to be managed. For example, the card has its own Intel PXA255 processor (similar to those found in a personal digital assistant), which runs a version of Linux as its operating system, as well as a Java virtual machine that supports J2ME, a subset of Java designed to run on embedded devices. In the embodiment of the present invention the J9 Java virtual machine is used; however, the Sun embedded JVM has also been used as has the open source JamVM java implementation. The card 20 also has several other features including its own memory (64 Meg), non-volatile storage (32 Meg), and external interfaces for network and serial (e.g. USB) communications. Although it normally relies on the host's power supply, it has backup power to ensure that it can stay alive even when the host is shut off. For example, FIG. 3 shows the rechargeable batteries carried on board.

Using an independent control plane 21 has multiple benefits; the host system's CPU is not preoccupied with self-management, which would impede its performance and might negate many of the benefits that the autonomous controller can provide. A small portion of the host's resources may be required for the collection of data and its transmission to the card 20, however as much work as possible is delegated to the card 20. Specifically, the Monitor (6), Analyze (8), Plan (10) and Execute (12) functions of the autonomic manager (2) are performed by the card processor, not the host server processor. This configuration is also much more fault-tolerant, as the ACE 22 can remain active even in the case of a server crash, and can still attempt to take actions such as rebooting the server it resides in. As the card 20 is active during the POST of the server itself, it can take actions that are not possible in the case of a software-only on-server solution.

2. Autonomic Controller Engine Design

In order for autonomic systems to be effective, the adoption of open standards may be desired. There is little hope for the seamless integration of applications across large heterogeneous systems if each relies heavily on proprietary protocols and platform-dependent technologies. Open standards provide the benefits of both extensibility and flexibility—and they are likely based on the input of many knowledgeable designers. As such, the widely-used standards tend to come with all of the other benefits of a well thought-out design.

Java is one of the languages for implementation of the ACE 22, for reasons including its widespread industry use, platform independence, object model, strong security model and the multitude of open-source technologies and development tools available for the language. All development was undertaken in Eclipse, for example.

The Common Information Model (CIM) is used within the system in order to obtain information on the managed objects available on the server. Further detail on the use of CIM is described below.

Also, referring to FIG. 2, the extensible markup language (XML) is used for communications with remote managers; such as the Management Console using HTTP (or HTTPS) as the transport protocol. Web-based Enterprise Management (WBEM) is used for card manageability; WS-Management is provided for interoperability with traditional proprietary management consoles such as MOM from Microsoft.

The Open Services Gateway Interface (OSGi) is used for service and management module deployment. Using OSGi ensures that the code associated with two different management modules can be separated (from a namespace perspective). Individuals skilled in the art of class loaders and reflective languages will understand the mechanisms required to achieve namespace separation in a Java Virtual Machine (JVM).

A control plane separates management concerns for the server in the following ways.

It provides an environment which is fail safe. If the control plane fails, the server is unaffected. Contrast this with a software agent approach, whereby an agent running on the server with a memory leak will cause resources on the server to become exhausted eventually, possibly making the server unresponsive. An unresponsive server represents a serious management challenge as remote control through an in-band interface may be impossible. A control plane allows for recovery at many different levels: application, process, service, operating system and various hardware levels. Through an understanding of the dependencies between hardware and software components it provides the ability to reboot the minimum set required to reestablish nominal server operation.

A control plane minimizes the resources required by the management solution on the host. Referring to FIG. 1, in a control plane all processing of sensor information occurs within the autonomic manager and all management state resides there with critical state being stored in non-volatile memory. Contrast this with a software agent approach where multiple agents run on the host. Significant memory and CPU cycles are required in order to monitor state; state which is lost if the host needs to be rebooted. A control plane delivers data persistence for follow-on root cause analysis.

A control plane contains change management risks. The lifecycle of a host involves change, change to applications, services and the operating system. Having a control plane ensures that as upgrades occur, the host can be monitored and upgrades halted if abnormal or unexpected behavior is observed. Upgrading the software running on the control plane does not affect the host at all. Contrast this with the software agent management approach where unexpected behavior in the new version of an agent may make the host unmanageable or significantly degrade its performance.

A control plane does not rely on the network interfaces provided by the host. It uses its own network interface for management communication. No management traffic is transferred over the host data channels, which implies that polling rates for management information have no impact on the bandwidth available for host application traffic.

2.1 Service-Oriented Framework

Since the engine's behavior depends entirely on a configurable list of services to initialize at runtime, as well as the set of modules to be run, a great deal of flexibility and extensibility is provided without the need for rebuilding the engine or writing very much, if any, code. While an application server would have been ideal for this purpose—with web archives being the unit of deployment—the resource constraints of the card necessitated the creation of a thin application framework for management of the lifecycle of services. This is shown in FIG. 4.

Figure 4:
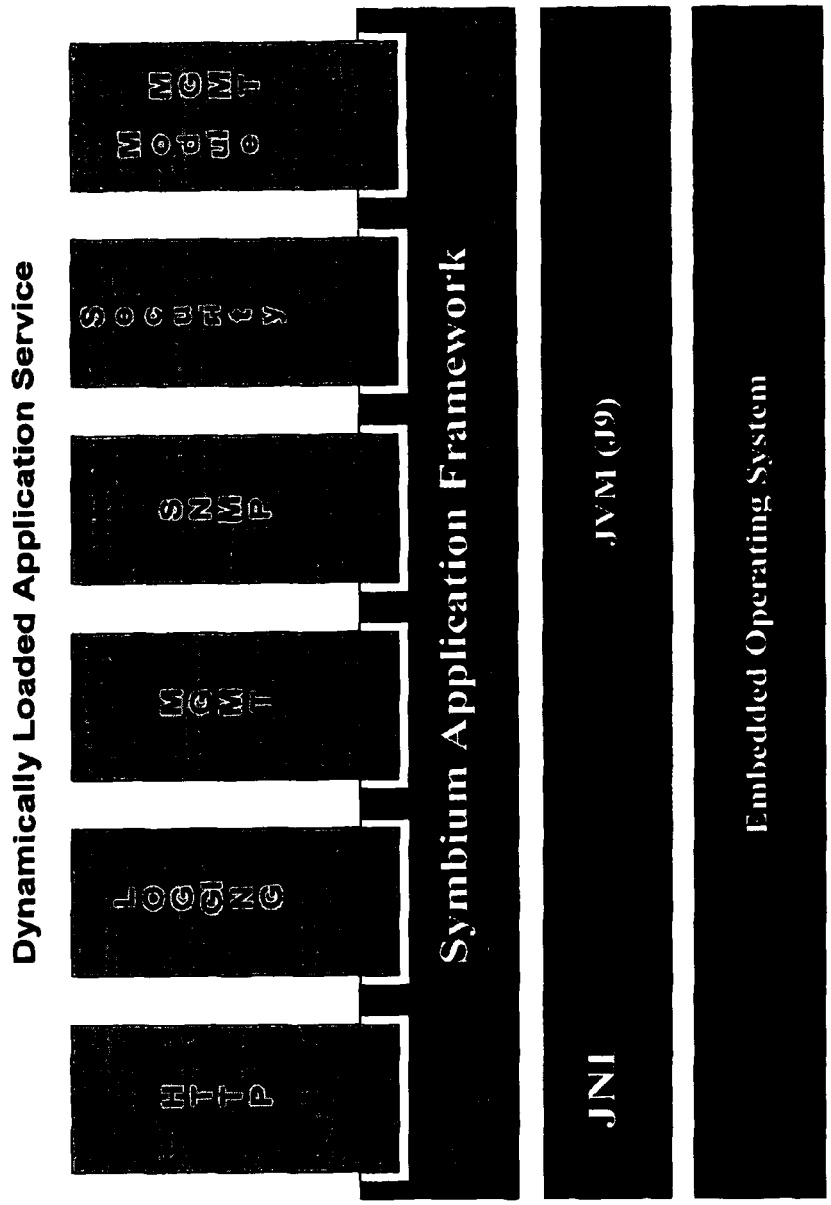
FIG. 4 is a diagram showing an application framework for management of an application.

The application framework 50 of FIG. 4 ensures that services are restarted if they fail and maintains dependencies between them. The application framework 50 is also responsible for management of the application itself. The framework 50 runs on top of the J9 JVM (other embodiments use the JamVM JVM); the Java Native Interface (JNI) being used to interface with the various drivers (e.g. PCI communications driver) that are implemented in the C programming language. Services can be plugged and unplugged dynamically; i.e. hot swapping is supported. Before a service is swapped, it stores is current state on disk. When the new service is loaded, it restores state from persistent storage. Mechanisms for hot swapping are described in [Ref. 7, 8, 9, 10]. Services are arranged in bundles, with bundle lifecycle management being the responsibility of the OSGi [Ref. 14] standard implemented by the Services Management Framework (SMF) built by IBM. Other open source implementations of the OSGi specification are available (e.g. OSCAR); other embodiments of the invention have used Knoplerfish [Ref. 25], for example.

The OSGi is an effort to standardize the way in which managed services can be delivered to networked devices. It is being developed through contributions by experts from many companies in a wide variety of fields (such as manufacturers of Bluetooth devices, smart appliances, and home energy/security systems). An open specification is provided for a service platform so that custom services can be developed (in Java), deployed, and managed remotely.

The OSGi Service Platform framework specifies how applications should be bundled, the interfaces they must support, as well as a set of standard services that must be provided for use by applications. A security model, namespace scoping, and specifications for interactions between running services are some of the features also provided.

Management Modules (26 of FIG. 2)—the units of management knowledge in the system—are OSGi bundles too. This use of OSGi ensures that one module cannot clash with another as bundles are managed in separate namespaces. Extensive security facilities are also provided by OSGi. Individuals not skilled in the art of OSGi should consult the OSGi whitepaper [Ref. 15] for further information of OSGi architecture and services.

Several services have been implemented for the ACE 22, which include: a managed object manager service, host communications service and module management service. Appendix 1 provides further details on the services implemented.

Figure 5:
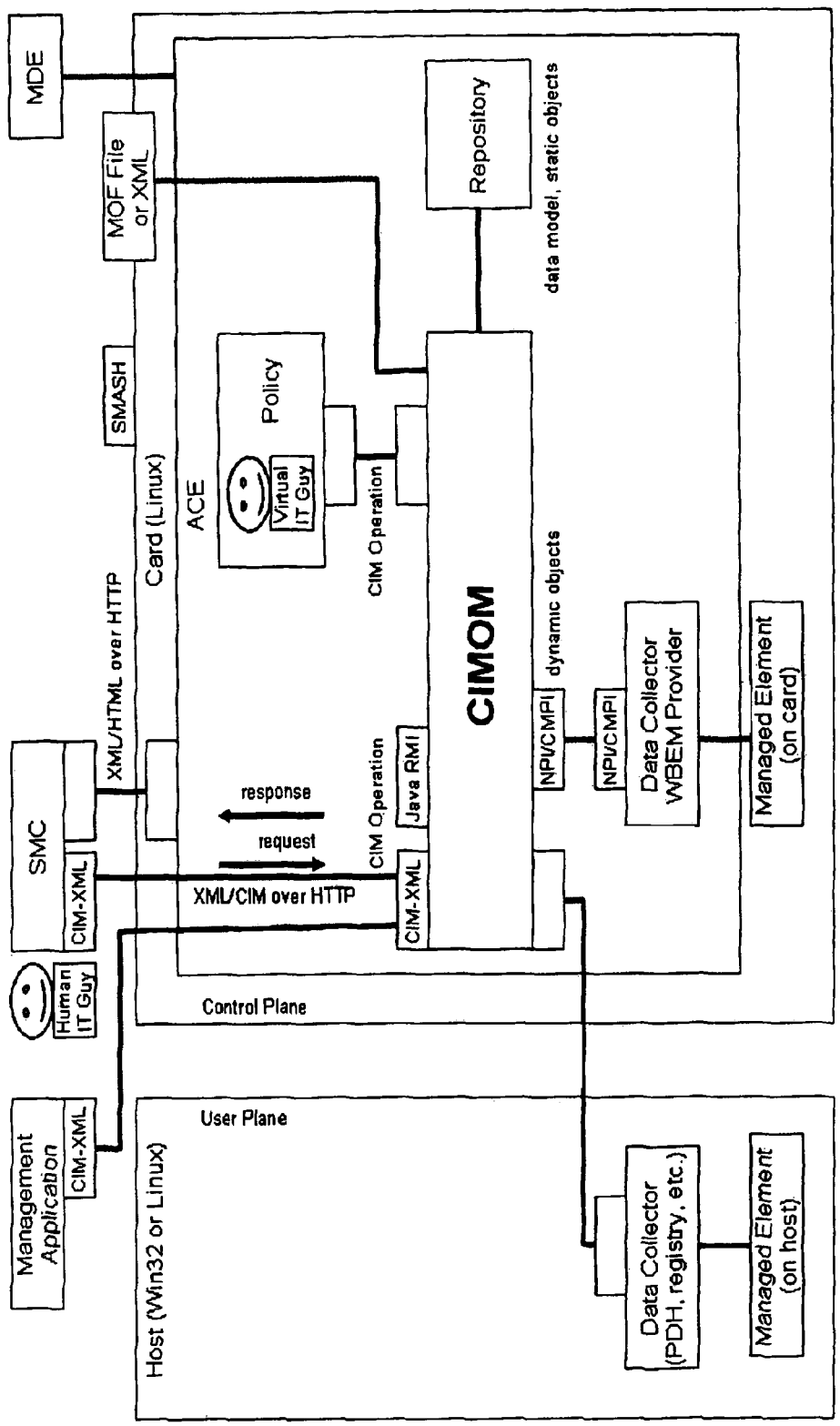
FIG. 5 is a diagram showing a Common Information Model Object Manager (CIMOM)

The managed object manager service is a thin version of a Common Information Model Object Manager (CIMOM) 52 as shown in FIG. 5. A full CIMOM on card may be difficult owing to the resources that are required to sustain it. However, standard WBEM interfaces are provided in order to ensure easy integration with enterprise management systems. Specifically, CIM-XML is supported. The design of the simplified model is described below. WS-Management has been provided as a service in an embodiment of the invention and this service exposes managed objects maintained by ACE.

The host communications service has been designed for the current form factor and communications bus. However, although the autonomic controller has originally been designed to be placed on a PCI-X card in a host machine, there is really only one service responsible for host communications. All communications services maintain the same interface, thereby insulating managed objects that need to communicate with the managed system from protocol or transport medium changes. Another service adhering to the same interface could be quickly written and deployed which would allow the controller software to run directly on the host, perhaps obtaining information using WMI (for a Windows host) instead of through a performance counter, for example. Alternatively it would be possible to implement the same interface as a simulator, providing support for testing and development even when hardware is unavailable.

Figure 13:
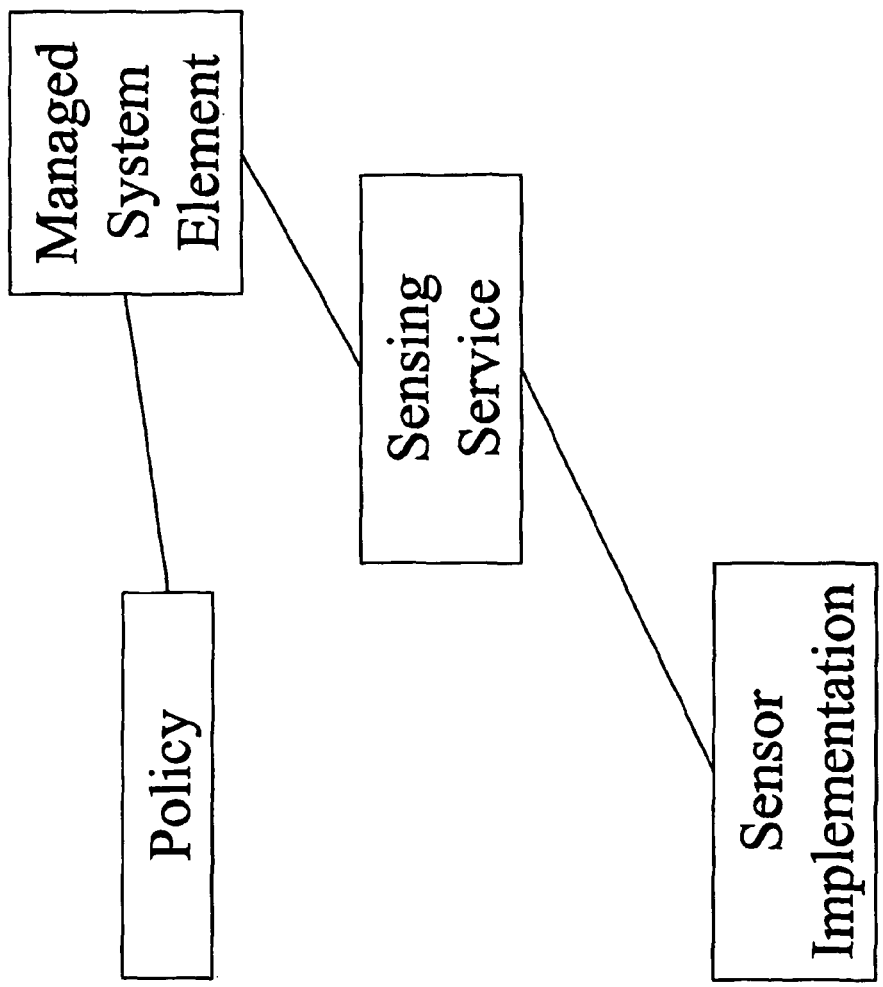
FIG. 13 is a diagram showing how policies are connected to sensors. A policy essentially listens to changes in one or more properties of a managed object. A managed object registers with the sensor layer for appropriate information. Sensor implementations are responsible for retrieval of information and interact with a service on the host platform.

FIG. 13 indicates the nature of the interaction between managed objects and sensors. Managed objects connect their observable properties through the sensor lookup service which connects them to a sensor implementation. This separation ensures that the same managed object can be reused in environments where the observable property is obtained through a different access path. For example, CPU utilization is an observable property of the CPU managed object. Under Windows this property may be obtained through WMI or via access to a performance counter. Under linux, /proc used to access performance measurements. Two different sensor implementations can be used for Linux and Windows. However, the CPU managed object can be used unchanged between the two environments—a binding between observable property and sensor being made dynamically at run time. This separation of interface and implementation will be familiar to individuals skilled in the art of Common Object Model (COM) programming.

The module management service is responsible for loading, unloading and general lifecycle management of modules—the units of management expertise in the system and the knowledge component (14) shown in FIG. 1. The module management service is responsible for creation of the run time model, which is a hybrid of event propagation and rule processing in an embodiment of the invention. Finite state machine and simple if-then-else instantiations of module policies have also been created. Individuals skilled in the art of knowledge representation, expert systems and reasoning paradigms will realize that many Turing-equivalent formulations of policy are possible; one embodiment only is described here.

Figure 16:
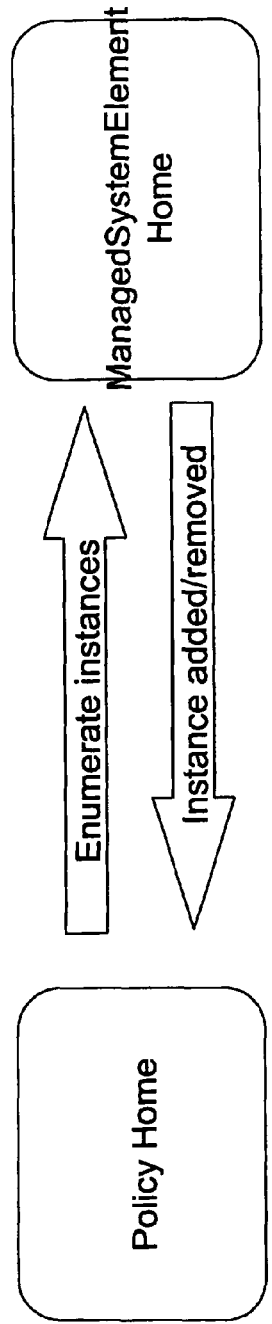
FIG. 16 is a diagram that shows the interactions between policy homes and managed system element homes. Home objects are used to managed the lifecycle of instances of appropriate types within the system.
Figure 17:
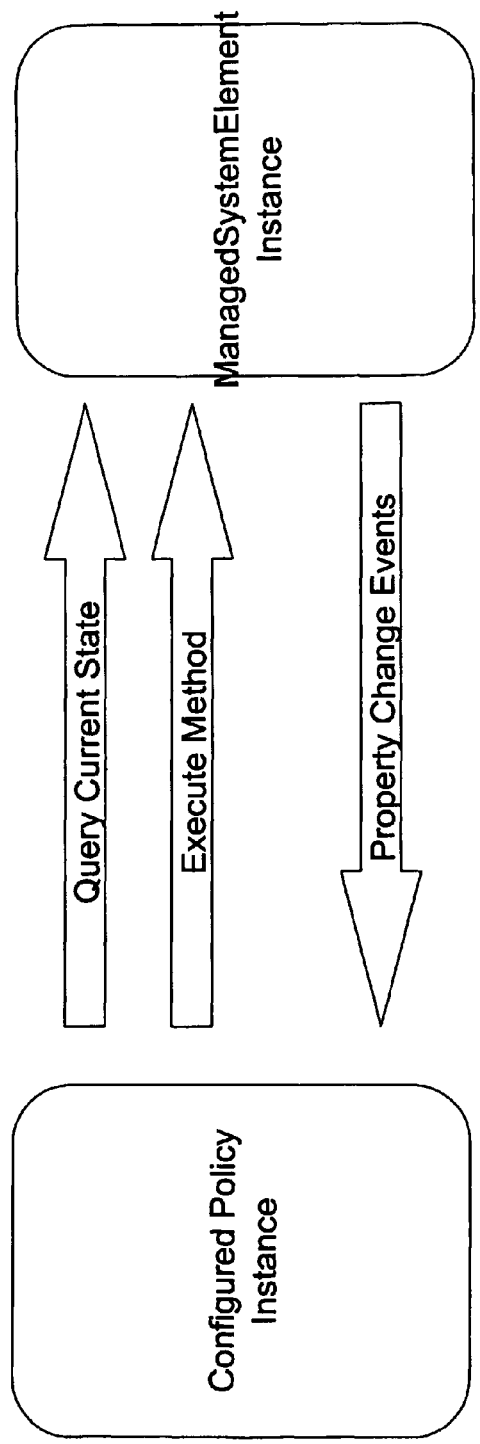
FIG. 17 is a diagram that shows the interactions between policy instances and managed system element instances. The lifecycle of instance objects is the responsibility of home objects within the system.

The previous paragraph has described a number of alternative module policy representations. All policies support the same interface thereby hiding the internal structure. Policies are similar in intent and structure to CORBA 3.0 components or the more familiar Enterprise Java Beans (EJBs). They possess policy homes that are responsible for the lifecycle of policy instances and configuration (or deployment) information that describes what managed objects and events they are interested in. FIG. 16 provides a high level view of the interaction between policy homes and managed object homes. The module management service is responsible for resolving links between policies and managed objects in order to create a runtime environment where changes to observation properties are correctly routed to managed objects and the policies that are interested in them. FIG. 17 provides a high level view of the interaction between policy instances and managed objects. Individuals skilled in the art of application server environment design or CORBA 3.0 middleware design will be aware of the details involved building the runtime interaction graph.

FIG. 19 provides details on the interactions that occur between policy and managed system element (aka managed object) home objects. This figure, in particular, describes the mechanism by which new policies are created when managed system element changes are detected; for example, a new disk is added or a user requests the monitoring of a new service. FIG. 20 provides details on the interactions that occur between policy and managed system element instances.

2.2 Security

The design of an autonomic element has to pay special attention to security. The control plane approach to autonomic element design has particular advantages in this regard.

Through use of a Linux distribution, a firewall is automatically provided. Authentication to the card is provided by a pluggable authentication module (PAM). In the embodiment of the present invention, a simple user-id-password system is provided. However, it may be integrated with enterprise class LDAP-based authentication mechanisms. As shown in FIG. 2, all communications to and from the server is encrypted using SSL, with the card certificate being pre-installed on the ISAC 20. Further application level security is provided through OSGi, where bundles can be run in different class loaders and considerable control of inter-bundle interaction is provided. Monitoring of management module activity is also provided by a built-in management module.

Security of managed elements is of increasing concern in today's IT world. New viruses, worms and trojans are reported daily and writers of these pieces of software exploit flaws in the operating system or applications or rely upon social engineering to achieve their goals. Malicious software ("malware") writers have become increasingly sophisticated in their attacks on the operating system and hosted applications to the point where deployed anti-virus software can be either shut down or removed from the system entirely. This is possible as a result of the privilege levels associated with the entity (user) responsible for running the software. Having an independent control plane enforcing security policy makes it impossible that a piece of malware can circumvent security and enforcement becomes the responsibility of the control plane.

A further advantage of the control plane is that the security model employed becomes independent of the model used within the operating system on the host. This independent security plane makes coherent security policy enforcement possible; that is, regardless of the operating system running on the host, the same privilege levels apply. Separating security responsibilities also implies that separation of administration roles takes place. Any attempt to compromise the security of the host such as changing the privilege levels of a user applies only to the operating system; the control plane remains unaffected. With incidents of malicious intent by seemingly trusted IT insiders being commonplace, independent security enforcement as delivered by the control plane is critical.

Yet another benefit of using a control plane versus traditional software agent-based approaches is that remotely managed systems do not require the puncturing of their site firewall(s) to allow for the transmittal of (often sensitive) data to a central management console for analysis. The control plane can provide fully autonomous, localized data analysis and policy enforcement; all without burdening the managed system and associated network compute resources. For situations where reporting to a central management console is desired, the control plane can report up meaningful events of interest to the console and not a large volume of raw observations like traditional software agents.

In a secure system, audit information is collected and made available for review at some later time. In an audit log stored on the host, intrusive activity may rewrite or delete important forensic information. When a control plane is present, logs may be written to non-volatile storage and cannot be accessed from the host directly. Furthermore, the timestamp on the logs need not be generated from the host clock, which itself may be affected by intrusive behavior.

2.3 Module Development

Environments for the creation of autonomic managers have been proposed [Ref. 16]. Sterritt, in [Ref. 17], describes the event correlation requirements for autonomic computing systems. In [Ref. 18], FIG. 1b, the requirements of an autonomic manager are described in terms of the functions that they must perform. Of particular interest to this paper is the requirement for rules engines and simple (event) correlators. The design described here provides both of these elements.

Event correlation [Ref. 19] has received significant attention in the research community over the last 15 years, with dependency graphs [Ref. 20] being a significant mechanism for root cause analysis determination. Event propagation systems have been constructed, with the Yemanja system [Ref. 21]. The Yemanja system promotes the idea of loose coupling rather than explicit graphs, which we find appealing as it reduces the need to maintain accurate dependency graphs. From [Ref. 21]: "Yemanja is a model-based event correlation engine for multi-layer fault diagnosis. It targets complex propagating fault scenarios, and can smoothly correlate low-level network events with high-level application performance alerts related to quality of service violations."

The key concepts built into the autonomic manager in accordance with the embodiment of the present invention are described below.

2.4 Module Components and Concepts

The ACE 22 was designed to be extensible in many ways. One of the primary requirements is the ability to define and implement customized behaviors based on user-defined management scenarios without rewriting or rebuilding the engine itself. Therefore, management scenarios compile to Java classes that become part of the running application once loaded. Reflection and garbage collection (at the class level) within the Java language ensure that interactions between policies (and their supporting components) can be established dynamically at runtime. Furthermore, links can be broken and recreated when a new or upgraded version of a policy is installed. Individuals skilled in the art of reflective Java programming (or languages providing similar capabilities) will appreciate how a dynamic structure could be created with Java bean components, for example. Similarly, individuals knowledgeable in the use of Java Management Extensions (JMX) for management would understand how the above might be implemented. While the embodiment described here does not use Java beans, the principles are similar.

Figure 6:
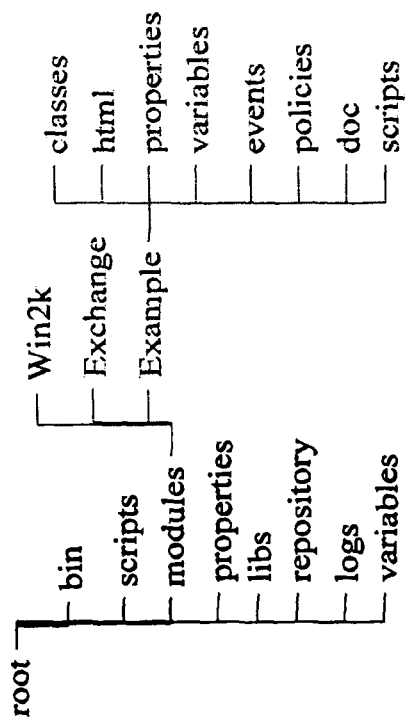
FIG. 6 is a diagram showing the module archive structure of a management module.

Referring to FIG. 2, the management module (or module) 24 comprises the knowledge component 14 of the autonomic manager 2. In the embodiment of the present invention, a module is instantiated in a module archive, similar in structure and intent to a web or enterprise java bean archive used by application servers. A partial example is shown in FIG. 6. The module archive is a directory structure of a standard format that contains classes and resources that encode a management scenario of interest. The module archive also contains dynamic link libraries that may be required in order to augment the low level instrumentation on the host and HTML documents that allow a user to interact with the run time version of the module for purposes of configuration.

From an autonomic manager's perspective, the module 24 is comprised of a set of scenarios related on a conceptual level—for example there might be a module defined to manage printers, another to audit host performance in order to establish normal levels of resource consumption, and a third to enforce host-based security.

A scenario encompasses data and host information to be monitored, as well as the processing of this information: conditions, filters and thresholds to be satisfied, and actions to be taken, for instance events to be logged and alarms to be raised. The modules 24 are completely pluggable, meaning that they can be installed, updated or reconfigured at runtime, and require no modifications to the engine framework. Provisions have been made for the extension of the engine via the development of custom low-level reusable components as well, thanks in large part to the use of well-defined interfaces for each component type.

Figure 7:
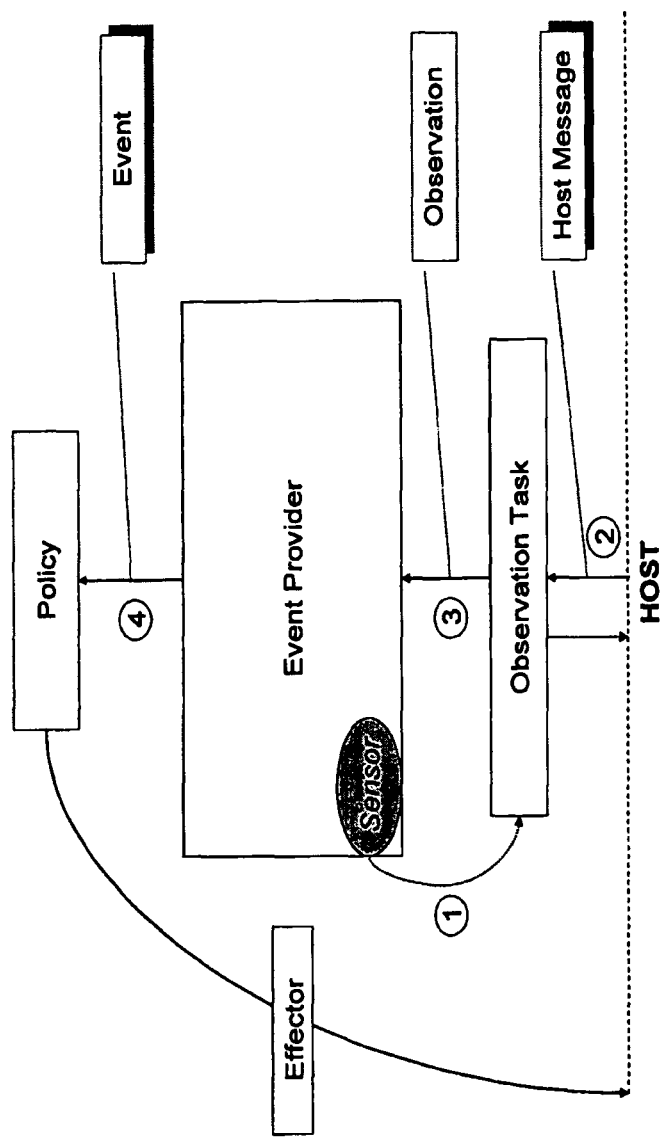
FIG. 7 is a diagram showing a scenario related to the ISAC of FIG. 2.

FIG. 7 shows the principal concepts used in one embodiment of the ACE (22) and how they relate to one another. FIG. 7 represents a simple scenario when observation tasks feed measurements or system events into an event provider, which, in turn, feed them into a policy. It is noted that FIG. 7 is simplified as event providers can feed multiple policies. The observation tasks are examples of sensor implementations described earlier. They register with the sensor lookup service using a well-known, unique name. It is these observation task implementations that need to be created for each operating system such as Windows or Linux.

When a module is loaded, 3 important processes occur. First, the definition of each policy 70 is loaded. Second, the definition of each event provider 72 is loaded. Referring to FIG. 5, the repository 54 is consulted for this information. Referring to FIG. 7, a linkage between event providers 72 and policies 70 is created. The event providers shown in FIG. 7 (concept) and FIGS. 8 and 9 (examples) are instantiated within managed system element classes. Event providers exist within managed system element classes and have the responsibility of converting observations on managed objects in the managed system into informational events that can be consumed and reasoned with inside of policy. In one embodiment of the invention, policy, managed system element and event specifications are stored in properties files. In another embodiment of the invention an XML schema is used. Individuals skilled in the art of object or distributed system design will realize the persistent storage is an issue orthogonal to the relationships and interactions within the system. The important relationships and interactions are clearly represented in FIGS. 16, 17, 19 and 20.

FIG. 16 shows that the ManagedSystemElementClass home object is responsible communicating changes in the managed system object classes; e.g. when disks change. These changes are communicated as events to the policy home object that decides based upon user-defined criteria whether to instantiate (or destroy) a policy instance. For example, a user might specify that all fixed disks are to be monitored for low disk space whereas removable ones are not. This information is stored within the policy home object. FIG. 16 also shows that a policy home is able to query the managed system element home object for an enumeration of managed objects. Policies always interact through managed system elements, never directly with the managed system itself.

Figure 14:
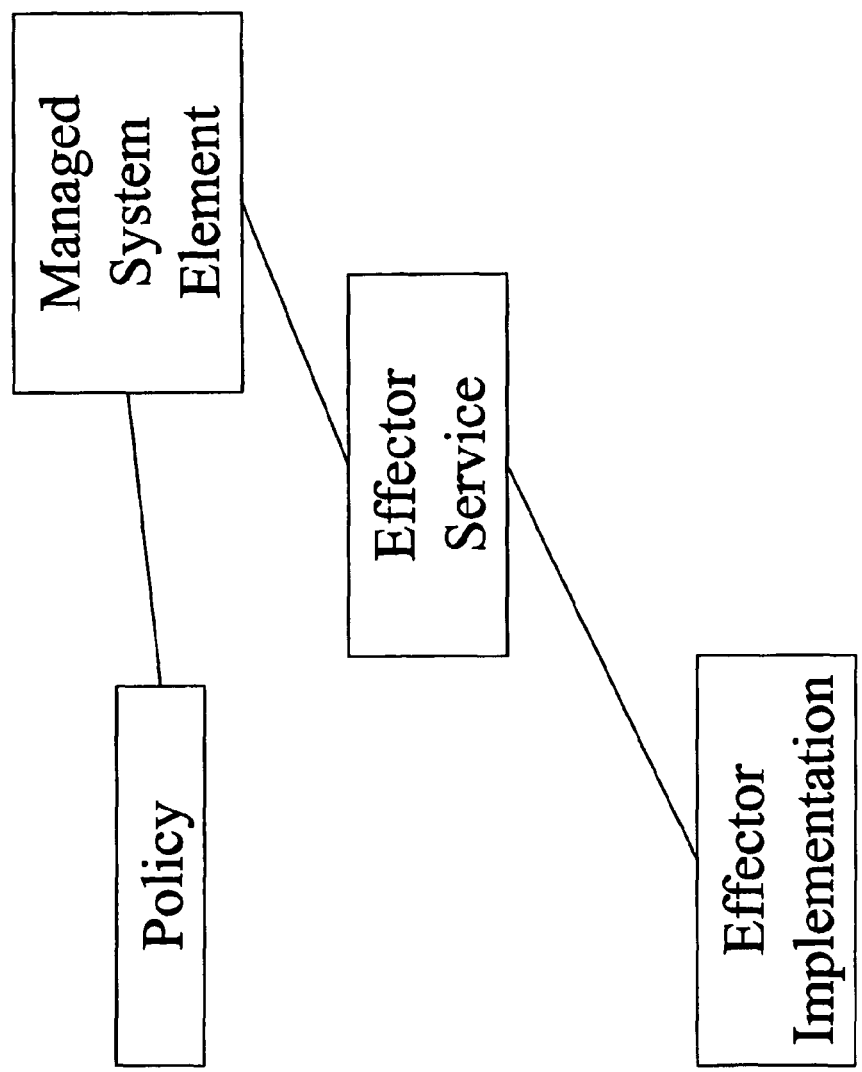
FIG. 14 is a diagram showing how policies are connected to effectors. A policy effects change on the managed system through the managed object. A managed object interacts with the effector layer. Effector implementations are responsible for making changes on the host platform.

FIG. 17 shows how interactions occur between managed system elements and policy instances. A managed system element instance might be a disk, for example. The configured policy instance might be a policy that is capable of concerned with low disk space. The property change events indicated in FIG. 17 might be changes in the available disk space. The actual observation is made by the sensor implementation, as shown in FIG. 13. The configured policy reasons with these events, making decisions on what actions to take. Actions are performed through the execution of methods on the managed system element instance object. The actual action is performed by the effector implementation as shown in FIG. 14. An example of a method to execute on a disk managed system element instance would be deleteTemporaryFiles. A configured policy instance is also capable of querying a managed system element instance. An example of such a query would be to ask for the size of the disk.

Design considerations and mechanisms for achieving the interactions described in FIGS. 16 and 17 are described in FIGS. 21 to 26. Of particular note is the Sensor Map described in FIG. 25 which facilitates the making of observations on a managed system. FIG. 21 describes the necessary information that has to be provided in the deployment of a particular ManagedSystemElement class. Simply put, a ManagedSystemElement class is a mirror of a Managed Object class on the managed system, although this is not a strict requirement. Referring once again to our disk example, a MSE_Disk class would exist 1-1 with a Win32_Disk.

FIG. 22 describes the essential characteristics of ManagedSystemElementHome objects, the objects responsible for tracking managed system configurations. An example embodiment of a deployment descriptor is provided.

FIG. 23 indicates how the information in the aforementioned deployment descriptors is used to manage the lifecycle of managed system element instances.

FIGS. 24, 25 and 26 describe how sensor interactions are managed; specifically, if provides an embodiment of the sensor map for the process object. The sensor map is represented within the Sensing Service shown in FIG. 13. It provides the link between the abstract sensory information used by a managed system element and the actual sensory apparatus available to a managed object available on the target managed element. For example, FIG. 25 shows that the "ExecutionState" feature can be obtained by querying the Win32_Process class for the property ExecutionState using the wmi protocol. Furthermore, the instances of managed objects of class "Process" can be obtained by using the wmi protocol to query for instances of class Win32_Process.

The following several paragraphs provide examples of an embodiment of a policy specification.

Example Policy Specification is as follows:

```
policy.class=com.symbium.jeops.JeopsPolicy
kb.properties=os2k_cpu_mon_policy_1.properties
kb.class=com.symbium.jeops.CPUMonPolicy1
name=os2k_cpu_mon_policy_1
description=normal CPU monitoring policy
event.source.0=os2k_cpu_mon_event_1
```

The important aspects of policy specification are the class to be loaded to represent the policy (policy.class), the actual implementation class for the reasoning used by the policy (kb.class) and event source(s) of interest to the policy (event.source.X, X=0,1,2, . . . ).

Policies will likely be defined by system administrators, rather than programmers, and as such they should be specified at a level abstracted as much as possible from low-level system/implementation details. Policies are built using the MDE (42), which is a graphical development environment where a designer drags elements from a palette onto a canvas. An embodiment of the MDE is built as a series of plug-ins to Eclipse [Ref. 22]. Detailed design considerations for the environment can be found in Appendix 1, which includes screen shots and an annotated description of the creation of a simple policy.

The ACE (22) currently supports two mechanisms for supporting policy definition. The first is via rule sets which are compiled into a knowledgebase and used by a forward-chaining inference engine (as shown in the above example policy specification), and the second is through a visual state-machine editor, which outputs a description of the policy that the engine can consume and build dynamically. Both representations compile down to Java classes. Java classes that support a specific interface may also be written by a developer and integrated directly. Rules and finite state machines were selected as two reasonable ways of expressing policy, though the system could easily be extended with other types of policies as well, because the framework is completely isolated from the implementation of the underlying mechanisms. While the current embodiments use two policy representations, the invention is not restricted to using a rule-based forward-chaining inference engine or a finite state machine, and policies in future embodiments could be developed around neural nets or other artificial-intelligence constructs, where such concepts are deemed to be beneficial and an adaptive system is required.

If rules are used to specify the policy, then conditions and actions are evaluated and executed by a forward-chaining inference engine. Typical rule actions would be to set up a state within the policy; e.g. disk space low, and to execute a method on the associated managed system element instance (in this example a disk). In one embodiment of the invention the ACE (22) uses an open-source inference engine called JEOPS [Ref. 23]. Alternatively, the execution of policies derived from state machines is handled by a proprietary dynamic state machine. Individuals skilled in the art of finite state machine interpreters—specifically Harel hierarchical finite state machines and their implementation—will be familiar with the details of their construction. ABLE [Ref. 24] was considered for a reasoning engine but was found to be too resource intensive for our embedded platform.

A module developer will specify the actions of a policy using a set of high-level objects, known as effectors, which encapsulate the low-level details required by the engine to perform common actions. Examples of effectors are: terminate a process, reboot the server, and remove a file from the file system. Policies can also be written in Java if desired, though it is expected that the MDE (42) will be used to facilitate scenario and policy-development with limited or no programming knowledge using the drag and drop visual programming paradigm referred to earlier.

Referring to FIG. 7, at the lowest level of a scenario, sensors convert raw data 76 from the host (such as the value of a performance counter) into a (typically platform-independent) observation 78. The observation task 74 provides an important abstraction away from raw measurements made on the host system. As such, it intended to decouple sensing from reasoning. Ideally, the sensory interface would use only the CIM; however, this to be insufficient for certain types of scenario; e.g. printer queue management. For this reason, the sensor abstraction layer is present in the system. The layer also, in principle, allows for the use of the ACE (22) as an autonomic manager (2) in domains where the CIM has yet to be applied.

The observation object is used as input to the event processor where a dynamic and fully-customizable pipeline of atomic software objects called observation processors filters and manipulates this observation, ultimately determining the relevance of its contents.

Figure 8:
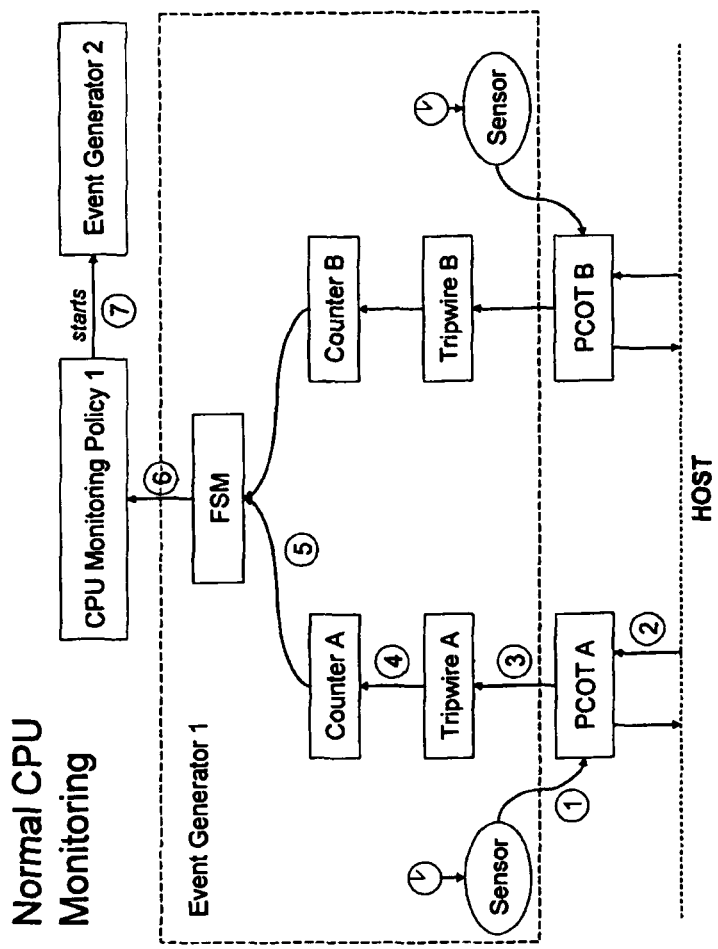
FIG. 8 is a diagram showing an exemplary operation for normal CPU monitoring.

FIG. 8 shows an example of pipelining. Pipelining or the filter design pattern of processing has long been used as a mechanism for combining simple programming elements, dynamically composed, in order to transform a data stream (e.g. UNIX script programming). Referring to FIG. 17, pipelining is inserted between the ManagedSystemElement instance and the Configured Policy instance.

Referred to FIG. 7, the autonomic controller can use this pipeline to perform a wide variety of actions: for example a given observation processor may be configured to ignore a certain type of observation based on some configurable criteria, or store its contents for later use, or it may use one or more observations to generate an event 80. The event 80 is similar in structure to the observation 78, however, differs in that it implies that something of significance at a higher-level has occurred. The observation processing pipeline is constructed and managed by the event providers 72, which also handle the dispatching of events 80 to policies 70, or to other event providers, which can be chained together to allow further processing.

Policies employ high-level system objects called effectors 82, which have well-defined behaviors and are designed to encapsulate the lower level details of taking common system actions. Effectors 82 are also configurable and lightweight, so it is simple to extend the engine's ability to perform system actions. The effector 82 hides the actual communication with the host and automatically generates an event 70 when completed which is fed back to the policy that invoked it. This ensures that a policy can track whether a state-changing action has succeeded or not.

All components involved in observation and event creation, distribution, and evaluation are handled by the framework using only well-defined interfaces in order to facilitate customization and extension. They have been defined with a visual development environment in mind, in which one could literally drag-and-drop the desired processing components from a palette, and connect them together, allowing the creation of scenarios of virtually any level of complexity. The palette is extensible and each processing component is highly configurable: really a component is then a template for a particular type of processing, and each instance can have specific configuration (such as, threshold values, observation filtering, etc.).

2.5 An Example Scenario

Figure 9:
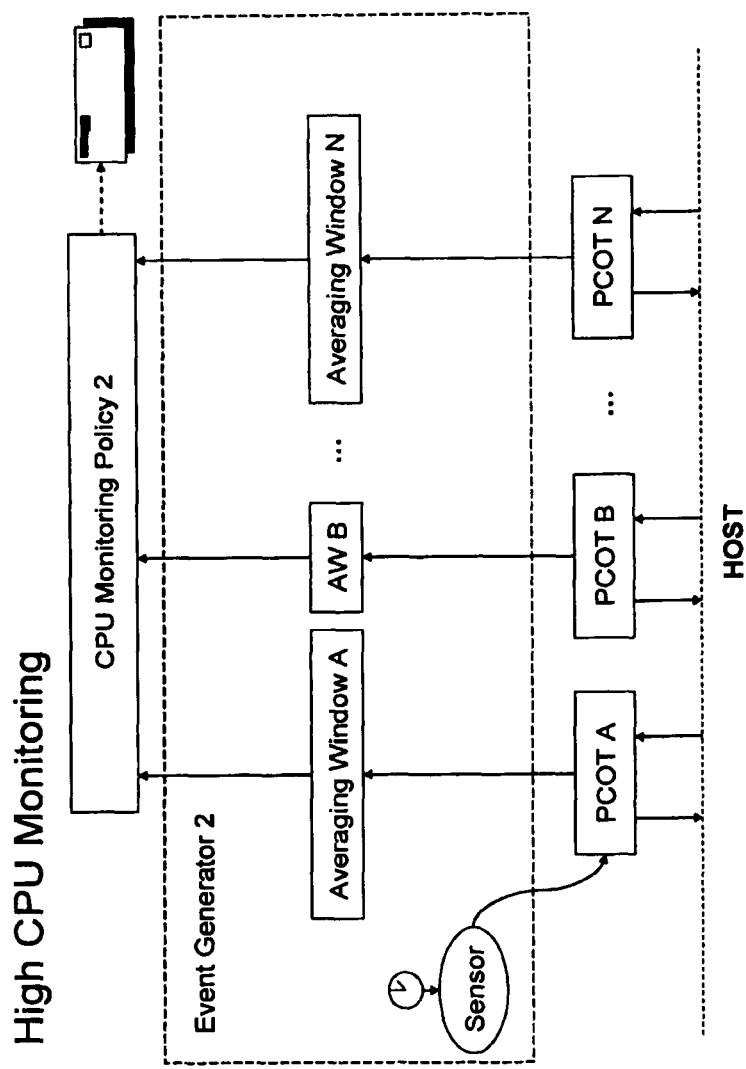
FIG. 9 is a diagram showing an exemplary operation for high CPU monitoring.

This scenario uses terminology of FIGS. 7, 8 and 9. The connection between the event generator, observation task, sensor terminology and managed system elements was established in a previous paragraph. Essentially, managed system elements embody event generators, which, in turn, comprise sensors and observation tasks. Both embodiments are equivalent in terms of their expressive power and management effectiveness.

To demonstrate the design of the autonomic controller, consider the following example. The example was identified by a domain expert as a realistic use-case and implemented for Windows 2000 and 2003 servers. As part of general resource-allocation planning, a system administrator needs to ensure that a server has sufficient processing power to handle its normal workload, with enough left over to allow for occasional peaks in usage. Windows keeps performance counters that can provide statistical data about the percentage of a CPU which is being used as well as the processor queue length, both of which can assist in evaluating how busy a particular processor is. These counters can be polled programmatically using either a proprietary interface to the API provided by Windows, or via the Windows Management Instrumentation (WMI) infrastructure.

FIG. 8 provides an encoding of the scenario described above. Suppose that, at a high level, the administrator defines the following policy to ensure that a server has sufficient computing power for its load: if the CPU usage exceeds 85% for a sustained period of 30 minutes and simultaneously the processor queue length is always greater than 2 over the same period, then the processor is considered to be unusually busy. It is noted that these statistics are polled, so the actual values may fluctuate and could drop below the specified thresholds.

When a server seems to be experiencing this abnormally heavy load, the administrator would like the ISAC card (20) to take several actions, which can ultimately be used in the analysis of the cause. First, an alarm should be raised and sent to remote management console(s) monitoring the card (20). An alarm indicates the time that an issue was detected, the type of problem that has been observed and its suspected severity-level, and possibly some other relevant information about the host system. In order to better understand the context for the high CPU usage, the administrator has specified that when this condition is detected, intensive monitoring of several other statistics for a specified time would be useful. To do this, the ACE (22) will initiate the monitoring of about a dozen additional counters, which will be polled every 10 seconds and averaged over a five minute window. This information is aggregated and sent to the administrator in an email message, and normal performance monitoring is resumed.

To achieve this behavior, a module developer begins by specifying configuration parameters for two performance counter sensors, one for CPU usage (PCOT A in FIG. 8 and the other for processor queue length, PCOT B in FIG. 8). The parameters to be configured are the performance counter name and the polling frequency. Then the observation processing pipeline must be defined to filter and aggregate the observations to determine whether the triggering conditions have been met. This processing is performed by small objects with very specific roles. First, the observation from each sensor is passed to a separate instance of a type of observation processor called a tripwire monitor (Tripwire A and B in FIG. 8). These processors are each configured with a threshold value (e.g. 85% for the processing of the CPU usage counter observation), and each generates an observation that indicates whether the threshold has been crossed or not. To satisfy the requirement that the threshold is exceeded for a sustained time period, the next processor evaluating each observation keeps track of how many times in a row the threshold has been crossed, and only passes along an observation once enough occurrences have been counted (Counter A and B in FIG. 8). At this point the pipeline can determine that the requirements have individually been met to identify high CPU usage, but another piece is required to make sure that these happen concurrently. To aggregate observations, an observation processor implementing a dynamic finite state machine was built (FSM in FIG. 8). The states and transitions are entirely configurable so that it can meet the requirements of a wide variety of applications. In one embodiment, it has four states: the initial state, a state for counter A, a state for counter B, and a state for both. Timeouts have also been implemented so that the FSM can change states automatically after a certain amount of elapsed time. When the FSM determines that both counters are true, it generates an event to inform the policy that high CPU usage has been detected. At this point, the policy raises an alarm and causes another event provider to start, which controls the sensors for the additional performance counters and uses its observation processing pipeline to average their values. These values are sent to an administrator's e-mail account via an effector that hides the details of SMTP. The aggregation mechanism is shown in FIG. 9.

Referring to FIG. 9, when the "High CPU Monitoring" policy is started, the various observation tasks for the performance counters of interest (PCOT X, X=A, B, . . . N) are automatically started. For each observation made, the measurement is passed through an averaging window observation processor (Averaging Window Y, Y=A, B, . . . N). When sufficient samples of the performance counters have been collected, a rule fires in the CPU Monitoring Policy 2 rule base that does 2 things: creates a report to send to an administrator and switches off the monitoring policy. Switching the policy off automatically stops the polling by the various performance counter observation tasks.

Numerous other management scenarios have been captured that involve access to other information sources; e.g. the Windows registry. The management of run-away processes has been provided; processes with memory leaks are automatically terminated and restarted (an example of a microreboot). Automated printer queue management has been encoded by polling printer queues to see if jobs hang, hanging being determined by a non-zero number of jobs but not bytes processed in a specific interval. In the case of Microsoft Exchange, policies have been constructed that ensures all services/processes are kept up, restarting in the correct order when needed; e.g. routing engine service. Finally, a security module has been encoded that allow a user to specify the set of processes that can run; all other processed being automatically terminated without user intervention.

2.6 ISAC Group Management

Figure 10:
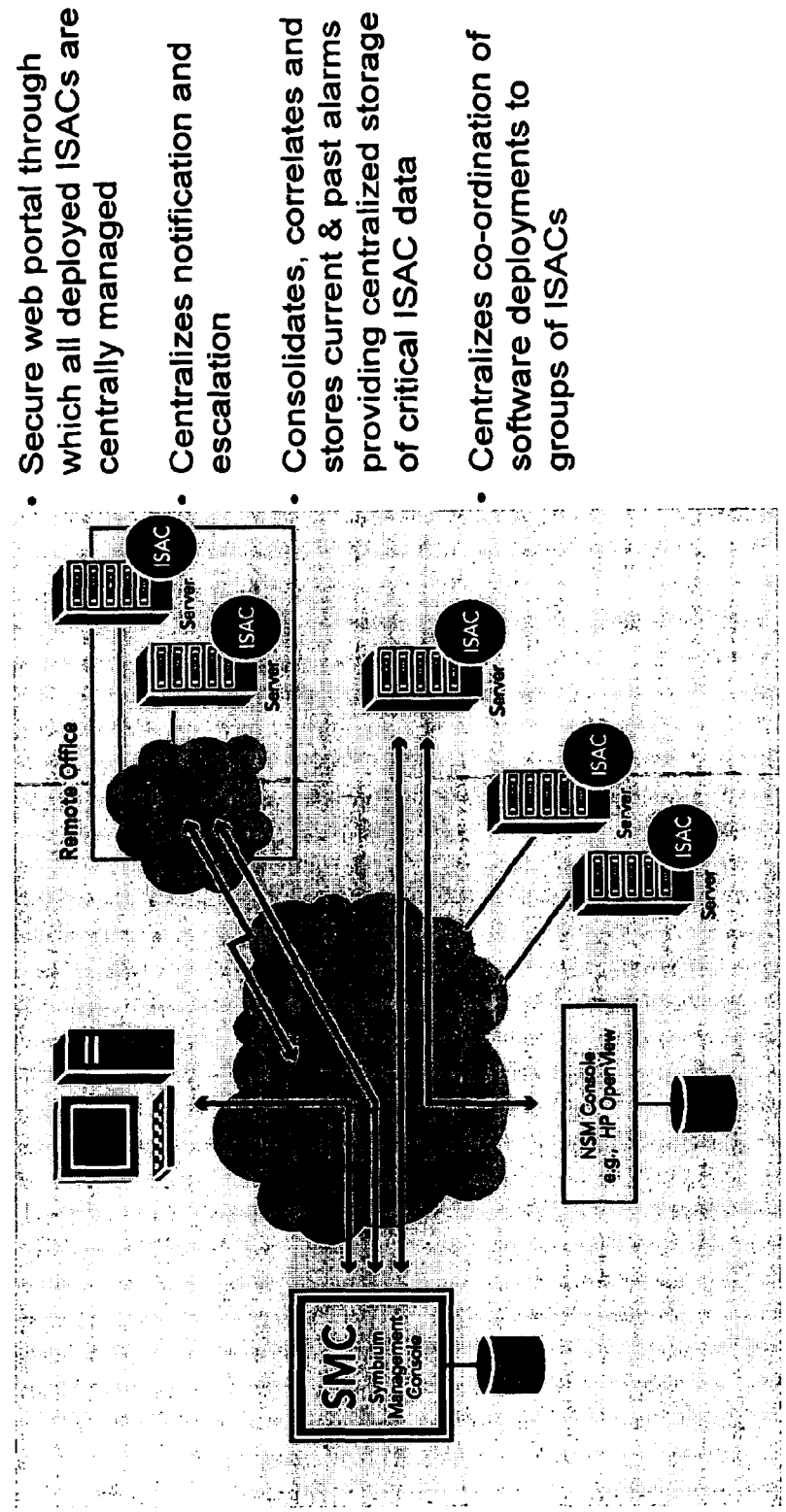
FIG. 10 is a diagram showing a group management.

While autonomic elements may well change the way in which devices are managed, there still remains a need to integrate them with legacy enterprise management systems. FIG. 10 shows how group management is achieved. The management console 40 is the point of integration where alarms and events from a group of ISACs (20) are consolidated. It is also the point through which primary integration with enterprise management systems (e.g. HP OpenView) takes place. The management console 40 is also capable of discovering ISACs, although ISAC discovery of a management console is also possible for deployment scenarios where ISACs reside behind a corporate firewall and group management is undertaken from outside the firewall.

FIG. 11 (due to J. Kephart of IBM) graphically demonstrates the direction that the work should follow; namely, networks of autonomic elements that self-organize to achieve highly available business processes. It is our view that business process management will only be possible with autonomic elements. In the future, we will examine autonomic control in distributed systems, where groups of autonomic controllers coordinate with each other to provide large systems with the same capabilities that an individual card currently provides a single host. It is expected that a single autonomic manager will then take on the responsibility of reporting the well-being of the business process supported by the autonomic element network, thereby further reducing the alarm stream reported to legacy enterprise management systems.

The module development environment is described in Appendix 1 and several screen capture images are included there. The textual description in appendix 1 describes rule-based policy implementations, the screen capture diagrams provide a visual description of how a finite state machine implementation could be constructed. The use of the Eclipse Model Framework (EMF) and the Graphical Editor Framework (GEF) are used in this embodiment of the invention. The MDE, being based upon the plugin architecture of Eclipse facilitates third party development as well, allowing others to provide modules that run on the ISAC platform.

Rules may not be sufficient to express all desired policies. As such, non rule-based policies (e.g. neural nets, finite state machines etc.) have been implemented to extend the engine's abilities. It is intended that modules be created that can determine the normal resource consumption levels for the server and set thresholds accordingly once a "burn in" period has elapsed.

Other embodiments of the autonomic controller and MDE will occur through additional plugins being developed for the current Eclipse-based environment. Additional services will be added to ACE that support communication using different protocols and transport mechanism.

The further detail of the architecture can be found on Appendix attached herewith. Especially, the detail of the Module Development Environment and the Management Console are disclosed in the Appendix 1.

The embodiments of the present invention have the following features:
   Programming of an autonomic element.
   Dynamic upgrade of the management software; specifically for: sensing, effecting and reasoning about the state of the managed element.
   Lifecycle maintenance of management software on the managed element and autonomic manager.
   Service on host is not interrupted when upgrades to autonomic manager occur.
   Provides simulation environment for debugging and testing of new or modified management software.
   Distribution of software for autonomic management to a group of autonomic managers.
   Self-management of the autonomic manager; i.e. autonomic manager can diagnose faults in its own operation and act to recover from then.

The embodiments of the present invention have the following advantages:
   Improved system management through effective delegation.
   Results in reduced cost of ownership of system.
   Higher system availability.
   Facilitates reuse of management knowledge by well-defined abstractions; e.g. excessive disk utilization problems can be characterized regardless of operating system and hardware.
   System management best practices can be captured and reused.
   Ability to dynamically react to changes in the applications deployed on a system; e.g. if a new application is deployed the system can automatically acquire and configure management functionality for it.
   Provides a platform for coherent management of heterogeneous platforms; e.g. Windows and Linux operating systems.

Further detail can be found in Appendix 1 which forms an integral part of the Detailed Description section of this patent application. Specifically, Appendix 1 describes an embodiment of the invention from an architectural and feature perspective.

In addition, all citations listed on pages 91 and 92 are hereby incorporated by reference.

While particular embodiments of the present invention have been shown and described, changes and modifications may be made to such embodiments without departing from the scope of the invention.

APPENDIX 1

Detailed Design:

This appendix includes detailed information on the design of the module development environment, its interface and the structure of a management module. This invention relies most on these two components. Two embodiments are referenced: one using the event generator terminology, the other using managed system elements. Both are equivalent, the latter supporting an object-oriented management representation familiar to those skilled in the art of the Common Information Model (CIM).

Management Module

A management module is an encoding of expertise required to manage a server or an application that runs on it. A management module is used by the autonomic controller software running on the ISAC in order to minimize the human effort required to manage the server or an application that runs on it.

A management module has a lifecycle, which is described in a later section.

A management module contains software components designed to support autonomous management. Management modules contain extensions to the MC, the ISAC and the system being managed. We refer to the actual packaging of a management module as a management module archive, or MMA. These are files with the extension SMA or MAR. This information includes policies that capture scenarios of interest. A scenario of interest might be "Disk full", for example. These components include:
   Version and author information.
   Copyright and licensing notices[1]
   [1] These may be compiled out of delivered class or object files but must be included in source that is used to generate management modules.
   Policies encoded using rules (see programming model document).

The alarms and events associated with particular policies (see programming model document).

Behavioral components to allow observations to be made on the managed system

Components to allow observations to be processed (such as taking the average of a performance counter over a user-defined window).

User interface components (to facilitate configuration of policies).

Installation components that run on the ISAC in order to set up for the management module correctly for the environment found on the system being managed.

Documentation that includes an explanation of what the model does. Explanation of the process by which the various policies were developed should be included here.

Web pages.

MC extensions that allow the management module to be managed. The assumption is that these extensions will be written as java classes.

Host extensions which would include extensions to the controller proxy for acquisition of data from new sources and scripts or executables that run on the host and are designed to assist in maintaining the managed system or returning it to a normal state of operation. The assumption is that controller proxy extensions will be written in C++. Host-side scripts will be written in visual basic and other scripting languages.

Scoping. A management module describes what information is shared between it and a parent module. The sharing mechanism includes both data and behavior.

The OSGi framework, through bundles, provides the ability to hide behavior i namespaces.

Security requirements. Assuming roles, these include what data items can be read and written and what behaviour is shared.

Plug-ins for the creation of C++ libraries (for the host), web page and scripts will be provided by $3^{rd}$ party Eclipse plug-ins. Documentation and help will indicate to the management module developer where within the module the library, page or script should be stored.

There are three classes of activity that can occur with management modules. These are:
1. programming
2. customization
3. configuration Programming is the creation of new behavior for a management module. This could result in the addition of new primitive behaviour that could also be used in other modules, such as the creation of the ability to process observations in new ways, or the definition of a new aggregate of a set of existing primitives. The most common example of an aggregate is the creation of a scenario, which is the linking of one or more policies to one or more event generators. This example is described in detail in the section on the MDE.

Customization is the creation of management modules with existing primitives or editing the behaviour of existing modules. Editing may take two forms: extension or modification. An example of an extension would be to add a new rule to a policy. An example of modification would be to alter the conditions or actions associated with a particular rule.

Configuration is the specification of data associated with a management module. Management modules initially delivered contain properties that need to be given values. While default values will be provided, values that apply for all management modules or for individual modules or parts thereof will need to be specified. For example, an e-mail address will need to be provided by a system administrator. Other configuration items will be automatically acquired when a management module is installed on an ISAC. An example here would be the automated acquisition of server configuration information, such as host name and specific hardware information.

There are a number of roles associated with the manipulation of management modules:
Management Module created by actors:
  embotics
  Partners
  End users, typically senior administration staff
Actors work with:
  Module Development Environment (MDE)
  Management Console (MC)
  ISAC Management Module LifecycleA Management Module has a Lifecycle Consisting of the Following Phases:
1. Scenario identified
2. Knowledge sources identified
3. Expertise encoded as Management Module
4. Management Module tested by Product Verification
5. Management Module released
6. Management Module updated
7. Management Module retired This lifecycle reflects what goes on inside of embotics. Management Modules that are created by customers may undergo a subset of the points described above; e.g. they may choose not to employ Product Verification.

Figure 48:
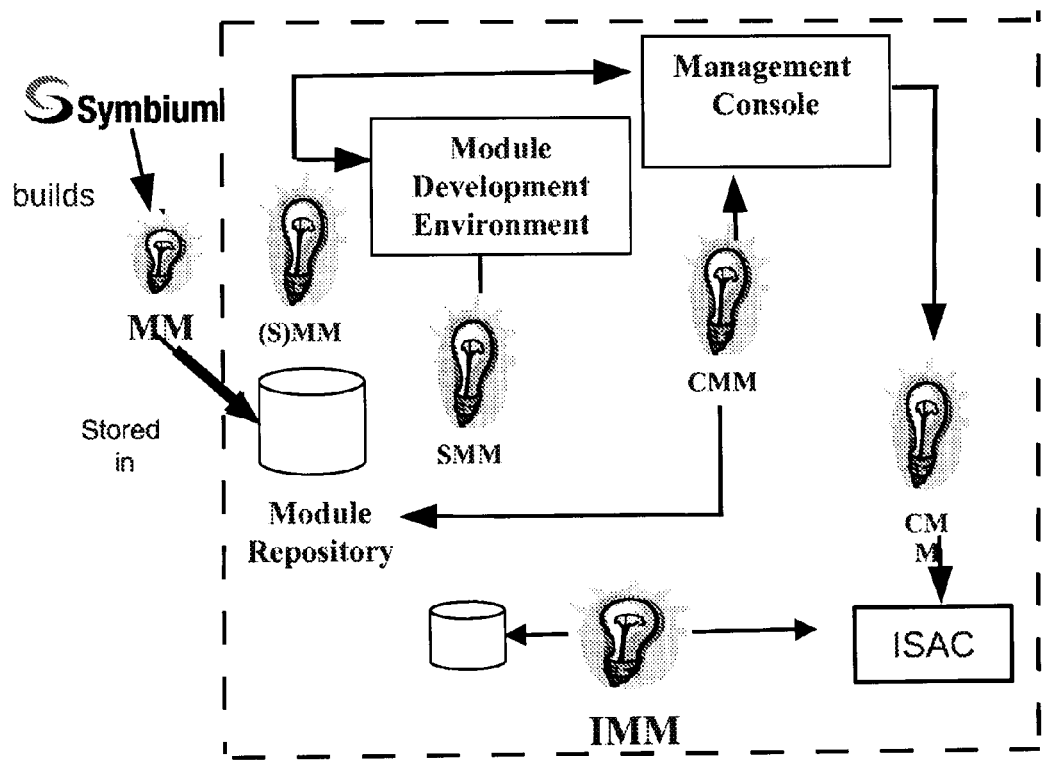
FIG. 48 illustrates a lifecycle for a management module.

The following paragraphs describe what happens once the management module is released. FIG. 48 is a summary of the following paragraphs.

In FIG. 48, the dashed line represents the enterprise. Management modules are built and made available through a web-accessible repository. The details of this mechanism will be provided later in the document. However, for the purpose of this section, either a web service or a simple link on a web page will provide access. The MDE will support a direct link for direct download and storage in the module repository. Management modules are delivered in module archive format. All forms of management module archive conform to the same structure, which is a digitally signed, zipped file with a well known file and directory structure. The analogy here is a web archive. A proposed format is provided later in this document.

The downloaded management module is stored in a module repository. Module developers within the enterprise customize the management module for use within their environment and save the specialized management module (SMM) back in the repository. Specialized management modules retain knowledge of the management module from which they were generated. This is done in order to support the upgrade process that occurs when a management module has been updated. Specialized management modules can also be customized within the MDE and saved back in the repository. These modules also retain knowledge of the module from which they were generated. The MDE is also capable of copying management modules stored with the module repository.

The management console is capable of loading management modules or specialized management modules for the purpose of creating configured management modules (CMM). Configured management modules are modules where variables that need to have values have the values assigned. For example, a configured management module containing a policy that prevents specific processes from running on the host would need to have the list of process names provided. Another example might be the need to specify the e-mail address of the administrator to which e-mail is to be sent. Once a management module has all of its variables instantiated, it is saved in the module repository. Note that several configured management modules may be derived from a single specialized management module, reflecting the several classes of servers that exist within the enterprise. It is intended that a configured management module would be used for a class of servers and that the MC would group the servers accordingly.

Configured management modules are deployed to one or more ISACs. The deployment process consists of three steps: transfer of a module archive to the card, checking the digital signature of the archive, unbundling the archive and running the management module installation tasks. Once the installation tasks have successfully completed, the management module is called an installed management module (IMM).

When the autonomic controller starts up all installed management modules are loaded on demand, initialized and, if required, started. We refer to a loaded management module simply as a module.

Figure 49:
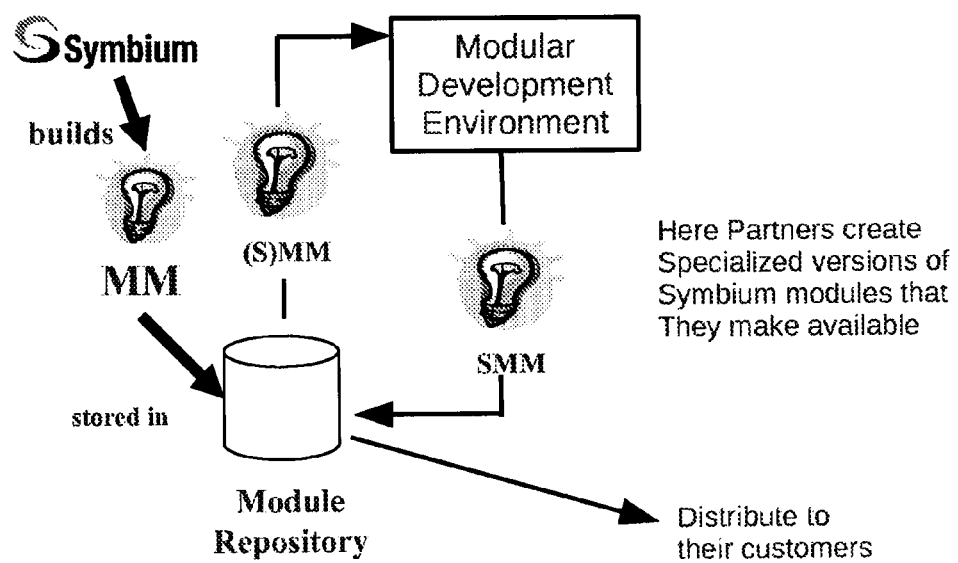
FIG. 49 illustrates a scenario when a partner creates a specialized management module.

FIG. 49 shows a scenario in which a partner creates specialized management modules. In this scenario the partner only makes use of the MDE as he does not deploy into a live environment.

So, how is a management module created?

There are two aspects to management module creation. First, knowledge of how to manage some aspect of the host or an application running on it has to be acquired. The programming model document describes this process. Second, armed this knowledge, the MDE is used to create one or more policies that encode the scenarios of interest identified in the knowledge acquisition process. As stated previously, R3 does not provide software support for the knowledge acquisition process. It will, however, be essential to provide training in this area.

Management Module and Software Distribution

Management Modules and software are distributed from a well-known embotics web site. In order to connect to the embotics web site, users are forced to authenticate. After authentication, users will be allowed access to the download section of the web site. The web site should contain: news, documentation, a support area and downloads.

News: This area should provide information on the latest changes to embotics products.

Documentation: This area should provide links to updated documentation on the product and (potentially) reference links for relevant management module information such as sources that were consulted in the creation of the management module.

Support: This area should allow an authenticated user to ask questions against a knowledge base of known problems and frequent asked questions. The area should also allow the filing of a problem report. (We might possibly want to support an instant messaging facility too where users can interact with a support person in real time).

Downloads: This area allows a user to download software and management module updates. Software updates will be delivered in .jar format for Java, DLLs for host-side communications and firmware updates. Management module archives are delivered in .mar format (essentially zipped files with a well-known directory structure). Download will be clicking on a link. All files distributed from the embotics site will be digitally signed.

Future releases of the web site may use web services to distribute software and updates.

Downloads can also be made directly from within the MC. The MC, by default, will come configured with knowledge of embotics' download area. We should consider using LiveUpdate (http://liveupdate.openwares.org/) in order to support dynamic updates in for ISAC-2.

When downloaded, users are free to store items anywhere within the file system accessible to the MC.

Module Development Environment (MDE)

The MDE is integrated with, rather than a replacement for, Eclipse V3. The MDE will be written as one or more Java plug-ins. This is done in order that end user development can potentially occur within a single environment.

The Eclipse project concept is used to manage all work. We will create a project nature—to use Eclipse terminology—in order to support the multiple components that can be present in a management module. Projects may contain multiple language components, which may be manipulated using perspectives. Think of perspectives as views on the underlying project components, which constitute the model. So, creating a project provides the container for all work. A project may contain material that is not required for the functioning of a management model; for example, reference documentation on how the module was developed, useful training materials and presentations. This will come for free with the Eclipse environment. Being wizard created, this is directly from Eclipse. A project is simply a well-known point in the file system; it is NOT a management module. NOTE: the project may contain multiple management modules.

The following actions are supported on management modules.

Copying: A management module may be copied. Copying results in the duplication of all items currently defined for the module. This may include policies, documentation, java classes, dynamic link libraries as examples. A new directory structure within the project is created by copying; the user being prompted for a new module name. The scoping of the copied management module remains that of the original.

Renaming: A management module may be renamed. Renaming is the act of associating a different descriptor with the module. The directory within the file system is renamed. Also, scoping references to the renamed management module are automatically updated.

Deletion: A management module may be deleted. Deletion is the act of removal of the management from the project. User confirmation of deletion is required. Deletion will result in the movement of the management module directory structure to a trash can; essentially a well-known point in the file system. Deletion will also cause management module references to be updated. The scoping of management modules referring to the deleted module will be changed to refer to the management module scope of the deleted management module.

Empty Trash: Deleted management modules remain in the trash until user action forces them to be removed. Optionally, a maximum amount of space may be allocated to the trash at which point the oldest trash is automatically removed.

Recover Trash: A deleted management module may be recovered. Recovering a deleted management module results in the restoration of the management module within the project. If a management module of the same name already exists in the project, the recovered management module name is prefixed with the word "Recovered". When recovered, a check is made to ensure that the management module is correctly scoped; i.e. the management module to which it refers exists. If the management module to which it refers does not exist, the user is warning and is expected to resolve the problem manually. No attempt is made to re-scope the recovered management module. This limitation is imposed because the recovered management module has no history of changes to management module scoping to base scoping decisions upon. Being smart here may cause us to shoot ourselves in the foot.

Export: A management module may be exported. Exporting a management module results in a module archive being created. A module archive is a zipped directory structure, which is described later in this document. Module archives may be complete or incomplete. A complete module archive is one that contains all files for the operation of the module. An incomplete module archive contains one or more files that when merged with one or more other archives forms a complete archive. It is possible to think of an incomplete module archive as a patch for that management module. Exporting a management module has a number of steps. These are: saving any unsaved edits to management module components; ensuring sanity of the saved management module and creation of the archive file at a point in the file system chosen by the user. Once the sanity of the management module has been determined, the user is free to select the items to be included in the archive, thus incomplete archives may be created. For example, a user may choose not to include source code (such as policy rules) with the archive. Warnings will be created for situations where incomplete specifications exist. Should errors in the module archive be detected, the archive will be deleted from disk.

Exporting a project will cause the generation of multiple management module archives, one for each management module.

Import: A management module may be imported. Importing a management module results in the unbundling of the archive and the creation of appropriate directory structure within the selected project. Should a management module of the same name exist, the imported management module will have an index appended to it, starting with "_1" and incrementing until a management module name not currently loaded in the project is found. The sanity of the imported module is checked. If the scoping of the imported management module cannot be resolved, a warning is generated and the user is expected to resolve this manually. This limitation is imposed because the imported management module has no knowledge to the current project environment. Being smart here may also cause us to shoot ourselves in the foot.

After Project Creation

Once created, the user is free to create one or more management modules and (potentially) supporting documentation. In order to do this, the user right clicks on the project and selects new. The menu displayed will contain an entry called Management Module. Selecting it should cause the display of the Management Module creation wizard. This wizard, once completed, creates a directory structure within the project. Minimally, the wizard requires a management module name and the management module with which the new management module is to share information. A suggested directory structure that could be created is shown in the MDE architecture section. The recommended process for creation of a management module is to create scenarios one at a time. The recommended process for the creation of a scenario is to use the basic template provided with the system, which includes a single observation task, event generator and policy. The properties of these three entities are then configured.

Once a management module has been created, other capabilities become available. They are the creation and editing of management module variables, the creation of a scenario, the creation of a policy, the creation of an observation task, the creation of an observation processor and the creation of an event generator. When editing the variables associated with a management module, the default variables editor can be used or a specific editor can be constructed and saved as a property associated with the management module.

Figure 50:
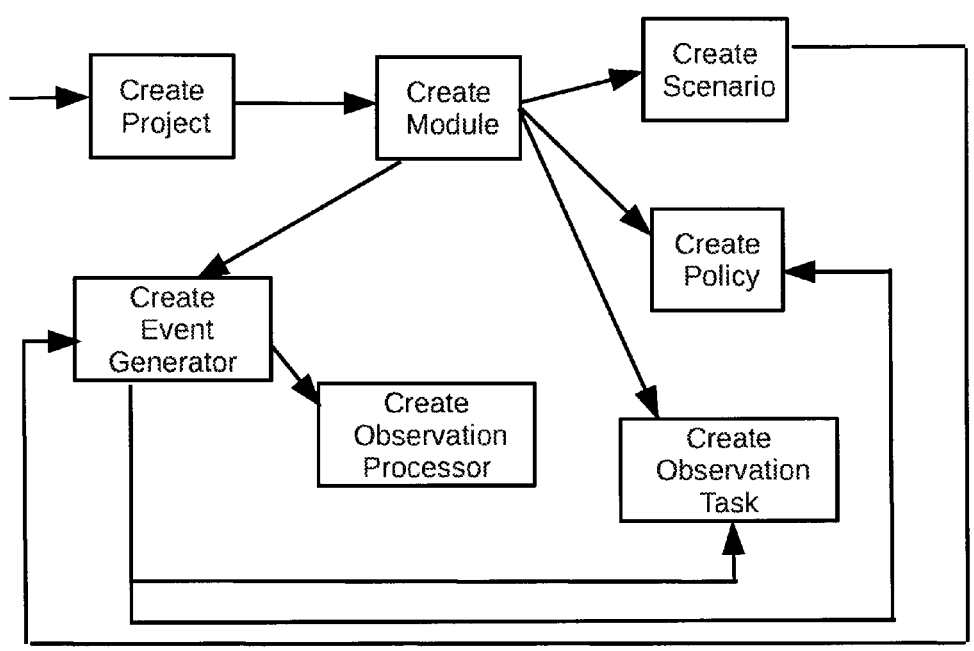
FIG. 50 illustrates an expected order, in which management module components may be created.

FIG. 50 captures the expected order in which management module components may be created. These management module concepts are described in the glossary at the end of this document and their intended usage is described at length in the programming model document. Specifically, a scenario is the encoding of some aspect of server or application management that is of interest to a user. It is intended that developers be able to create management module components in a flexible way; i.e. policies may be created independently of scenarios and observation task may be created independently of event generators. When components are saved, information, warnings and errors are generated in a tasks pane. Clicking on a task causes the appropriate editor to be loaded and the location of the error highlighted. Optionally, the cursor may be moved to the location of the error or warning.

Management Module Variables:

Users must be able to specify variables associated with a management module. Variables may be added to, deleted from and edited using a management module variable editor. Management modules define an environment that consists of name value pairs. The variables stored with a management module are used to control the way in which the module and its associated policies operate. Being scoped, a management module has access to the variables of the management module in whose scope it is defined. Policies and event generators are scoped within management modules. This is shown in FIG. 51.

Figure 51:
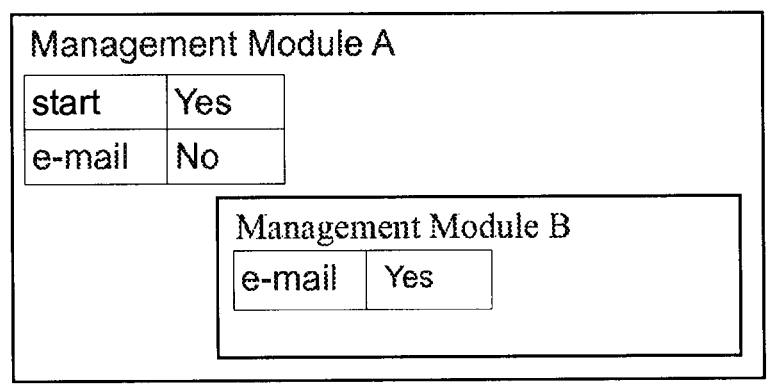
FIG. 51 illustrates an example of defining variables for management modules.

In FIG. 51, management module B is defined in the scope of management module A. Management module A defines two variables: start and e-mail. Management module B defines a single variable: e-mail. This means that when the question, "Should management module B be started?" is asked, the variable will initially be looked up inside of the environment for B, followed by A, where its value will be obtained. Similarly, when the question, "Should e-mail be sent for management module B?" is asked, the value of the variable e-mail will be found in the environment for management module B. The result is that e-mail will be sent for policies associated with management module B, but not for A. Both management modules will be started.

To summarize, the scoping mechanism provides the ability to define a value in one module and have it visible within another. The mechanism also allows a value to be overloaded in a management module. Certain variables such as started are mandatory and will be defined by embotics. Other variables may be added during development effort by management module developers.

Creation and editing of management module variables is required. A simple table editor will be provided as default; user specific interfaces can also be developed.

Management Module variables may be accessed within any policy, event generator, observation processor or task.

Information Visibility

The previous section described how properties can be found within a management module. Management modules extend three other environments, the card environment, the application environment and the enterprise environment.

Figure 52:
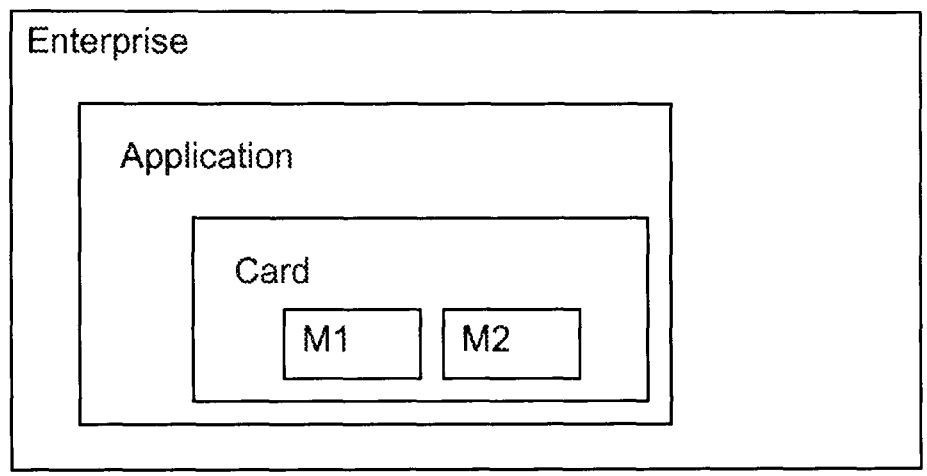
FIG. 52 illustrates an information visibility, including a card environment, an application environment, and an enterprise environment for management modules.

Information visibility is shown in FIG. 52, where M1 and M2 represent management module environments. R3 should support user generation of added environments; e.g. group as needed. Modification of the card and applications environments will be via the minimal on-card UI and through the MC. Modification of the enterprise environment would be through the MC.

The intention of the enterprise environment is to capture variables that are constant across the enterprise—this is why they cannot be modified on card. The application environment contains variables that are defined for the autonomic controller. The card environment contains variables that are specific to the card such as card id, and firmware version.

The values of variables need to take three forms: simple atomic values, such as a string or an integer, or computed values, such as information derived from an end user or looked up on the host. In other words, it should be possible for a user to specify a "function" to be invoked whose value will be bound to the variable. It should be possible for a user to provide values for variables prior to deployment on the card that require user input or other configuration. This is equivalent to asking for the values of all of the variables in the environment.

Values of variables may also be given default values. Users may return a variable to its default value. Users may return an environment to its set of default values, which may also necessitate the return of values in contained environments to their default values. Variables will be stored on disk in XML. An example is shown below:

```
<Environment
    name="exampleVariable"
    type="java.lang.Integer"
    value="30"
    defaultValue="10"
    access="rw"/>
```

The example shown defines a variable called exampleVariable, which is of type Integer. The value given to it is 30, with a default of 20. The XML also indicates that access to this variable is read and write, meaning that it can be changed at run time. (NOTE: we may want to have user/group security descriptors here. However, this is to be refined when the security model is added). For ISAC-2 only basic atomic types of variable will be supported; i.e. integer, float and string. For functions, the type must be com.embotics.Interactor; i.e. the type must conform to the Interactor interface in order that the value of the variable may be computed.

Management Module Behavior

Much of the behavior of a management module is implemented as Java classes. While public, protected and private classes provide excellent information hiding capabilities, the mechanism is insufficient for management modules. We have the requirement that management modules from several different sources need to run concurrently and should be firewalled from one another. If the management module has behavior that it requires for policy (or other) evaluation it should be visible by all module components but not by others unless explicitly allowed by the developer. Running multiple instances of the autonomic controller would meet this requirement but would incur the penalty of higher memory requirements.

It is strongly recommended that the OSGi[2] framework be used; management modules being implemented as bundles, which are the basic unit of deployed behaviour.

[2]See http://www.osgi.org

Scenario Creation:

A scenario requires that developers identify: what they should observe, how the observations should be processed, how the processed observations should be combined, what engine events should be generated when sufficient processed observations have been made and, finally, how these engine events are processed by a policy. The developer also needs to identify what alarms and events are to be generated for the captured scenario of interest.

Scenario creation is achieved using the scenario perspective. The scenario perspective is visual. The description provided here assumes that the Graphical Editor Framework (GEF) v3 is used as a basis for development.

The scenario perspective captures and manipulates the following information:

The name of the scenario.

A natural language description of the scenario.

Figure 53:
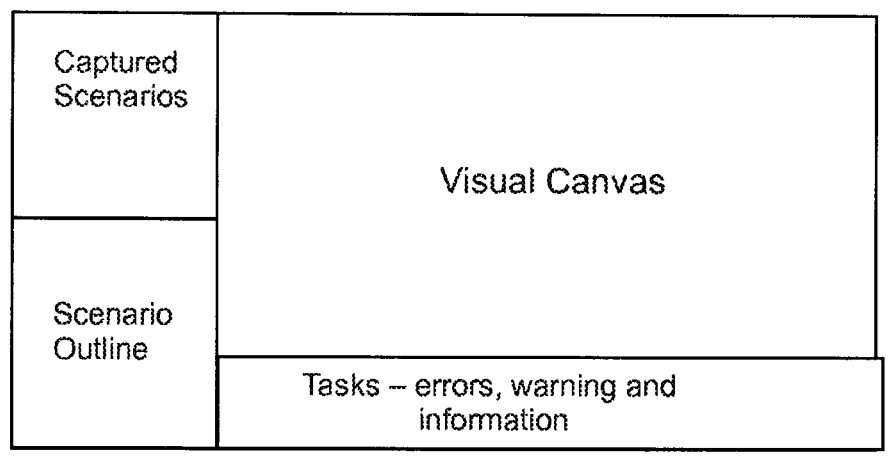
FIG. 53 illustrates an example of a scenario perspective for a management module.

When a scenario perspective is displayed, something similar to FIG. 53 is displayed. There are four distinct elements to the perspective: the task pane, the visual canvas, an explorer showing captured scenarios and an outline. The visual canvas is further decomposed to a palette with a number of categories from which items can be dragged and dropped onto the canvas. A number of scenarios should be provided out-of-box.

The scenario outline simply displays the components comprising the scenario being encoded. Typically this will include one or more observation tasks, an event generator and one or more policies. The captured scenarios pane is simply a view on the file system that stores the model underlying the view displayed on the visual canvas. The tasks etc. pane displays information generated by the perspective as activities are performed within it; e.g. errors that might be generated as a result of attempts being made to connect incompatible components.

Figure 54:
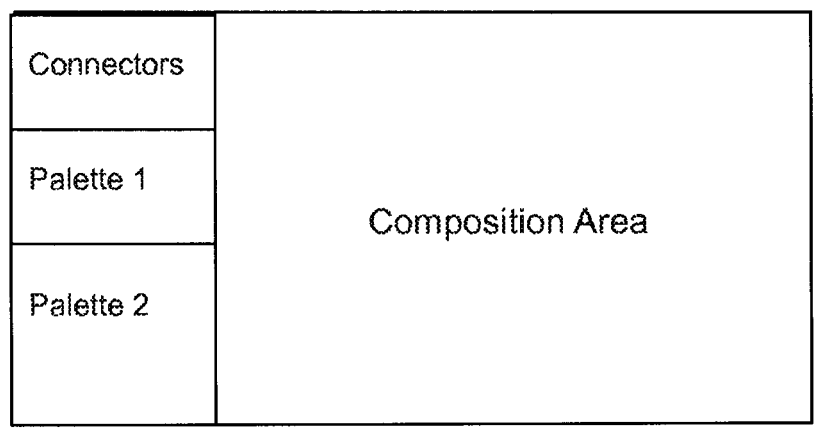
FIG. 54 illustrates a decomposition of a visual canvas element of the scenario perspective of FIG. 53.

The decomposition of the visual canvas is shown in FIG. 54.

The visual canvas consists of two distinct regions: the composition area and the multi-palette area. The mechanism for interaction is that users select items from various palettes and drag them onto the composition area, where they are dropped. Connectors are used to create associations between palette items that have been dragged onto the composition area and dropped there. Configuration of entities dropped on the composition area is by popup menu associated with the entity.

Figure 55:
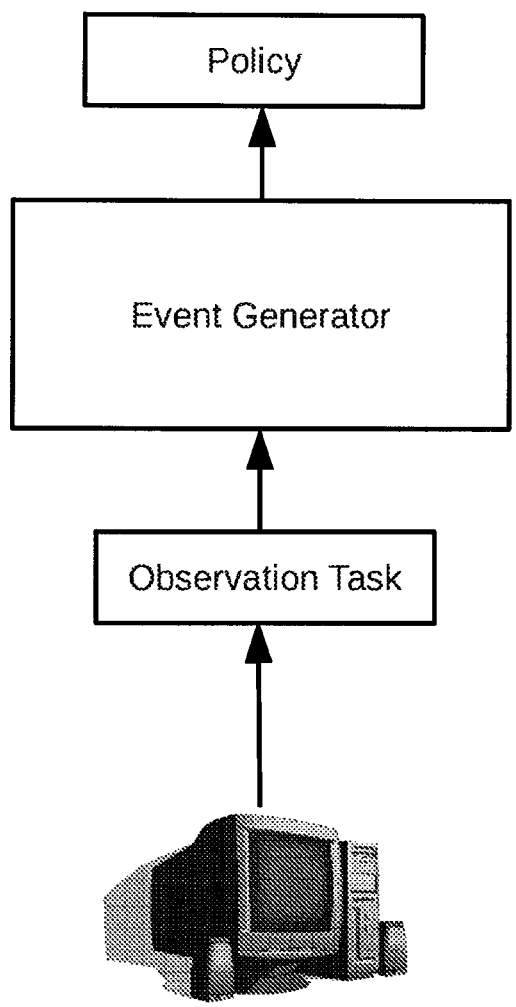
FIG. 55 illustrates an example of a captured scenario having four components.

An example of a captured scenario consisting of 4 components is shown in FIG. 55. Every entity displayed on the composition area has properties. These properties may be edited using a properties editor that is defined for the class of the displayed entity. In many cases these editors are simple table editors, where names and values are provided and the editor constructed using reflection on the underlying class. In other cases, more sophisticated editors are required; e.g. the policy editor. All entities in the composition area support a pop-up menu that consists of general operations provided by the framework including undo, redo, save as template, delete and properties, and specific operations for the selected entity. When deleting a component, any connections associated with it are automatically removed. The "save as template" capability provides the ability of a component to be saved as part of the palette. For example, a specific observation task that requires CPU utilization at a particular frequency can be saved for future reference. Another example might be an event generator that pipelines several configured observation processors.

The host component is shown at the bottom of the figure. Configuring this component would include the name of the host or ISAC to use for context information. The previous statement implies that both direct host communication and indirect, via ISAC, is supported. The context information obtained means information on managed objects and host configuration that should be used in various displays that are generated when scenarios, policies, observations tasks etc. are being constructed. For example, if I were building an observation task dealing with services, I would like to know the set of services running on the host for which the scenario is being built. In all cases where information is obtained from the host and used for display generation, the user has the ability to edit it. For example, if a process list is obtained, the user can add to or remove from that list.

The editor associated with an observation task is textual. It needs to specify the information that is to be requested from the host and the frequency with which it should be obtained. Properties—name, value pairs—may also be associated with the observation task. Several observation task palette entries will be required, essentially falling into two categories: support of the isac-1 communications and WMI-based communications. Two types of request are supported: requests for notification of change (such a new event log being created) or simple polled request for a performance counter.

Creating an event generator is through dragging and dropping observation processors onto the part of the composition area occupied by the event generator entity and connecting the processors to another observation processor, an observation task or to the policy object. An example of a configured event generator is shown in the FIG. 56. Note that event generators can ONLY contain observation processors. This is a general property of containment-type entities; they enforce what entities may be dropped in them.

Figure 56:
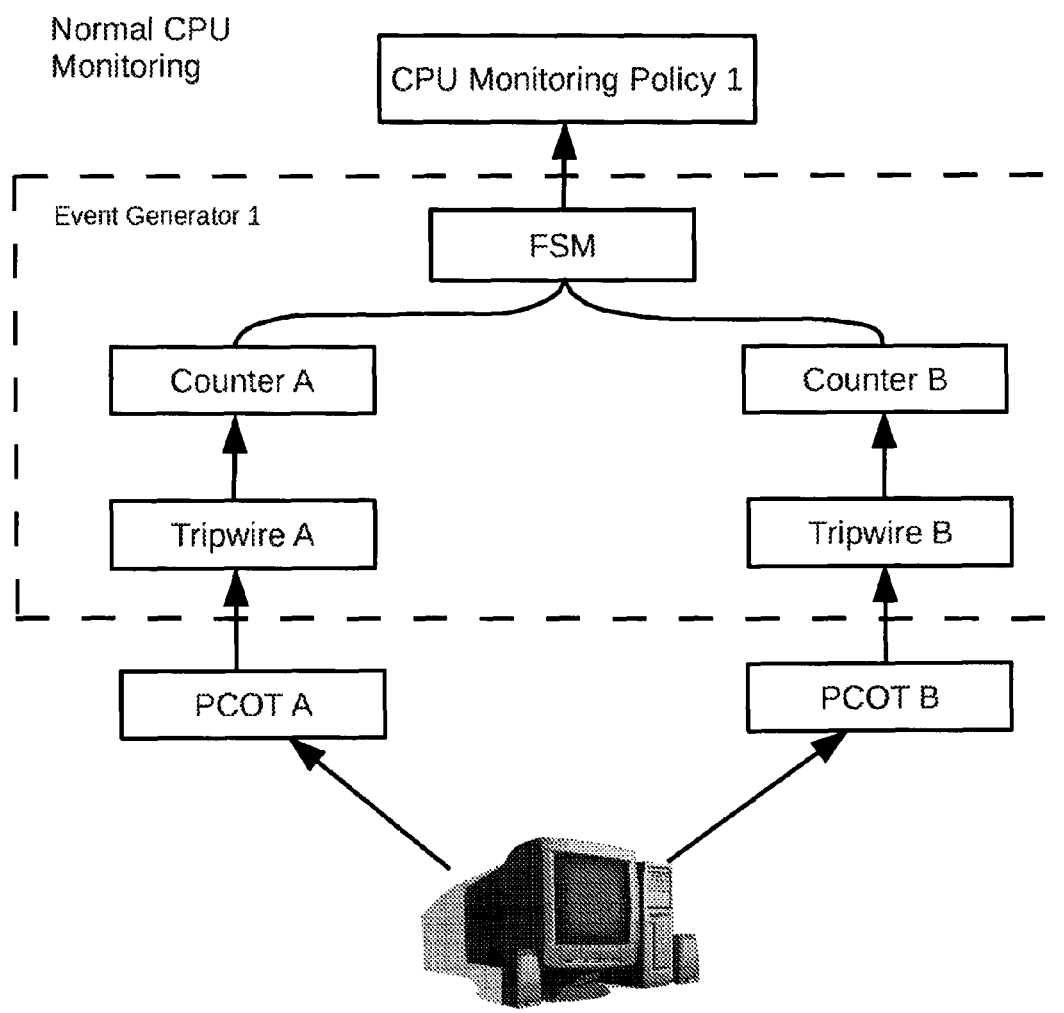
FIG. 56 illustrates an example of a configured event generator having two observation tasks.

In FIG. 56, we see that two observation tasks have been created; one to monitor CPU utilization and the second to monitor the job queue. Here, the scenario has been given a label, "Normal CPU Monitoring". The event generator has been created by dragging and dropping two components for each observation task: a tripwire and a counter, with a further component that is shared: a finite state machine.

The properties associated with the tripwire are the name of the observation being processed (here cpu[total].util) and the threshold that, when exceeded, causes information to be passed to the next observation processor.

The property associated with the counter observation processor is the number of observations to be seen before passing an aggregate observation onto the next processor. An example helps here. Consider the situation where CPU utilization has exceeded 90% and the tripwire has been set at 70%. The tripwire will pass the observation onto the counter, where the counter state will be incremented from 0 to 1 and no observation is passed on. Now consider the next observation, where the CPU utilization is 75%. Once again the tripwire passes the observation onto the counter, where the counter state will be incremented from 1 to 2; again no observation is passed on. If the counter threshold is set to 2, and if the next CPU utilization observation exceeds 70%, the counter passes an observation onto the finite state machine (FSM).

A similar procedure for observation processing occurs for the CPU queue stream of observations.

Figure 57:
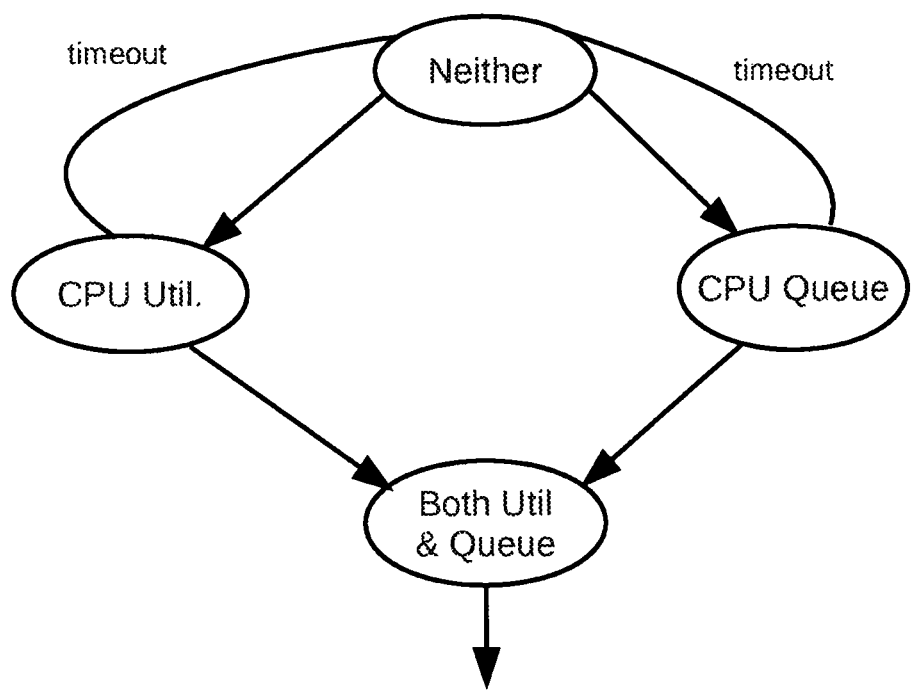
FIG. 57 illustrates a finite state machine of FIG. 56.

Inside the FSM, observations that are received cause state changes to occur. The FSM properties editor is also graphical, allowing the naming of states and transitions between them. The FSM is a state container; it can only have state entities dropped in it. The FSM is created by dragging and dropping states from the palette onto the region of the composition area occupied by the FSM. Transitions in the FSM occur when specific name, value pairs are received in the observation. In the context of the above example, the FSM has 4 states. The FSM is shown in FIG. 57.

The two timeout transitions are created by editing the properties of the states from which the transitions occur. States have names, timeouts and transitions to other states. The transitions occur when certain properties are seen in the observation being processed.

The exit transition in the above FSM means that the processed observation is passed out of the processor. In the context of this example, it means that the processed observation is passed onto the policy.

The above example has described in some detail how an event generator could be constructed. It implies the need for a sophisticated set of palette components. The requirements for these components will be derived from the management modules that are on the roadmap for isac-2. The design documents for isac-1 along with isac-2 roadmap documentation needs to be consulted here (see appendix 1). This analysis is not provided in this document. However, each palette entry needs to provide: how it can be configured, how it is represented visually on the canvas, how it can be described for the purpose of providing "tool tip" information and what types of component it can be connected too. If there is a limit on the number and type of connections that can be provided, this also needs to be defined.

In the above example it might be useful to save parts of the scenario as templates to be available on the palette—the event generator and FSM are good candidates here. This is achieved through the use of the "save as template" popup menu option. The scenario is reusable by saving it, editing it and then saving to a new name. Scenarios are also considered to be containers, enforcing the fact they may only contain hosts, observation tasks, event generators and policies.

Creating a Policy from within the Scenario Editor:

Creating a policy involves the generation of rules that process events which are produced by an event generator. Associated with a policy is a set of properties. An example of a set of properties for a policy related to process management would the names of all of the processes that a user might wish to prevent from running on a host. The rules and the properties used as input along with events from an event generator are the two types of information used in a policy.

Policy-related components can be found on the palette associated with the scenario visual editor. The palette contains a policy template, which is just a component that contains no rules. The palette also contains policies that have been user-defined, which contain rules. If the user wishes to create a new policy he first drags and drops a policy component onto the composition area. Two possibilities exist.

First, a policy template is used. In this case the user will define a new rule set. Editing the policy will be through selection of the "Edit rules" popup menu entry. The rules editor is text-based. An example of a template is shown in the table below.

```
package com.symbium.jeops;            Name:
                                         YourPolicyName
import com.symbium.services.*;        Rules:
import com.symbium.utility.*;            timeout
public ruleBase YourPolicyName {
   rule timeout {
      declarations
         com.symbium.base.Event e;
         java.util.Properties p;
      conditions
         // Put your conditions here
      actions
         // Put your actions here
   }
}
```

Declarations are automatically generated for the user. The default name for the policy is provided and indicated in red. Note that this is only one extreme possibility that reflects the desire of a programmer to have access to the full power of the Java programming language (on which the rule based policy is layered). Other types of policy may be created—with simpler form-based user interfaces—as our understanding of the management module development needs of end users matures. For example, we might create a visual editor a policy container is comprised of rule containers that, in turn, comprise "condition" and "action" containers.

Referring once again to the above table, comments are displayed that indicate where the user should add his rule conditions and actions. The editor is a syntax directed editor, supporting code completion and suggestion. It is expected that the editor will be based upon the EMF plug-in for Eclipse v3.

When a syntax error is detected, a visual indicator is provided; e.g. removing the word conditions causes the actions keyword to be underlined in red. The editor provides the ability to suggest what is to be included in the conditions section of a rule. For example, if the user starts to type "e." a code completion capability should be provided that suggests what would be possible to add. In the actions section, similar suggestions should be available, including a listing of possible actions from which to select if asked for.

When the popup menu is displayed, it is possible to add "New rule". Selecting it should cause a new rule template to be included in the definition.

When the popup menu is displayed, it is possible to add "New condition". Selecting it should cause the condition wizard to be displayed. This capability will only be available if the user's cursor is within the conditions region of the rule.

When the popup menu is displayed, it is possible to add "New action". Selecting it should cause the action wizard to be displayed. This capability will only be available if the user's cursor is within the actions region of the rule.

The outline panel to the right of the text editor should contain a description of the various elements of the policy, including the name of the rule base and the names of each of the defined rules. Clicking on any entry should cause the editor pane to scroll to the appropriate line and highlight the selected word; e.g. rule name.

Once the rules associated with a policy have been completed, the user saves it. If the user has not chosen to change the policy name, they are prompted to do so. If the named policy exists, the user is prompted to confirm overwriting of an existing policy. When the policy is saved, it is automatically compiled to Java, which is, in turn, automatically compiled to a class file by the Eclipse framework.

Secondly, an existing policy may be used to create a new one. In this case a user must have saved a policy as a template in which case it appears as an entry on the palette. A new policy may then be created by opening the template saved and editing it as described above.

Creating a Policy Outside of the Scenario Editor

It is possible to create a policy from within the Package Explorer pane of the management module perspective. The user selects "New policy" from the popup menu defined for the explorer view. An editor as described above is then displayed.

Editing a Policy Outside of the Scenario Editor

A policy may be edited by double clicking on its entry in the package explorer associated with the management module perspective. The policy editor opens automatically.

Deleting a Policy

A policy may be deleted from the project by selecting it and choosing "Delete" from the pop up menu. During deletion the integrity of the project is checked. If the project is now insane, a visual indicator is created (a red "x" is used throughout Eclipse) and error messages are written to the tasks pane. Clicking on the error message in the tasks pane causes the editor associated with the insane object to be opened.

Creating a New Type of Observation Task

A new observation task can be created by dragging a palette entry associated with an observation task onto the canvas. The properties associated with the observation task are edited and saved. The user then selects "Save as template" from the popup menu and a new palette name is associated with it; the observation task is then saved as a palette entry.

Editing an Observation Task

An observation task can be edited by double clicking on its entry in the package explorer associated with the management module perspective. The observation task editor opens automatically.

Deleting an Observation Task

An observation task can be deleted by selecting it and choosing "Delete" from the pop up menu. During deletion the integrity of the project is checked. If the project is now insane, a visual indicator is created (a red "x" is used throughout Eclipse) and error messages are written to the tasks pane. Clicking on the error message in the tasks pane causes the editor associated with the insane object to be opened.

Creating a New Type of Observation Processor

A new observation task can be created by dragging a palette entry associated with an observation task onto the canvas. The properties associated with the observation task are edited and saved. The user then selects "Save as template" from the popup menu and a new palette name is associated with it; the observation task is then saved as a palette entry.

Editing an Observation Processor

An observation processor can be edited by double clicking on its entry in the package explorer associated with the management module perspective. The observation processor editor opens automatically.

Deleting an Observation Processor

An observation processor can be deleted by selecting it and choosing "Delete" from the pop up menu. During deletion the integrity of the project is checked. If the project is now insane, a visual indicator is created (a red "x" is used throughout Eclipse) and error messages are written to the tasks pane. Clicking on the error message in the tasks pane causes the editor associated with the insane object to be opened.

Creating a new type of Event Generator

A new event generator can be constructed using either an existing event generator or by dragging an empty event generator palette entry onto the scenario canvas. Observation processors are then dragged and dropped onto the event generator. Once composed, the "Save as template" popup menu entry is selected and a new palette name is associated with it; the event generator is then saved as a palette entry.

Editing an Event Generator

An event generator can be edited by double clicking on its entry in the package explorer associated with the management module perspective. The event generator editor opens automatically.

Deleting an Event Generator

An event generator can be deleted by selecting it and choosing "Delete" from the pop up menu. During deletion the integrity of the project is checked. If the project is now insane, a visual indicator is created (a red "x" is used throughout Eclipse) and error messages are written to the tasks pane.

Clicking on the error message in the tasks pane causes the editor associated with the insane object to be opened.

Adding Utility Classes

Additional Java classes can be added using the standard Java perspective provided by Eclipse.

Editing Utility Classes

Additional utility Java classes can be edited using the standard Java perspective provided by Eclipse.

Deleting Utility Classes

Additional utility Java classes can be edited using the standard Java perspective provided by Eclipse.

Adding Primitives

New event generator classes, observation processor classes and observation task classes can be added to the system. These can be added as concrete implementations of Java interfaces; specifically, com.embotics.interactions.EventGenerator, com.embotics.interactions.ObservationProcessor and com.embotics.interactions.ObservationTask respectively. The Java perspective of Eclipse is used to create these primitives. In order for these primitives to be made accessible as palette components, they will have to be wrapped potentially as (say) Java beans.

Debugging

Users will be able to debug management modules by connecting to a host directly or by proxy on an ISAC. The host will then provide an observation stream that can be processed by the simulation engine running inside of Eclipse. Users will be able to start and stop a simulation, and will be able to observe which rules within a policy fire. Users will be able to set and remove breakpoints within the event generator for a particular scenario and inspect the processed observations at these points.

Debugging should occur using the same visual and textual editors that are used for creation of the scenario. Setting a breakpoint on an observation processor could occur by right clicking on the observation processor and selecting "Set breakpoint". Setting a breakpoint on a rule within the policy allows processing to halt on a selected rule. Optionally, we might allow setting of breakpoints on specific actions. However, rule breakpoints will probably be sufficient for R3.

When a breakpoint is reached the visual component flashes and processing of the observation halts. The user may then allow the simulator to continue, step, terminate simulation or may inspect the observation being processed. Stepping is at the level of the component in the editor; e.g. from one observation processor to the next or one rule to the next.

For R3, we should probably not allow modification of the data being processed. However, this could be considered as an enhanced feature.

NOTE: during debugging no host-side dynamic link library extensions are deployed to the host. This limitation is imposed in order to reduce the risk of bringing down the server. The user is free to deploy host extensions manually should they choose to. We do not expect to deploy a significant number of host-side extensions once WMI communications is in place, along with pass through to (potentially) SNMP.

Scenario Extension

Figure 58:
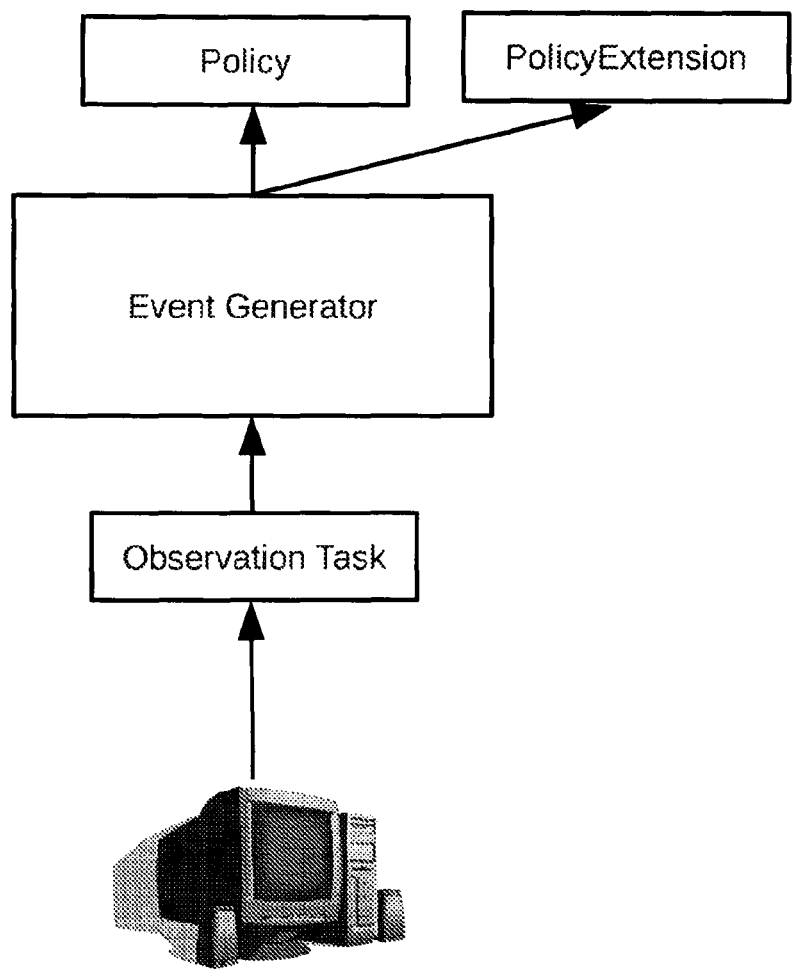
FIG. 58 illustrates a scenario extension, achieved through the addition of policy extensions.
Figure 59:
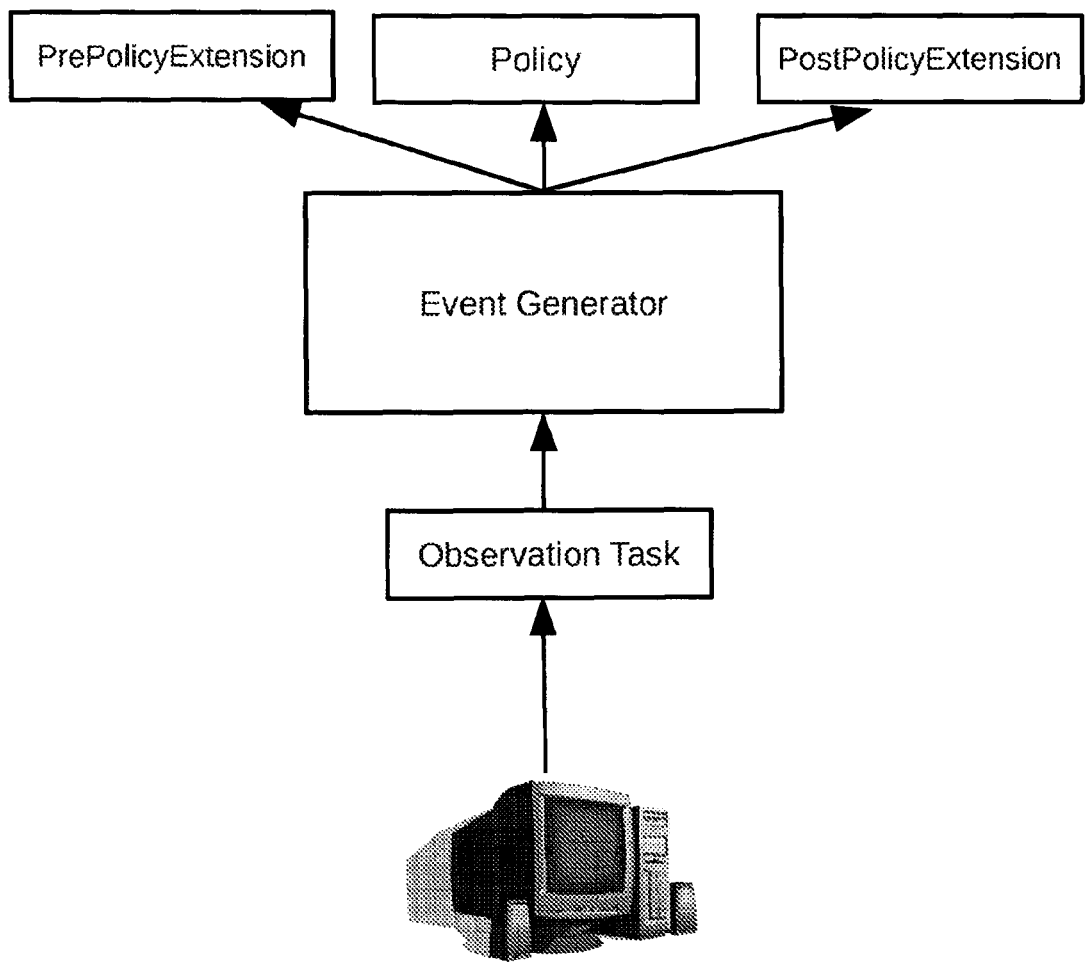
FIG. 59 illustrates another scenario extension, achieved through the addition of policy extensions.

One of the many advantages of the Embotics solution is its ability to allow policy extension. This is achieved as shown in FIGS. 58 and 59.

Scenario extension is achieved through the addition of policy extensions to the originally captured scenario. FIG. 58 demonstrates the extension by placing a "policy extension" (shown as PolicyExtension in the FIG. 58) to the right of the policy in the original scenario. Visually this meant to imply that the "policy extension" runs after the policy. In this case the "policy extension" receives exactly the same event as the original policy. Placing the policy extension to the left of the original policy as shown in FIG. 59 would imply that it runs before the policy. In this case the policy extension has the possibility of altering the contents of the event being processed; i.e. it can filter it. This means that the policy extension can affect the behaviour of the original policy.

Multiple policy extensions to a given scenario are possible by use of the drag and drop mechanisms described earlier. FIG. 58 above includes two such extensions, one that runs before the original policy and one that runs after it.

Embotics Management Console (MC)

The existing MC uses a J2EE architecture implemented using JBOSS.

The MC interacts with one or more cards using HTTPS. Card processing of the requests is through servlet technology. The following interactions need to be supported:

Card Management:
1. Getting hardware and software details for the card.
2. Being able to get and set settings for objects that the card exposes. These objects will be provided with the autonomic controller's design.
3. Being able to update the firmware on the card.

Application Management:
1. Being able to update application software on the card.
2. Being able to deploy new services on the card.
3. Being able to stop and start services on the card.

Management Module Management:
1. View and verify digital signature of a management module.
2. Deploy a management module.
3. Install new management modules.
4. Upgrade management modules:
   a. Updated environment variables
   b. Updated policy or event generator properties
5. Rollback management modules.
6. List management modules: can drill down to module contents.
7. Enable or disable management modules.
8. Enable or disable management module policies.
9. Enable or disable management module event generators.

Host Management:
1. Get hardware and software details.
2. Invoke management module actions on host.
3. Invoke management module queries on host.

Operations:
1. Set filters on alarms and events.
2. View status of a management module.
3. Clear alarm log.
4. Clear event log.

The mechanisms for updating configuration information within the MC will now be described.

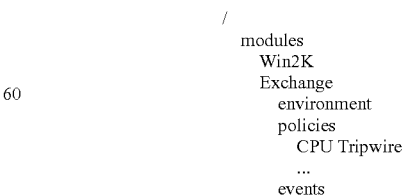

Management Module Configuration

Once a module archive has been created, it can be configured by the MC. The MC can be configured to point at the management module repository used by the enterprise, which will typically be a well-known point in the file system.

The MC can be used to edit the environment variables associated with a management module—essentially the contents of the environment directory associated with the module archive. An explorer type interface should be provided, an example of which is shown in FIG. 59 above. The MC has access to the contents of the environments associated with the management module.

When the user opens the management module environment, a properties editor associated with the environment displays the variable name, value and associated default. If a specialized editor has been provided for a management module, this will be displayed. The user may choose to return all values within a management module to their defaults, or on a per variable basis.

Once variable values have been modified, a user may choose to save the edits back as a new management module stored with the management module repository (a configured management module). If modifications are made and the user attempts to close the MC, the user must confirm discarding the edits.

The edited management module environment can be deployed to one or more cards. The user first uses the ISAC selection mechanism from isac-1 to identify which cards are to be targeted. The user then selects "deploy environment". The act of deployment transfers the environment files to the selected cards.

On card the new environment files are stored in the environment directory associated with the management module(s) being updated. Variables are then updated in memory.

As shown in FIG. 59, a policy may also be edited. When the user double clicks on the policy name (e.g. CPU Tripwire), the policy editor is displayed. By default, a properties editor will be displayed, which allows an end user to edits the properties associated with the policy. If a specialized editor has been constructed for the policy, it will be used instead.

Event generators also have properties, which may be edited. As with a policy, editing the properties of an event generator is achieved by double clicking on it. It a specialized editor has been constructed for the event generator class, it will be used instead of the default property editor.

The edited management module policies can be deployed to one or more cards. The user first uses the ISAC selection mechanism from isac-1 to identify which cards are to be targeted. The user then selects "deploy policies". The act of deployment transfers the policy and event generator files to the selected cards.

On card the new policy and event generator files are stored in the policies and event generator directories respectively associated with the management module(s) being updated. Policies and event generators for the management module are then updated in memory. Changes to the properties are detected automatically by the engine; no explicit action need be taken by the end user. Policies and event generators are deployed as a single entity for a management module because of the way that they are bound together—policies depend upon event generators.

Autonomic Controller

Figure 60:
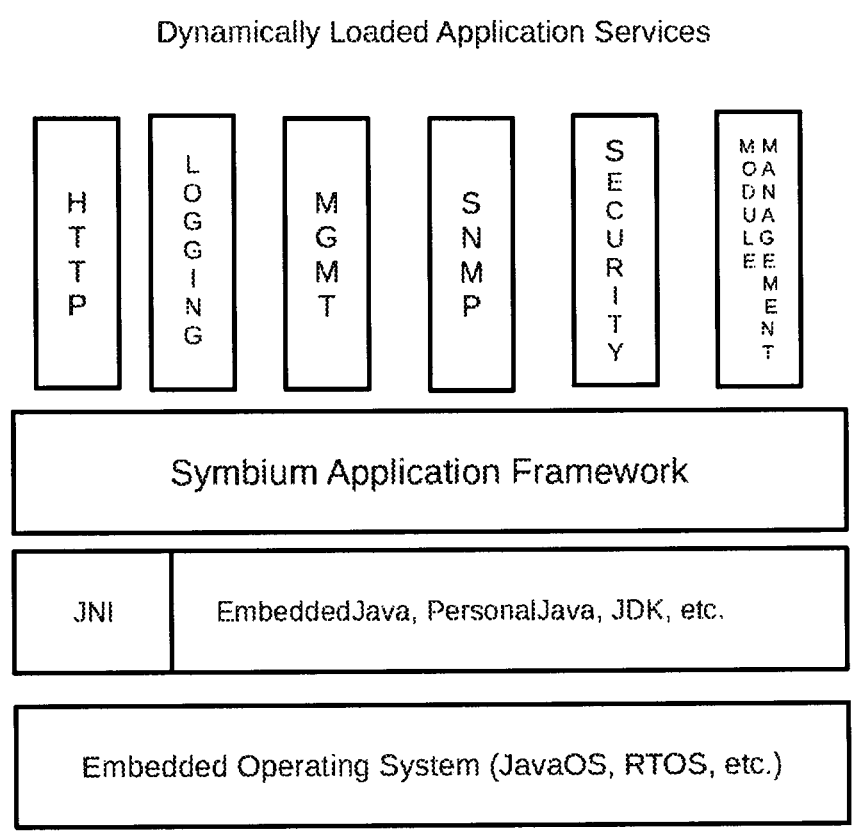
FIG. 60 illustrates an application framework for management of an application.

The Autonomic Controller Engine (ACE), or Engine, is to be constructed using a service oriented architecture. Popular examples of service oriented architectures are Web Services and CORBA. The ACE is an application constructed using several services which are described in this section. The ACE is layered as shown in FIG. 60. The AC is built up of services that run on top of the Embotics Application Framework (SAF).

SAF supports the addition and replacement of services at run time. It should not be necessary to take the controller offline in order to update the application. SAF sits on top of a driver layer that is accessed through the Java Native Interface (JNI). While the operating system layer is embedded Linux for R3, SAF should run on top of any platform that supports the JDK 1.4 specification. The J9 virtual machine from IBM will be used for execution of SAF and services built upon it. JamVM on several other platforms have also been demonstrated.

Symbium Application Framework

FIG. 60 illustrates an autonomic controller engine architecture.

Engine management of server is achieved using:
- Sensors: make observations on applications or managed device
- Effectors: change the state of applications or managed device
- Event Generators: integrate observations to create events for engine
- Event Consumers: process events to diagnose state of system being managed.

These concepts are described in some detail in the programming model document.

The Engine is built up of services that are loosely coupled and pluggable. Services have well-defined application program interfaces that can be fulfilled by several alternative implementations. The Engine is designed to be reconfigured with alternative implementations of services being provided.

The following services have been provided:
1. module management
2. task management
3. scheduling
4. lookup
5. authorization
6. authentication
7. communications:
   a. host
   b. MC
   c. WS-Management
8. heartbeat
9. alarm
10. command management
11. logging
12. auditing
13. configuration
14. event management
15. managed object service
16. properties service
17. state service
    a. persistent
    b. memory
18. lifecycle These services are briefly described in terms of their responsibilities in the next several sections.

Module Management: The module management service is responsible for dealing with the lifecycle of a module. It loads all of modules defined in the application repository. Management modules are stored within the modules directory under the application's root directory. Loading a module consists of loading policies and event generators. The loading of an event generator causes observation tasks to be started that are responsible for communicating with the host (or potentially other data sources) for the purpose of making observations on host or application performance.

Task Management: The task management service simply provides a pool of threads that can be used to perform work. This service avoids the need to create threads dynamically.

Scheduling Service: The scheduling service allows work to be deferred to some later point in time. The service provides one time and recurring schedule capabilities.

Lookup: The lookup service is a base service; that is it is provided by the framework itself. The lookup service allows other services to register in order that they may be found by other services. This service has the responsibility of notifying services that depend upon another service when the dependent service becomes available or when it goes offline.

Authorization: The authorization service is a security service. It is designed to answer the question, "Can X perform an action Y on Z?" Here, X is a user or proxy for a user, Y is an action to be performed and Z is the managed object on which the action Y is to be performed.

Authentication: The authentication service is a security service. It is designed to confirm the identity of an individual accessing the AC. This service should be based upon the JAAS specification.

Host Communications: The host communications service provides a high level communications channel to the host. It uses the Java Native Interface (JNI) to communicate with the low level drivers that connect the card via a bus (here the PCI bus) to the host. Communications in R3 should support the current proprietary format for interaction with host managed objects and the standard Windows Management Instrumentation interfaces. Asynchronous and synchronous interactions with the host are to be provided. This service is also used to deploy new or upgraded dynamic link libraries to the host and new or upgraded PCI drivers.

MC Communications: The MC communications service manages interactions with MCs.

WS-Management: This service manages interactions with external components through use of the WS-Management protocols. It exposes the information model implemented within ACE.

Heartbeat: The heartbeat service is responsible for periodic communications with an MC. It wakes up on a user-definable frequency and sends a heartbeat message to an MC.

Alarm service: The alarm service is used to raise and clear alarms. Alarms are sent to MCs (and potentially other parties) that have registered for alarm notifications. Objects may register with the alarm service in order that other parties may be notified of alarms. For example, an SNMP adapter will be required in order that alarms can be adapted and sent as traps to SNMP management consoles. The log4j package (http://logging.apache.org/log4j/docs/) and its SNMP adapter may be useful in the implementation of this service.

Command management: The command management service acts as a lookup service for processors used to communicate with the host. It decouples host message processing from a service allowing for a pluggable protocol across the PCI bus.

Logging: The logging service is responsible for saving information of interest. Strings and Objects supporting a logging interface may be logged; all logs being time stamped. Several types of logging service should be written: database, file and memory. Logs in XML format should also be supported.

Auditing: The auditing service is similar to the logging service. In fact, there is no reason why the same interface should not be used. The audit service is provided in order to store information for security purposes. Audit information should be time stamped. Audit information should be deleted from the system as a final resort—logging information is removed first.

Configuration: The configuration service consists of a set of tasks that run when the AC starts. It is intended that this service interrogate the host and its managed applications for configuration information that can only be obtained at run time.

Event management: The event management service is responsible for the generation of internal engine events created by management module activity. For example, timeout events are managed by this service.

Managed object service: The managed object service is the point of access to the AC for MC management activity; i.e. all get, set and invoke actions are sent through this service. Managed objects register with this service when they are created and deregister when they are just about to be removed from the system. Examples of managed objects are services (this list), management modules and policies. Other objects will be added during the R3 design process. The managed object service also acts as a security sentinel. All access requests to this service, and to the objects that are registered with it, are audited and authorized using the audit and authorization services respectively. During R3 a prototyping effort using an on-card Common Information Model Information Manager (CIMOM) should be undertaken as a candidate for implementation of this service. An open source Java implementation of a CIMOM is available.

Properties service: The properties service is responsible for monitoring properties files associated with managed objects. When a properties file changes the managed object is notified of the change and told to re-initialize. Changes to services (for example the frequency with which a heartbeat is generated) or policy properties (for example the set of processes to be terminated if they start) can be modified at run time without stopping the AC using this service.

Memory state service: The memory state service is an example of a state service. The purpose of this service is to maintain named objects in memory. Users may get, set and remove state.

Persistent state service: The persistent state service is an example of a state service. The purpose of this service is to maintain named objects in the file system. Users may get, set and remove state. Objects may optionally be cached.

Lifecycle service: The lifecycle service is responsible for management of services which comprise the running AC. The service has the ability to receive a new or upgraded class or jar file, deploy it to the appropriate location within the AC's directory structure, stop service(s) that are being upgraded, load the upgraded service(s) and restart it/them. In cases where the service has state associated with it, the upgraded service will attempt to recover state from it. When a new service is being loaded, the service is simply started.Software High level architecture This section describes the high level architecture for the principal components in the Embotics solution. It begins by identifying the responsibilities of the components and the actors that interact with them. The interactions between the software entities are then described. Finally, architectural views of the components are provided.

Responsibilities

MDE: The MDE is responsible for the creation and editing of management modules. The MDE can import and export management modules in module archive format.

MC: The MC is responsible for the distribution of management modules to 1 or more ISACs. The MC may update configuration parameters associated with a management module. The MC monitors ISAC activity through alarm and event notification and heartbeats. The MC allows users to ask the ISAC to perform actions that are defined for the management module; e.g. run a specific script on the host. Finally, the MC may deploy new software to the card.

Autonomic Controller: The responsibilities of the AC are to execute policies defined within the operational management modules and to act as a proxy for user pass through activity on the host. The AC notifies MCs of alarms and events of interest.

Component Interactions

Figure 61:
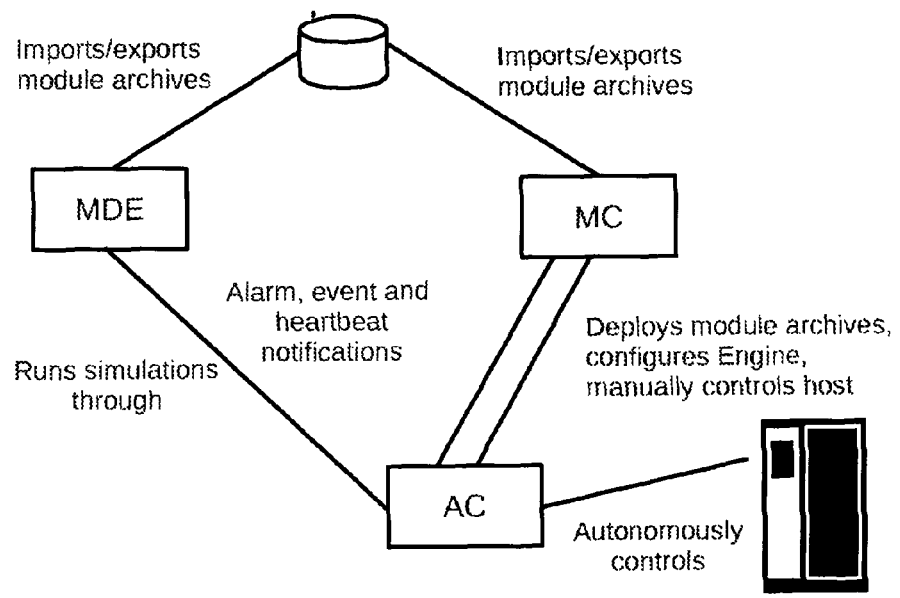
FIG. 61 illustrates main interactions between software components.

FIG. 61 shows the main interactions between the software elements within the Embotics solution. The Embotics web site—the source of management modules and software updates is shown in FIG. 62.

Figure 62:
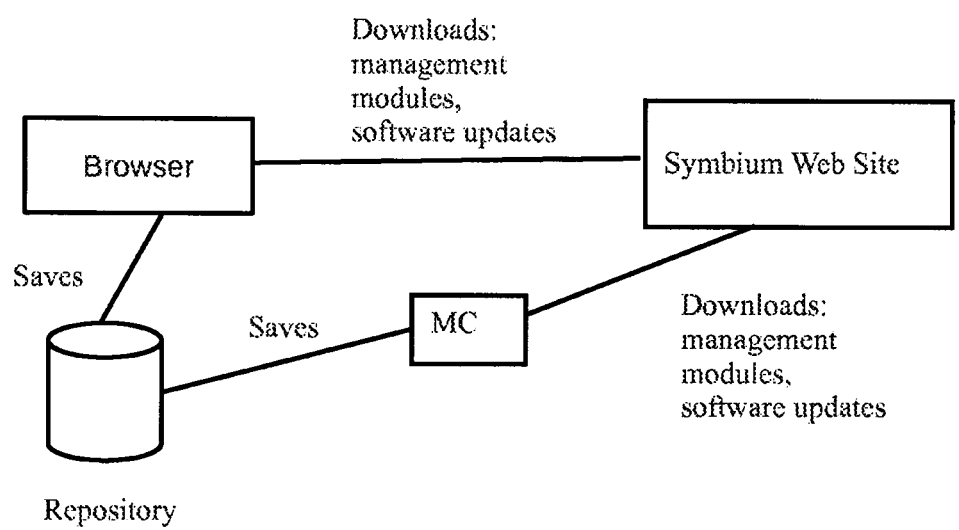
FIG. 62 illustrates a website for downloading management modules and software updates.

FIG. 62 indicates who management modules and software updates are obtained. A user may either download the file(s) using a browser or through the MC and the new archive or update is saved in a repository. The repository indicated in FIG. 62 is the same as shown in FIG. 61.

Roles

This section describes the various roles expected to be adopted by users of Embotics's products. Roles are defined in order to describe responsibilities; i.e. the functions that a user adopting a particular role is expected to perform.

There are two distinct categories of role: development and operational.

Development

There are 3 development roles: module designer, module developer and module customizer.

Module designer (Domain Expert)
- domain expert on host or application that needs management
- specifies what a module should do, but not how it is implemented within Embotics framework
- what are the scenarios of interest
- what user events of interest should be captured
- which scenarios identify problems
  - which have possible automated resolution, and what are the steps
  - which require immediate manual intervention without attempt to resolve
- what alarms should be raised to indicate existence of a problem
- what parts of scenario should be parameterized for configuration at install time
- what host/app resources need to be observed, and how might they be processed
- what host/app resources need to be acted upon
- which actions and observations should be exposed to user for manual invocation?
- What host scripts are needed, and perhaps write them
- What host tools are needed
- What are sensible defaults for thresholds and other configurable settings
- what kind of stats would be useful to collect for subsequent reporting that confirm or supports the diagnosis and resolution of the scenarios
- what user text should be available (input to a tech writer):
  - long and short parameterized descriptions of events, alarms, problem resolutions
    - Overall description of module and scenarios and other components visible in the product UI
- What host scenarios should be generated and how to do so Module Developer/Policy Developer
- domain expert on development of modules in MDE, not necessarily IT domain
- works in MDE to create module and reusable templates from primitive components
- maps above requirements onto module component implementation: sensor, effectors, policies, event generators etc
- what components from existing modules can be used in this module
- what module dependencies are there
- what new primitives are required
- what re-usable component templates are available for customize module
- what module variables are needed
- what specific component properties are needed
- what UI components are needed to configure module
  - what input validation is required, both on client and server
- develops new primitives in java
- develops conditions and actions of policy rules in java
- what is the relationship of projects and modules
- maintains version control of module source
- integrate (and perhaps write) host scripts with project and module
- integrate host tools in project and module
- performs test and debug of module with live host
- generates and signs module archive Module Customizer
- proficient in MDE but not necessarily an expert
- can take an existing module and modify it for enterprise specific best practices, or create new enterprise module that holds the customized aspects (settings, new policies) of a licensed module
- proficient with host/application and how it is used and operated within enterprise
- may experiment with module on host in test lab to determine what specific modification and configuration is needed
- review and adjust module default configuration
- review and adjust scenarios and policies. May enable/disable scenarios or policies not appropriate to enterprise
- may contribute new host scripts or host executables
- may need to again separate the guy with host/app knowledge from the guy with Embotics product knowledge
- generates and signs module archive Operational There are 3 operational roles: platform maintainer, host/application administrator and product security manager.

Platform Maintainer
- responsible for deployment of module onto card
- is more familiar with Embotics product "plumbing" than with host or app management
- gets new modules from Embotics web site
- maintains module repository
- deploys and installs customized modules to card via MC
- trouble shooting: why didn't modules get installed properly
- generates audit report to determine license compliance
- responsible for installation and upgrades of product: card hardware, card software, host drivers, MC, MDE
- may use MC or web browser to download updates from Embotics web site.
- understands version conflicts and how to resolve them. Do modules etc still work on new card s/w?
- responsible for basic platform configuration: network settings etc Host/Application Administrator
- responsible for day to day monitoring and management of host and/or application(s)

Figure 63:
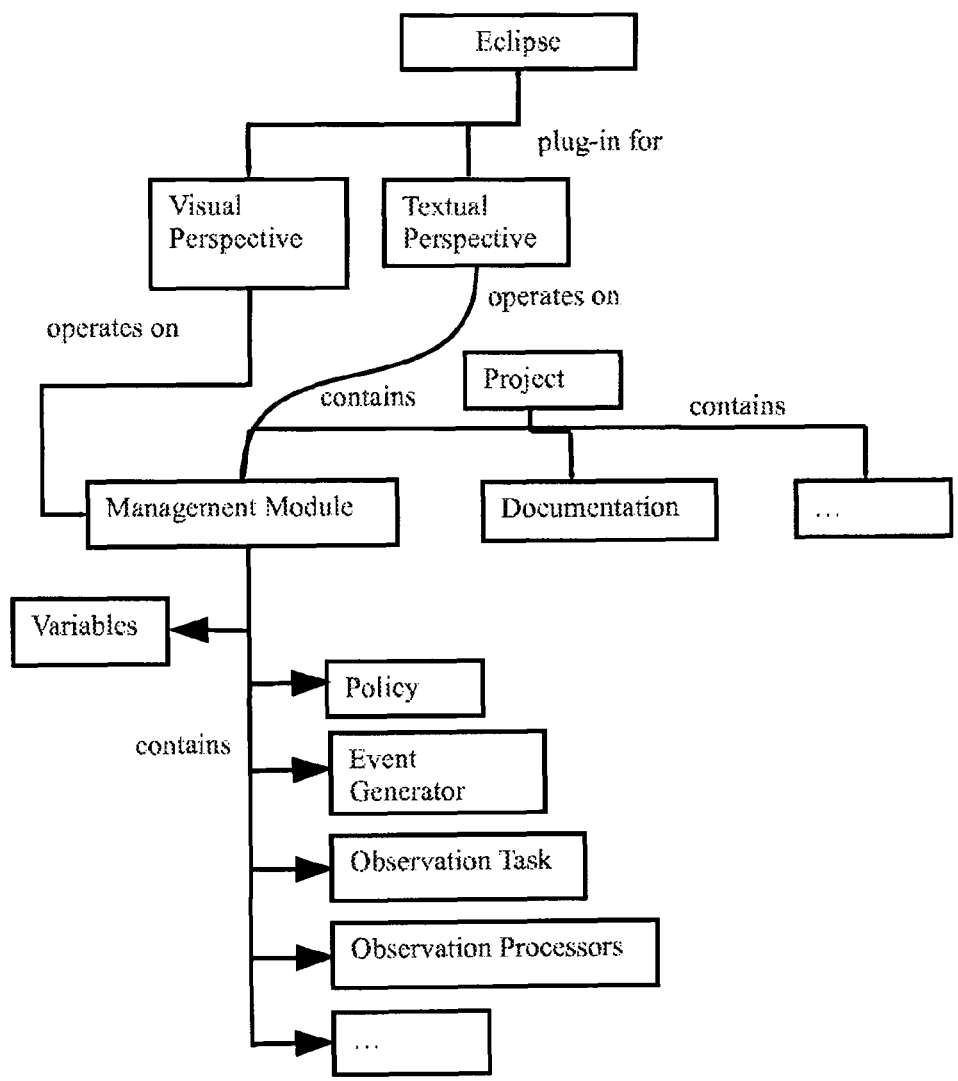
FIG. 63 illustrates a module development environment of FIG. 61.
Figure 64:
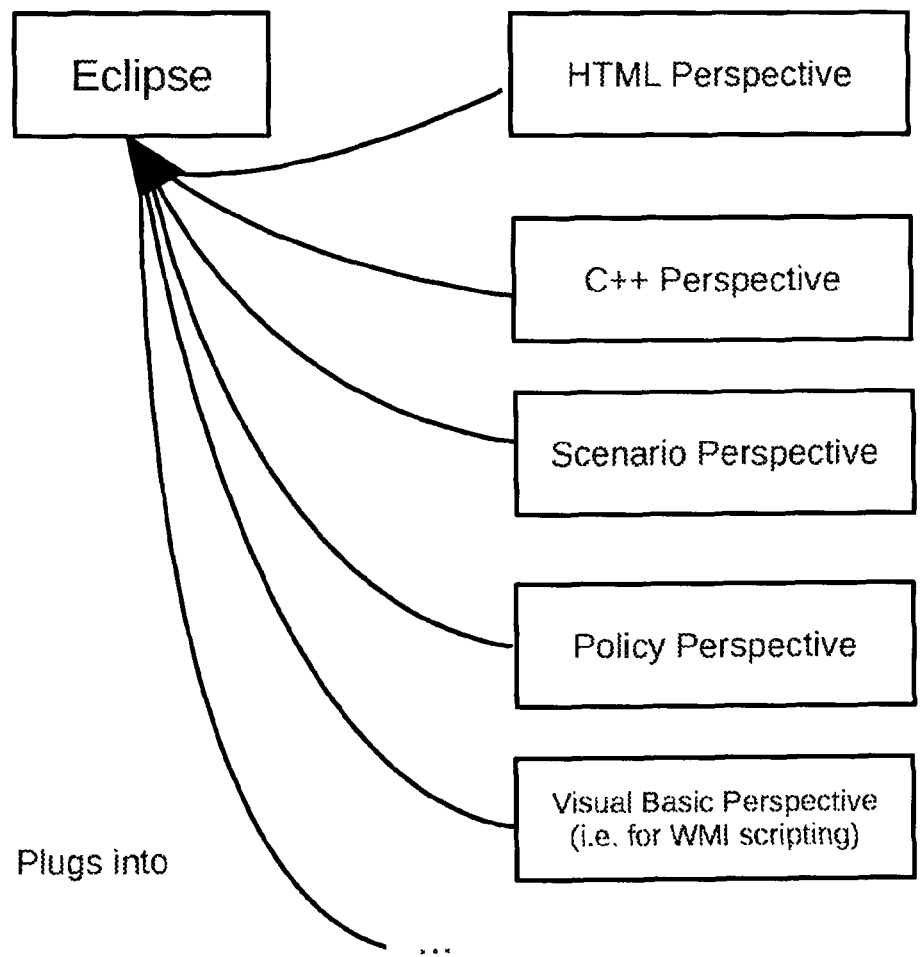
FIG. 64 illustrates perspectives for the development of the management module.

This guy is key. He uses the product every day to do his job.
  Making his job easier and more efficient is the top priority of the product. All the other roles are a tax, a necessary evil, to enable this guy to do his job well. And he can do his job most efficiently by having very little to do because the product has automated all his routine tasks and resolution of simple problems.
  more like level 1 admin than the heavy hitter domain expert
  availability and performance of host and app is a key goal
  handles problems not automatically resolved by card
  view current system status and activity
  view abstracted host and application status and activity
  can view operational reports
  alarm/problem management:
    get notified of urgent problems that require manual resolution
    diagnose card resolve current problems that need manual resolution
    review current and past alarms, events
    grant/deny permission for card to do something
  manual invocation of management actions and queries
  provides feedback to module designer/developer/customizer: what polices need improvement, what new policies are needed
  enable/disable module/scenario/policy etc
  override configuration for specific host or module
  uses MC and maybe interacts with card directly.
Product Security Manager
  responsible for ensuring the secure use of Embotics product
  not necessarily the same as the user of the security module, which is more focused on the security of the host system. But roles may be related.
  managing users and groups/roles
  defines roles and grants privileges
    may be pre-defined roles
    privilege can granted to role
    roles assigned to users
    who can do what with which application on which card using which product (MC vs MDE vs card)
  definition of on-card security policies
  may be integrated with enterprise directory system
  PKI infrastructure management
  review security audit logs
    success/fail user authentication
    card actions, module changes
    card firewall/intrusion detection
  management of secure connectivity (e.g. VPN)
  uses MC, may interact with card directly
What is Contained in a Management Module?
  The system is designed to support the lifecycle of a module and so it seems appropriate to describe the information that is contained in one. Details of the physical layout and contents of a module archive can be found in the Module Archive section. Broadly speaking, the following is included in a management module.
  Policies
    Defines alarms and events
  Instrumentation components
    Defines observations to be made on host and applications
    Extensions to host for making observations (e.g. DLLs)
  User interface components
    Enables user interaction with deployed management module
  Installation scripts
    Used to set up management module when deployed
  Configuration components
    Used to interact with host to determine context
  Security components
    Authorization
  Management components
    Extensions to the MC for configuration
    Extensions to the ISAC for configuration
  Documentation, help
    Strings for localization (110*n*) and internationalization (i18*n*)
    Card may only support subset of languages to conserve resources
Module Development Environment (MDE)
  FIG. 63 captures a high level view of the intent of the MDE. The MDE is a plug-in for Eclipse V3, or later. The plug in provides several perspectives that facilitate the creation of management modules. FIG. 63 shows that two classes of perspective will be provided: a visual perspective that provides a visual programming environment; a textual programming environment with syntax directed editors for policy creation. It is NOT envisaged that all aspects of management module creation will be supported though a visual perspective. A scenario perspective will be supported; a scenario being captured as the interaction between a policy, one or more event generators and their associated observation tasks and processors. The visual and textual perspectives operate on management modules, which are contained in a project.
  Management modules are created in the context of a project, which is a container provided by Eclipse. Embotics will create a project nature (an Eclipse term) appropriate for the contents of a management module. A project is stored persistently as a directory structure within the file system; linkages to source control repositories such as CVS are also possible. This document will not describe how revision control is managed by Eclipse; we assume that it can be supported by appropriate configuration. Hereafter we will refer to the directory structure only.
  Management modules will appear as a subdirectory under the project directory. The advantage of this use of directory structure is that the project may contain documentation, images and other management modules.
  FIG. 64 refers to perspectives that are expected to be required for management module development. Embotics will provide management module specific perspectives. It will not provide general perspectives such as Java, C++, Visual Basic or HTML. Embotics will provide recommendations of plug-ins supporting these languages.
Embotics Management Console (MC)
Autonomic Controller Engine
The Service Concept
  ISAC software implemented using services
  Services are:
    Units of software that provide facilities which are consumed by other services or external applications
    Produces/consumes pattern
  Services are:
    Composible (consumed by other services)
    Pluggable (hot swappable or replaceable)
    Manageable (explicit lifecyle)
  The Autonomic Controller Engine, or Engine, is based upon the service concept, which was described in a previous section. Why? We want to loosely couple developer efforts. Developers code to interfaces, not concrete implementations. Application is effectively constructed at run time by interaction with a lookup service. Also, by explicitly creating the associations dynamically, the problem of service replacement is made somewhat more straightforward.

Service Lifecycle and Interface
    All services implement the Service Interface
    Lifecycle:
        Init
        Start
        Stop
        Suspend
        Resume
    Operational State:
        idle (default)
        in Service (behaving normally)
        outOfService (behaving abnormally)
        in Maintenance (being maintained)
        beingSwapped (software upgrade)
    . . .

The above indicates the nature of a service; that is, it has a lifecycle and an operational state. Once in service, dependent services may also go in service. The dependency is managed by the framework; the developer need only specify the services on which his service depends.

The Engine starts by accessing the services.ini file stored in the root directory of the application archive. An example services initialization file is shown below:

---
What are current SAF services?
---
Scheduler=com.symbium.services.Scheduler
Logger=com.symbium.services.Logger
PropertiesChangeMonitor=com.symbium.services.-
PropertiesChangeMonitor
HostMediator=com.symbium.services.HostMediator
EventManager=com.symbium.services.EventManager
ModuleManager=com.symbium.services.ModuleManager
ManagedObjectManager=com.symbium.services.ManagedObjectManager
TaskManager=com.symbium.services.TaskManager
PersistentMemory=com.symbium.services.PersistentMemory
WorkingMemory=com.symbium.services.WorkingMemory
...
Loaded from services.ini in root directory of installation
---

Each of the properties refers to a service class to be loaded. The format of this file is name=class. All classes loaded through this mechanism have to implement the com.embotics.Service interface. The "name" part of the property is the service name for the class loaded. Services understand their dependencies on each other. The SAF ensures that services are only started when their dependent services are also started.

Each service may have associated properties. These are stored in the properties directory within the deployment. The filename expected for a specific service is <servicename>.ini. For example, the EventManager would have a properties file called EventManager.ini. The specification of service properties is optional. Loading of service properties is done at service initialization time. The properties files are monitored for changes. When changed, the appropriate service is re-initialized with the updated properties.

The entire framework is brought up by creating an instance of the com.embotics.application.Bootstrap class. The instance does not have to be retained as it does all of its work by side effects. Examples of services and their responsibilities are provided later in this description.

Figure 65:
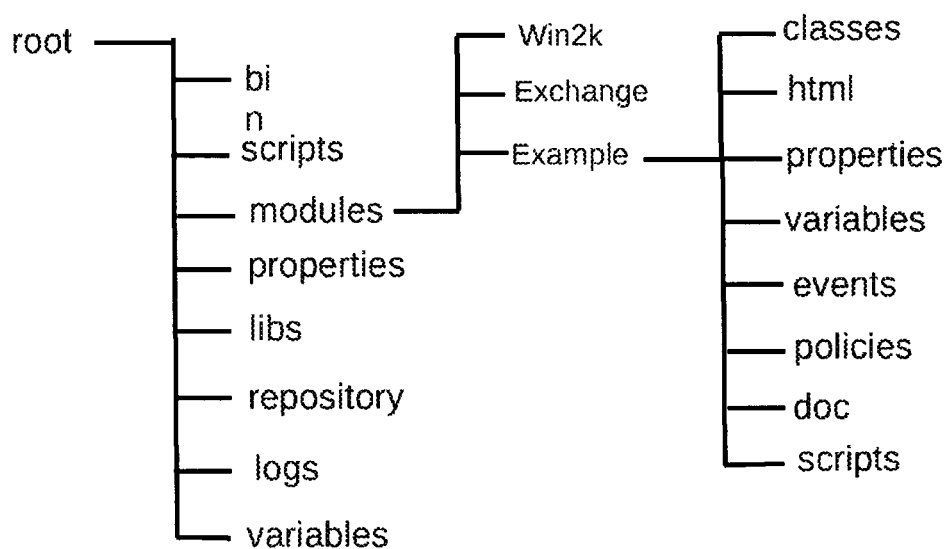
FIG. 65 shows a module archive structure of a management module.

FIG. 65 shows the directory structure that is used for the application archive. The greyed-out entries in the figure refer to module archives, the format of which is described in the Module Archive section.

The bin directory stores executables used by the framework. The scripts directory stores framework (not module) specific scripts (.vbs, .bat etc) that run on either host or card. The properties directory contains files contains initialization files for services loaded by the framework. The libs directory contains .jar, .class and other libraries to be used for the framework. The repository directory is used to store information for the application; e.g. views stored for users. The logs directory stores logs generated by the application. Several logs may be generated; e.g. security, application, and audit.

Autonomic Controller Operation

Services are started when their dependent services start successfully. The ServiceManager—a lookup service—and the ManagedObjectService—a service with which managed objects register—are created automatically.

The ModuleManager is the key service from a policy perspective. It has the responsibility of loading modules. Each module loads policies and events and resolves references between them. Essentially, policies receive events that have been created by event generators. Event generators are responsible for managing the lifecycle of sensors whose task it is to make observations on the host and its managed applications. Observation tasks make periodic observations on the host; e.g. CPU utilization, and pass this information through a chain of observation processors where the observations are aggregated. When sufficient observations have been made, an event is generated that is processed by one or more policies.

Figure 66:
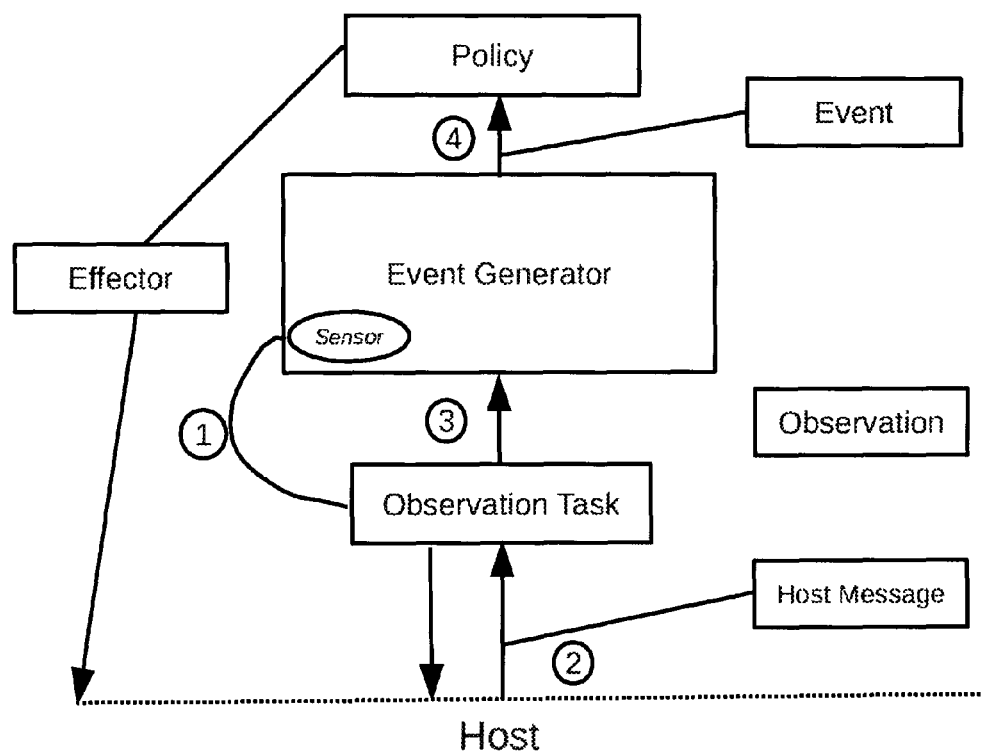
FIG. 66 illustrates a scenario related to the ISAC of FIG. 2.

FIG. 66 summarizes the modeling built implicit in the encoding of a scenario of interest. Connecting it all, there are event generators listening to sensors. Sensors then undertake observation tasks and sensors generate observations. Observations are processed by observation processors and aggregated by even generators to create events. Events are then consumed by policies and policies effect change with Effectors.

Visually, this is shown in FIG. 66. Note the strong similarity with a previously presented scenario editor for the MDE.

The ObservationTask in the FIG. 66 represents a polling task. The response to this polled request is a proprietary message sent across the PCI bus, and processed by the host communications service. The ObservationTask returns an observation in order to create an abstraction layer between the event generation system and the host. The goal would be to create different observation tasks for different monitoring environments; e.g. VMWare, and to facilitate the aggregation of observations across several devices or monitored environments. The Event Generator aggregates one or more observations—it can connect to several observation tasks—before generating an event. The event is intended to include symbolic information that summarizes the Embotics view of the world; whether it be hardware or software. It is intended that these events be standardized across managed objects and that OS and application class independence. The policy object consumes the event; firing rules in order effect change on the underlying operating system. Actually, the interaction isn't quite direct. Effectors are used that reverse the OS and application-class independence. However, there is nothing to prevent developers from accessing available services within the Engine and using the public APIs provided.

Referring once again to the FIG. 66, periodically sensors wake up and run their associated observation task. A message is sent across the PCI bus and an API within the host software obtains the information requested. Information is returned across the bus and is processed by the host communications service within the Engine. An Observation object is returned to the observation task, which passes it onto the event generator. The observation is then passed through the chain of event processors, an example of which is shown below.

Figure 67:
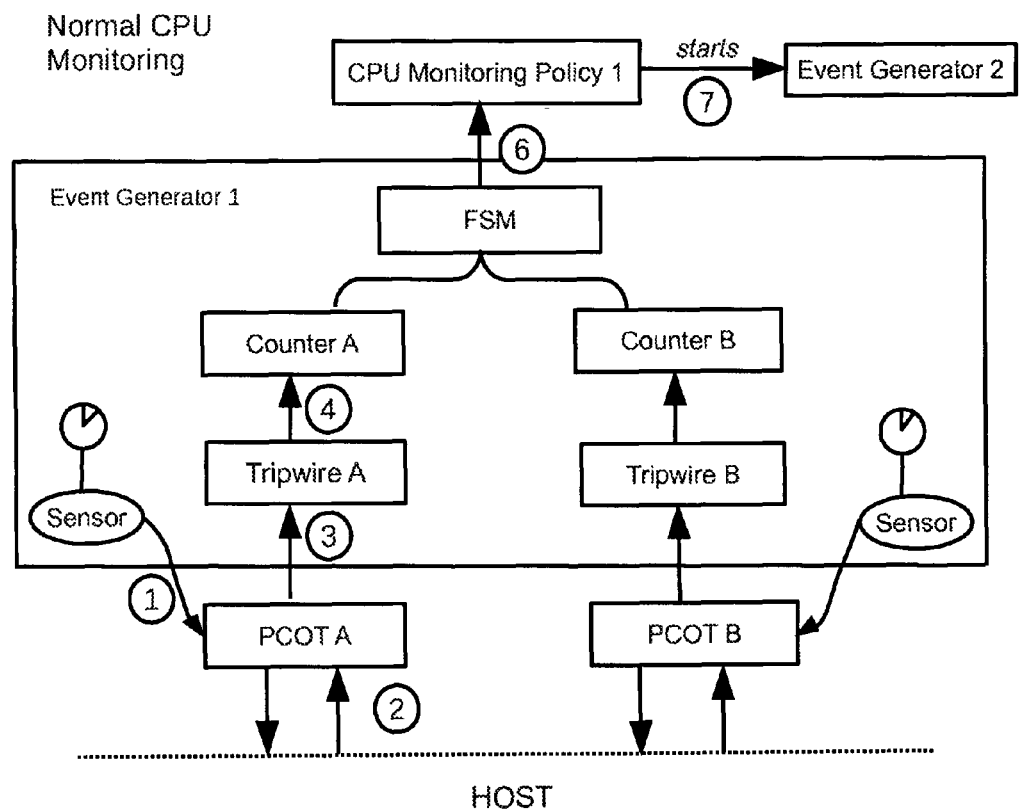
FIG. 67 illustrates an exemplary operation for normal CPU monitoring.

In FIG. 67 two chains are defined, with a rendezvous component aggregating the two chains for the purpose of event generation. The Observation is passed across the interface labeled (3) in the figure, where the value of the CPU utilization is compared to a threshold. If it exceeds the user-defined threshold, an observation is passed onto the Counter A observation processor across interface (4) where a simple counter is incremented. If the counter exceeds a user-defined threshold, the observation is passed onto the finite state machine (FSM) observation processor across interface (5). Inside of the FSM, if observations have been received from the A and B chains, an event is generated; i.e. a scenario of interest has occurred.

The event is passed across interface (6) and is then processed by the policy. Policy (in R3) is implemented using rules. An example of the set of rules associated with the above scenario is shown below:

```
01 package com.symbium.jeops;
// Removed declarations for clarity
02 public ruleBase CPUMonPolicy1 {
03    rule StartDetailedCPUMonRule {
04       declarations
05          com.symbium.base.Event e;
06          Properties p;
07       conditions
08          "os2k_cpu_mon_alert".equals(e.getProperty("action"));
09       actions
10          String modName = p.getProperty("trigger.eventgenmodule");
11          ManagedObjectManager mom = ManagedObjectManager.getInstance( );
12          Module mod = (Module) mom.lookup(modName);
13          EventGenerator toStart =
14             mod.getEventGenerator(p.getProperty("trigger.eventgen"));
15          toStart.start( );
16          //Schedule an event to stop the policy
17          ServiceManager sm = ServiceManager.getInstance( );
18          EventManagementService em = (EventManagementService)
19             Sm.lookup("EventManager");
20          EventConsumer thisPolicy = (EventConsumer)
21             mon.lookup(p.getProperty("name"));
22          GenericEvent stopLater = new GenericEvent( );
23          stopLater.setProperty("action", "os2k_cpu_mon_stop");
24          long timeTilStop = Long.parseLong(p.getProperty("trigger.runfor"));
25          em.createEvent("os2k_cpu_mon_stop", thisPolicy, stopLater, timeTilStop);
26          AlarmService am = (AlarmService) sm.lookup("AlarmManager");
27          am.raiseAlarm(p.getProperty("alarmsrc"), p.getProperty("alarmcat"),
28             p.getProperty("alarmtype"),
29             Alarm.WARNING,
30             p.getProperty("alarmmsg"));
   }
}
```

The rule above looks complex because everything has been exposed. The important lines are line 8, where the event is checked to see if it is the correct one that fires the rule. Line 15 starts an event generator that will gather statistics on the host. Line 25 creates a timeout, which will be used to stop the collection of statistics from the host and cause an e-mail to be sent. Line 27 raises an alarm associated with this condition.

It is intended that the MDE provide considerable support in the creation of these complex rules by providing building blocks available on the palette. The code is then automatically generated when the user saves the policy.

Deployment of ACE as OSGi Bundle/Servlet

The Engine is currently bundled and installed as a single service within the SMF framework. We are not currently using the server-side deployment mechanisms. The main benefit we currently gain from the framework is that it has an Http Service which allows it to act as a servlet container. By instantiating our engine from within a servlet, which is registered with the servlet container by a thin wrapper class that subscribes to the interface required by the OSGi framework, we can respond to incoming requests and commands from management devices such as the MC.

Java Packages

The Java packages associated with the AC prototype are briefly described in the followings sections.
com.embotics.application The application package contains classes necessary for running this engine as a standalone application (i.e. these classes can be run directly from the command-line, and will cause the application to be configured and initialized based on command-line params and properties files.)
com.embotics.base The base package consists of general objects and interfaces used throughout the system, as well as several abstract base classes and classes containing system-wide constants. Some of these abstract classes and interfaces are subclassed or implemented (respectively) in other packages with more specific behaviour. Many of the base types are relevant to many different aspects of the engine.
com.embotics.exceptions The exceptions package contains specialized exceptions defined to indicate specific types of run-time errors encountered by the engine. All of the exceptions are subclasses of java.lang.Exception. (Note that run-time errors in the engine do not necessarily correspond to problems detected on the host. In general, the detection of a problem on the host should be handled by the engine (e.g. an alarm could be raised), rather than causing it to throw an exception.)
com.embotics.interactions The classes making up the interactions package are responsible for two-way host interaction. (The low-level host communication is actually dealt with inside the HostMediator service in the services package, but all effectors, observation tasks and observation processors, event generators, etc. are part of the interactions package.) These classes can execute commands on the host, retrieve data from the host, and convert system-specific host messages into observations. These observation subclasses are used for internal processing in the event generator pipeline, and eventually may cause events to be generated. The engine generates an event when based on a particular observation or group of observations, to indicate that an occurrence of significance has been detected. The pipeline of observation processors in the event generator is largely responsible for aggregating these observations and determining their relevance to the defined policies, which ultimately consume the events. Most of the objects in this package have associated properties applied at runtime to customize their behaviour and interaction.

com.embotics.jeops

The jeops package contains classes generated from .rules files by the JEOPS compiler. These rules are compiled into a knowledge-base, then wrapped with a simple Java class implementing our own policy interface to create rule-based policies. The generated policies have associated properties to allow further flexibility and customization of the policies without necessarily requiring the creation of new rules. In general, a rule takes an event as an input, uses its properties and the event to evaluate a certain set of conditions, then may take actions (often via Effector objects.)

com.embotics.management

The management package defines requests, notifications, and request-handlers for interaction with the MC (or potentially other management/monitoring devices). In this context, requests are defined as incoming messages while notifications are outgoing messages such as event notifications, alarms, and heartbeats. The CommunicationManagementService and the ManagementMediatorService are two services (defined in the services package) that provide mechanisms for actually communicating with the MC and internally processing/dispatching requests. (When the engine is run inside a servlet, some incoming requests must first come through the servlet interface, which passes them along to the Management Mediator for dispatching.)

com.embotics.services

This package contains general interfaces for services, as well as one or more concrete implementation of each. A service implementation always supports an agreed-upon interface, so that services are pluggable and easily substituted. Services expose high-level functionality of the engine to each other and to other objects in the system. Although certain services are required for basic operation, and services may define dependencies on others, the engine is dynamically constructed at startup from a properties file containing list of services to instantiate.

com.embotics.servlet

This package contains classes extending the HTTPServlet interface, whose responsibilities are to run and control the engine inside a servlet container. Currently the servlet accepts both HTTP GET and POST requests. The GET requests are being used for actually controlling the engine (such as starting, stopping) while the POST requests come from the management console and include requests for the card information and for heartbeat notifications on a given interval.

com.embotics.servlet.commands

Servlet commands are specialized classes following the ServletCommandProcessor interface, which are each designed to handle a specific type of request made to the servlet via the HTTP GET method. It is likely that this will be extended in the near future to also deal with posted commands.

com.embotics.testing

This package contains primarily JUnit test-cases, as well as a few other testing utilities that can be used to help ensure the proper functionality of the software.

com.embotics.utility

This package contains some helper classes including custom data structure implementations, logging utilities, threads and some simulation pieces. Some file or resource management functionality is also included in this package, such as helper functions for locating specific files and directories for properties files.

GLOSSARY

Definitions

| Term | Description |
| --- | --- |
| Module | A module contains a set of policies and associated support information including security and user interaction components in order to manage some aspect of a server. An aspect might be hardware, operating system or application related. Examples of modules are: Win2K operating system and Microsoft Exchange. Modules are scoped, meaning that information in a child module can be obtained from a parent module. Modules are named; e.g. "Exchange"; have a description; e.g. "The Microsoft Exchange Module" and a numeric module identifier; e.g 1001. Embotics-produced modules have module identifiers that are allocated by the Module Design Authority (MDA). Numbers in the range 1–65536 are reserved for use by Embotics. |
| Sensor | Something that enables observations to be made on a server or application being managed. Sensors are either of a polled or notification type. Example: polling at a certain frequency. |
| Observation task | Something that allows an observation to be made on some aspect of the server or an application being managed. Example: observing the value of the CPU utilization. The output of an observation task is called a raw observation. |
| Observation processor | Something that manipulates an observation in order to produce information of more relevance to the engine from a control and diagnostic perspective. An observation processor takes the raw observation from an observation task and applies a function to it. Example: a processor might compute the average of an observation over a window of time. Several observations can be arranged in a pipe. Example: two processors might be arranged such that the first ensures that the observation is within the bounds 0–100, the second then computes a moving average over a window of 10 observations. The output of an observation processor is called a processed observation. |

| Term | Description |
|---|---|
| Event Generator | Something that aggregates processed observations in order to provide an event of interest to the engine. The event generator aggregates one or more processed observations until confidence is reached that something of interest to the engine has occurred. Example: if the processed CPU utilization exceeds 80% for 10 minutes and there are more than 2 jobs in the queue on average for the same time, a CPU overload event has occurred. Event generators may also accept the input of other event generators. Event generators generate engine events, also referred to as events in this document. |
| Policy | A policy captures a scenario of interest to system administrators. It also captures the development of that scenario as actions are performed by the user or by the card that attempt to bring the system back to a normal operating state. A policy is something that consumes engine events and decides upon whether actions need to be taken regarding the state of the server or a managed application. Policies may consume engine events from several sources depending upon the function of the policy. A policy processes an event using a set of rules, several of which may be true in the event context; however, only one will fire. The process of determining which of a number of rules should fire when all could fire is called conflict resolution. The set of rules is also known as a knowledge base. When a rule fires its associated actions are executed. Example: if we have two rules related to CPU utilization, one for a threshold of 90% and one for 90% and the current event refers to a situation where the CPU is running at 90%, the first rule will fire. Policies are named; e.g. "CPU Tripwire"; have a description; e.g. "The CPU Tripwire module captures CPU overloads over a user-defined period and generates user-viewable reports" and a numeric policy identifier; e.g. 1001. Embotics-produced policies have module identifiers that are allocated by the Module Design Authority (MDA). Numbers in the range 1–65536 are reserved for use by Embotics. Unique identification of a policy is through dotted concatenation of module and policy identifiers; e.g. 1001.2004. |
| Rule | A rule consists of a set of conditions connected by "and" and a set of actions. A condition is a Boolean expression such as "CPU utilization >80%". When the rule conditions are all true, and the rule is fired, the actions are executed. |
| Action | An action is something that executes when a rule fires. Actions can be: information bearing or state changing. Examples of information bearing actions are: alarm, event or report generation. Examples of state changing actions are: running a script on the server, setting the value of a variable within a policy or module, rebooting the server or setting the state of an object on the server to a known value; e.g. undoing a registry change. Users have control over whether state changing actions need to be authorized. Users can set up filters in order to limit the flow of information bearing messages sent to them. |

Module Archive

The module archive format is simply a directory structure with a number of known files contained within it. It is similar in concept to a web archive, or WAR. A module archive is programmatically produced. There are associations between files defined within the archive that are tested at module load time in order to check the sanity of the archive. A module archive is intended to be manipulated programmatically; a user should not make changes manually. This section provides significant detail on the interactions between module archive files.

Figure 68:
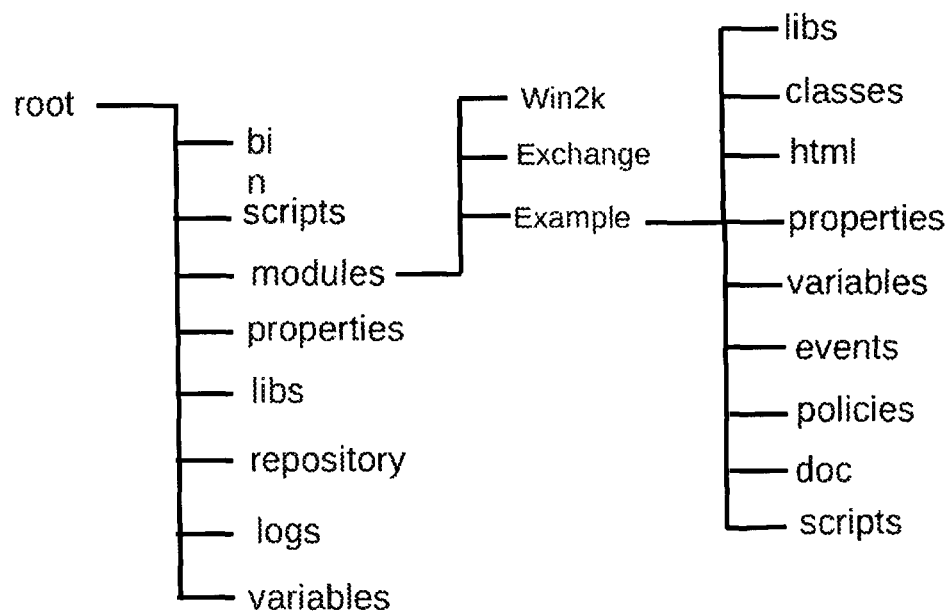
FIG. 68 illustrates a module archive structure, with three exemplary archives being installed.

A module archive is a zipped file where the name of the file indicates the name of the management module. In FIG. 68, three module archives have been installed: Win2K, Exchange and Example. The Example module archive would possible contain libs, classes, html, properties, variables, events, policies, doc and scripts subdirectories. A complete module archive contains all files sufficient to deploy the management module. An incomplete module archive contains sufficient information to upgrade an existing deployment or complete an incomplete module archive. Essentially, upgrading a management module becomes the act of unbundling a module archive over the unbundled archive of the same name and running the archive initialization behaviour, if any.

Each management module contains a variables directory. This directory contains one or more XML files. The XML files contain the definition of one or more environment variables, an example of which is shown below:

```
<Environment
    name="exampleVariable"
    type="java.lang.Integer"
    value="30"
    defaultValue="10"
    access="rw"/>
```

The classes directory contains Java class and jar files that support functionality provided by the management module. This is the first directory consulted whenever the J9 classloader looks for management module behaviour. If the management module extends another management module, its classes directory is then consulted for a requested class. The libs directory contains DLLs that are required on the host in order to support functionality provided by the module. DLLs are deployed to the host when the module archive is installed on the card. The html directory contains static html required by the management module. The properties directory contains properties files that are used by policy, event generator, observation processor and task components of the management module. The events directory stores files used to describe the event generators that are used by the management module. The policies directory stores files used to describe policies that are used by the management module. The doc directory stores documentation for the management module. The scripts directory stores scripts can be run either on the card or on the host.

Management modules are stored just below installation root directory within the Modules directory. The Modules directory contains directories; one for each module. Each directory contains a module.ini file that contains properties for the module; minimally module.name and module.description. This file may also contain installation code to be run when the module is initialized. For example, the module may need to communicate with the host in order to determine the configuration of a particular application.

All properties files within the system conform to the properties file format understood by the java.util.Properties object load method. The html directory contains any HTML templates that may be used by the module. The properties directory contains all of the properties files that can be accessed by the event and policy files that are stored within their respective directories. The variables directory contains properties files; the file name defines the variable, the properties stored within the file are the attributes of the variable. The events directory contains event definition files. These files define the sensors that need to be started, and how the observations that are made are aggregate to create events; i.e. how event generation occurs. The policies directory contains policy definitions; one per file. A policy is an event consumer. A policy has a name, description, the class of the policy to be loaded and the associated rule base that is to be loaded to process events. It also contains the names of the events that it consumes. These event names are resolved to actual event generators at run time. The doc directory contains useful module documentation. Finally, the scripts directory contains scripts that may be required to run during engine execution; e.g. WMI scripts for event notification, process and service management along with server rebooting.

What are Policies? Policies are management units of expertise and encapsulates IT best practices. Policies consume events and are derived from observations and are internally generated. Policies perform activities such as change of host, notify interested parties of events as well as generate alarms. Policies are implemented using forward chaining inference engine and can easily be change to finite state machine and a neutral network.

Policies in the system are implemented using Policy objects. Policy objects use a knowledge base of rules that cause state changes on the host being managed and inform parties (typically MCs) of scenarios of interest through alarm and event generation. The policy.class is the Java class that is to be instantiated for this policy. All policies conform to the com.embotics.Policy interface. In this case, the JeopPolicy uses the JEOPS forward chaining inference engine. However, the prototype is not tied to the use of this particular technology. These properties files are intended to be generated by the MDE.

Policies are properties files—text files designed to be generated automatically via a sophisticated development environment (the MDE).

| What is a policy? |
|---|
| policy.class=com.symbium.jeops.JeopsPolicy<br>knowledgeBase.properties=p4.properties<br>knowledgeBase.class=com.symbium.jeops.-<br>ExampleProcessManagementPolicy<br>name=p4<br>description=test for p4<br>event.source.0=e5<br>event.source.1=e6<br>event.source.2=e7<br>Policies are properties files - text files designed<br>to be generated automatically via a sophisticated<br>development environment (the MDE). |

Name and description attributes are provided for each policy and for all objects being managed. Names are considered to be unique across all objects within the management space.

The knowledgeBase.properties refers to a properties file that is to be loaded into the knowledge base. The knowledgeBase.class refers to the class which is to form the processing engine for this policy. In this case a jeops.AbstractKnowledgeBase is expected. The name and description variables refer to the name and description of the policy respectively.

The event.source.*variables refer to the names of events which this policy processes. These names are resolved to event generator objects during the loading of a module.

Other properties can be included in a policy properties file. However, they are consumed at the discretion of the policy class that is loaded.

| What is an event? |
|---|
| event.class=com.symbium.jeops.ExampleScriptEventGenerator<br>generator.class=com.symbium.jeops.ExampleProccssManagementPolicy<br>generator.properties=p7.properties<br>sensor.class=com.symbium.interactions.GenericNotificationSensor<br>name=e7<br>description=test for events<br>observer.class.0=com.symbium.interactions.ScriptObservationTask<br>observer.script.0=cscript services.vbs<br>Events are properties files - text files designed<br>to be generated automatically via a sophisticated<br>development environment (the MDE). |

The event.class property refers to the class of the event generator to be instantiated. The class is expected to implement the EventGenerator interface. The generator.class property refers to the class of the object that has the responsibility of aggregating observations to generate the event. The generator.properties property refers to a file containing properties that are to be associated with the generator instance. For example, this file could contain a list of processes that are NOT to be allowed to run on the machine. The sensor.class property is the class of the object that is responsible for making observations on the underlying managed system. Both polling and notification sensors are supported. The name and description properties are the sensor name and description respectively. The name property is used to resolve policy event sources at run time. The observer.class.*properties relate to the observation task which are aggregated by this event generator. An observer class has to implement the com.embotics.interactions.ObservationTask interface; i.e. it is responsible for ACTUALLY making the observation. The observer.script.*properties refer to scripts that have to run in order to make the observation possible.

Other properties may also be included in this file. They are consumed at the discretion of the instance of the event.class object that is created at run time.

```
What is a Knowledge Base?
package.com.symbium.jeops;
import com.symbium.utility.ErrorLogger;
import com.symbium.Event;
import java.util.Properties;
import com.symbium.services.*;
public ruleBase HostProcessManagementPolicy {
rule TerminationHostProcessRule {
    declarations
        Event e; Event being processed
        Properties p; Policy properties
    conditions
        p.containsKey(String)e.getProperty("process")); //process namespaces
        ((String).egetProperty("state").equals("start"); // if the event is the start event
actions
    HostMediator hm = (HostMediator)ServiceManager.getInstance( ).lookup("HostMediator");
    String[ ]args = { (String) e.getProperty("process") };
    hm.sendCommand ("stopprocess", args);
    ErrorLogger.getInstance( ).log(I, (String)e.getProperty("process")+" "+
        (String)e.getProperty("state"));
    }
}
```

The "Event e" declaration tells the rule about the current event being processed. The "Properties p" declaration tells the rule about the properties associated with the policy (shown on a previous slide).

The text in black starting with "package com.embotics.jeops . . ." is template information that is created automatically by the programming environment. The policy developer creates rules. A knowledge base consists of 1 or more rules. Disjunctions can be implemented with multiple rules. The Rete algorithm ensures that partial logical expressions are correctly cached and not unnecessarily evaluated multiple times. In the R3 system, much of the syntax associated with rule actions will be hidden in com.embotics.interactions. Effector objects in order that the user need not know which services are used to effect change. In the above example the HostMediator service is used; this will not be necessary in the final implemented system.

Module Development Environment Screen Capture

The screen captures provided on the next several pages detail the high level means by which information pertinent to a management module and a simple policy can be captured. The high level steps are:
1. create the module
2. create a policy
3. create a finite state machine representation for the policy
4. create an event to be consumed by the policy
    a. repeat 4 as necessary
5. add structure to the finite state machine
    a. add state
        i. repeat 5.a as necessary
    b. add transition
        i. repeat 5.b as necessary
    c. add state variable for the policy
        i. repeat 5.c as necessary
6. define the sensor associate with policy
    a. repeat 6.a as necessary
7. define alarm raised for policy
    a. associate with one state in finite state machine
    b. associate clearing of alarm with a finite state machine
    c. associate state of finite state machine where human involvement required

REFERENCE

[1] Murch, R., *Autonomic Computing*, Prentice Hall, 2004.
[2] R. Sterritt, D. W. Bustard, Autonomic Computing-a Means of Achieving Dependability?, *Proceedings of IEEE International Conference on the Engineering of Computer Based Systems (ECBS'03)*, Huntsville, Ala., USA, Apr. 7-11 2003, pp 247-251.
[3] AMI MegaRAC, http://www.ami.com/megarac/accessed 24 Jan., 2005.
[4] J. McGary and D. Bell, Exploring the Next Generation DRAC 4 Dell Remote Access Controller, *Dell Power Solutions Magazine*, October 2004, pp. 18-21.
[5] W. Pan and G. Liu, Remote Management with Virtual Media in the DRAC 4, *Dell Power Solutions Magazine*, October 2004, pp. 30-35.
[6] Berkeley Recovery Oriented Computing Group, http://roc.cs.berkeley.edu/accessed 24 Jan. 2005.
[7] Ao, G., *Software Hot-swapping Techniques for Upgrading Mission Critical Applications on the Fly*. M. Eng., Carleton University, May 2000.
[8] Feng N., *S-Module Design for Software Hot-Swapping*. M. Eng., Carleton University, May 1999.
[9] Reynaga G., Hot Swapping using State Persistence, M.C.S., Carleton University, August 2004.
[10] J. Appavoo, K. Hui, C. A. N. Soules, R. W. Wisniewski, D. M. Da Silva, O. Krieger, D. J. Edelsohn M. A. Auslander, B. Gamsa, G. R. Ganger, P. McKenney, M. Ostrowski, B. Rosenburg, M. Stumm, and J. Xenidis. Enabling autonomic behavior in systems software with hot-swapping. *IBM Systems Journal*, 42(1), 2003.
[11] G. Candea and A. Fox, Designing for High Availability and Measurability. 1st Workshop on Evaluating and Architecting System Dependability (EASY), Göteborg, Sweden, July 2001.
[12] G. Candea, J. Cutler, A. Fox, R. Doshi, P. Garg, R. Gowda, *Reducing Recovery Time in a Small Recursively Restartable System*. International Conference on Dependable Systems and Networks (DSN), Washington, D.C., June 2002.
[13] G. Candea, J. Cutler, A. Fox, *Improving Availability with Recursive Microreboots: A Soft-State System Case Study*. Performance Evaluation Journal, Vol. 56, Nos. 1-3, March 2004.
[14] Open Services Gateway Initiative (OSGi), http://www.osgi.org, accessed 24 Jan. 2005.
[15] OSGI Overview http://www.osgi.org/documents/osgi_technology/osgi-sp-overview.pdf, accessed 24 Jan. 2005.
[16] S. Hariri, H. Chen, M. Zhang, B. Kim, Y. Zhang and B Kharghari, An Autonomic Application Development &

Management Environment, submitted to *IEEE Communication: XML-based Management of Networks and Services,* 2003, available at: http://www.ece.arizona.edu/~zhang/xml.pdf, accessed 24 Jan. 2005.

[17] R. Sterritt, Towards Autonomic Computing: Effective Event Management, *Proceedings of 27th Annual IEEE/NASA Software Engineering Workshop (SEW),* Maryland, USA, Dec. 3-5, 2002, pp. 40-47.

[18] R. Sterritt, A. NcCrea, Autonomic Computing Correlation for Fault Management System Evolution, Proceedings of IEEE Conference on Industrial Informatics, Banff, Canada, Aug. 21-24, 2003.

[19] I. Katzela and M. Schwartz, Schemes for fault identification in communication networks, *IEEE Transactions on Networking,* 3 (6), 1995.

[20] B. Gruschke. Integrated Event Management: Event Correlation using Dependency Graphs, *Proceedings of the 9th IFIP/IEEE International Workshop on Distributed Systems Operation and Management (DSOM '98),* October 1998.

[21] K. Appleby, G. Goldszmidt, and M. Steinder. Yemanja—a layered event correlation engine for multi-domain server farms. In *IFIP/IEEE International Symposium on Integrated Network Management VII,* Seattle, Wash., May 2001. IEEE Publishing.

[22] Eclipse, http://www.eclipse.org, accessed 24 Jan. 2005.

[23] JEOPS, http://wwwjeops.org/, accessed 24 Jan. 2005.

[24] Agent Building and Learning Environment (ABLE), http://www.research.ibm.com/able/, accessed 24 Jan. 2005.

[25] http://www.knopflerfish.org/, accessed 2 Apr. 2006.

What is claimed is:

1. A computerized method for programming an autonomic manager, managing a managed element of a host server, the method comprising:
   (a) creating a management module encapsulating expertise for the autonomic manager;
   (b) performing simulations on a separate autonomic controller concurrently with operations of the host server on data stream obtained from the host server to test the management module, comprising performing the simulations in real time using an observation stream of data collected on the host server;
   (c) distributing the management module to one or more autonomic managers concurrently with the operations of the host server, comprising distributing the management module so that an uninterrupted operation of the host server is achieved;
   (d) generating self configuring elements in the management module, the self configuring elements running automatically after the management module is loaded on the autonomic manager; and
   (e) editing contents of the management module concurrently with the operations of the host server.

2. The method of claim 1, further comprising storing the management module.

3. The method of claim 2, further comprising configuring the management module.

4. The method of claim 1, wherein:
   the creating comprises creating the management module including a policy determining an action to be performed on the managed element in response to a change in state of the managed element; and
   the editing comprises dynamically creating the policy based on the state of the managed element.

5. The method of claim 1, wherein the step (a) further comprises:
   generating a scenario identifying a predetermined state of the managed element;
   generating a policy determining an action to be performed on the managed element in response to the occurrence of the state of the managed element corresponding to the scenario;
   determining an observation task for observing the state of the managed element;
   generating an observation processor for processing an observation made by the observation task; and
   generating an event generator for aggregating observations for checking whether the state corresponding to the scenario has occurred.

6. The method of claim 1, wherein the step (c) comprises sending data over an encrypted secure communications channel to said one or more autonomic managers.

7. The method of claim 1, further comprising responding to requests for missing software components of the management module, including providing the missing software components from a repository of software components.

8. The method of claim 7, wherein the missing software components comprise one or more of the following: policies, sensors, or effectors.

9. The method of claim 1, wherein the step (b) further comprises performing the simulations using data collected on the host server and stored in a non-transitory computer readable storage medium.

10. The method of claim 1, wherein the step (b) further comprises performing the simulations by using data provided by a user or by an event generator.

11. A non-transitory computer readable storage medium, having a computer readable program code instructions stored thereon, for execution by a processor, causing the processor to:
   (a) create a management module encapsulating expertise for the autonomic manager;
   (b) perform simulations on a separate autonomic controller concurrently with operations of the host server on data stream obtained from the host server to test the management module, comprising performing the simulations in real time using an observation stream of data collected on the host server;
   (c) distribute the management module to one or more autonomic managers concurrently with the operations of the host server, comprising distributing the management module so that an uninterrupted operation of the host server is achieved;
   (e) generate self configuring elements in the management module, the self configuring elements running automatically after the management module is loaded on the autonomic manager; and
   (d) edit contents of the management module concurrently with the operations of the host server.

12. A system for programming an autonomic manager managing a managed element of a host server, the system comprising:
   a processor; and
   a non-transitory computer readable storage medium having computer readable instructions stored thereon for execution the processor, forming:
   (a) a Module Development Environment module creating a management module encapsulating expertise for the autonomic manager, and editing contents of the management module concurrently with operations of the host server; the Module Development Environment module being further configured to generate self configuring elements in the management module, the self configuring elements running automatically after the management module is loaded on the autonomic manager;

(b) a Simulation Engine performing simulations on a separate autonomic controller concurrently with the operations of the host server on data stream obtained from the host server to test the management module, comprising performing the simulations in real time using an observation stream of data collected on the host server; and (c) a Module Distribution Environment module distributing the management module to one or more autonomic managers concurrently with the operations of the host server, comprising distributing the management module so that an uninterrupted operation of the host server is achieved.

13. The system of claim 12, further comprising a Module Repository storing the management module.

14. The system of claim 13, further comprising a Management Console configuring the management module.

15. The system of claim 14, wherein the Management Console comprises the Module Distribution Environment module (c).

16. The system of claim 15, wherein the Module Development Environment module (a) further comprises computer readable instructions stored in the non-transitory computer readable storage medium, forming:

a textual editor providing a textual programming environment for editing the management module; and a graphical editor providing a visual programming environment for editing the management module.

17. The system of claim 12 wherein the separate autonomic controller comprises an intelligent secure controller (ISAC) simulating the autonomic manager, the ISAC is located on a card.

18. The system of claim 15, wherein the Management Console comprises a network interface sending data over an encrypted secure communications channel to the autonomic manager.

19. The system of claim 12, wherein the processor and the non-transitory computer readable storage medium are embedded in a single board computer.

20. The system of claim 12, wherein the Module Distribution Environment module is configured for responding to requests for missing software components of the management module, and providing the missing software components from a repository of software components.

21. The system of claim 20, wherein the missing software components comprise one or more of the following: policies, sensors, or effectors.

22. The system of claim 12, wherein the Simulation Engine (b) is further configured to perform the simulations by using data collected on the host server and stored in a non-transitory computer readable storage medium.

23. The system of claim 12, wherein the Simulation Engine (b) is further configured to perform the simulations by using data provided by a user or by an event generator.

* * * * *